United States Patent
Ishimitsu et al.

(10) Patent No.: US 7,624,403 B2
(45) Date of Patent: Nov. 24, 2009

(54) API FOR BUILDING SEMANTICALLY RICH DIAGRAMMING TOOLS

(75) Inventors: Michael K. Ishimitsu, Sammamish, WA (US); Steven T. Antoch, North Bend, WA (US); Jonathan R. Grayum, Bothell, WA (US); Joao Pedro Silva, Redmond, WA (US); Scott Morgan LeGendre, Bainbridge Island, WA (US)

(73) Assignee: Microsoft Corporation, Redmond, WA (US)

( * ) Notice: Subject to any disclaimer, the term of this patent is extended or adjusted under 35 U.S.C. 154(b) by 1234 days.

(21) Appl. No.: 10/809,090

(22) Filed: Mar. 25, 2004

(65) Prior Publication Data

US 2005/0216883 A1 Sep. 29, 2005

(51) Int. Cl.
  *G06F 13/00* (2006.01)
(52) U.S. Cl. .................. 719/328; 345/418; 345/619
(58) Field of Classification Search ............... 719/328; 345/418, 619
  See application file for complete search history.

(56) References Cited

U.S. PATENT DOCUMENTS

| | | | | |
|---|---|---|---|---|
| 5,903,278 | A * | 5/1999 | Mitchell et al. | 345/589 |
| 7,068,290 | B2 * | 6/2006 | Bennett et al. | 345/633 |
| 7,107,543 | B2 * | 9/2006 | Berry et al. | 715/749 |
| 7,200,838 | B2 * | 4/2007 | Kodosky et al. | 717/116 |
| 7,210,117 | B2 * | 4/2007 | Kudukoli et al. | 717/100 |
| 7,464,338 | B2 * | 12/2008 | Sato | 715/750 |
| 2002/0083217 | A1 * | 6/2002 | Ward et al. | 709/328 |
| 2002/0120784 | A1 | 8/2002 | Rajarajan et al. | |
| 2003/0025715 | A1 * | 2/2003 | Graham et al. | 345/660 |
| 2004/0095354 | A1 * | 5/2004 | Marrin et al. | 345/473 |

OTHER PUBLICATIONS

Dennis Quan, et al., How to Make a Semantic Web Browser, WWW 2004, May 17-22, 2004, pp. 255-265, New York, New York, USA.
Markus Stumptner, et al., On the Road to Behavior-Based Integration, APCCM2004, 2004, pp. 15-22, Dunedin, New Zealand.
Luigi Ceccaroni, et al., A Graphical Environment for Ontology Development, AAMAS'03, Jul. 14-18, 2003, pp. 958-959, Melbourne, Australia.
Brian Mathews, et al., Vector Markup Language(VML), World Wide Web Consortium Note May 13, 1998, 50 pages.
Joan Peckham, et al., Semantic Data Models, ACM Computing Surveys, Sep. 1988, pp. 153-189, vol. 20-No. 3.
Erich Gamma, et al., Design Patterns: Elements of Reusable Object-Oriented Software, 1995, Addison-Wesley, Boston.

* cited by examiner

*Primary Examiner*—Andy Ho
(74) *Attorney, Agent, or Firm*—Workman Nydegger

(57) ABSTRACT

A system and method facilitating diagramming is provided. The diagram system includes a diagram that stores shape element(s) and an application program interface (API) that includes a control that facilitates access to the diagram. The control maintains state information associated with the diagram. For example, application(s) can employ the API to access and/or modify the diagram.

The system employs a rich framework to support both document and diagram state. Because the same framework is used to manipulate the state in a consistent way, it becomes much easier to keep the diagram synchronized with the underlying data than with conventional system(s).

18 Claims, 54 Drawing Sheets

| ShapeElement |
|---|
| +Invalidate(in absoluteShapeBounds : RectangleD) |
| +DoHitTest(in point : PointD, in hitTestInfo : DiagramHitTestInfo) : bool |
| +OnPaintShape(in paintArgs : DiagramPaintEventArgs) |
| +OnPaintSelection(in paintArgs : DiagramPaintEventArgs) |
| +OnPaintFeedback(in paintArgs : DiagramPaintEventArgs) |
| +OnMouseDown(in mouseArgs : DiagramMouseEventArgs) |
| +OnMouseMove(in mouseArgs : DiagramMouseEventArgs) |
| +OnMouseUp(in mouseArgs : DiagramMouseEventArgs) |
| +OnDragOver(in diagramDragArgs : DiagramDragEventArgs) |
| +OnDragDrop(in diagramDragArgs : DiagramDragEventArgs) |
| +OnKeyDown(in keyArgs : DiagramKeyEventArgs) |
| +OnKeyUp(in keyArgs : DiagramKeyEventArgs) |
| +OnKeyPress(in keyPressArgs : DiagramKeyPressEventArgs) |
| +*ShapeFields() : ShapeFieldCollection* |
| +AddChild(in childShape : ShapeElement) |
| +Parent() : ShapeElement |
| +Diagram() : Diagram |
| +Children() : IList |
| #ShapeGeometry() : ShapeGeometry |
| +*AbsoluteBoundingBox() : RectangleD* |
| +*BoundingBox() : RectangleD* |
| +ZOrder() : double |
| +StyleSet() : StyleSet |

FIG. 5

| NodeShape |
|---|
| +AbsoluteBounds() : RectangleD |
| +Bounds() : RectangleD |
| +Location() : PointD |
| +Size() : SizeD |
| +BoundsRules() : BoundsRules |
| -GetCompliantBounds(in proposedBounds : RectangleD) : RectangleD |

FIG. 6

| *Diagram* |
|---|
| +SnapToGrid() : bool |
| +ShowGrid() : bool |
| +Associate(in designSurface : DesignSurface) |
| +Unassociate(in designSurface : DesignSurface) |
| +Graph() : GraphWrapper |

AssociatedIMSProperty

-propDesc : IMSPropertyDescriptor = null
-store : Store = null
OnPropertyChangedHandler : ElementAttributeChangedEventHandler = null -AssociatedIMSProperty()
+AssociatedIMSProperty(in store : Store, in metaAttributeGuid : Guid)
+GetValue(in parentShape : Shape) : object
PropDescriptor() : IMSPropertyDescriptor
+SubscribeToPropertyChangedEvent()
+UnsubscribeFromPropertyChangedEvent()
-OnPropertyChanged(in e : ElementAttributeChangedEventArgs)

| BoundsBehavior |
|---|
| +leftAnchor : AnchorTarget
+rightAnchor : AnchorTarget
+bottomAnchor : AnchorTarget
+topAnchor : AnchorTarget
+horizontalSprings : Suspension
+verticalSprings : Suspension
+master : ShapeField
-minimumWidth : float
-minimumWidthInCharacters : float
-minimumHeight : float
-minimumHeightInLines : float |
| +MinimumWidth() : float
+MinimumWidthInCharacters() : float
+MinimumHeight() : float
+MinimumHeightInLines() : float
-isHorizontalCyclic(in sibling : ShapeField) : bool
-isVerticalCyclic(in sibling : ShapeField) : bool
+BoundsBehavior(in shapeField : ShapeField)
+SetLeftAnchor(in side : Edge, in margin : float)
+SetLeftAnchor(in sibling : ShapeField, in side : Edge, in margin : float)
+SetLeftAnchor(in sibling : ShapeField, in side : Edge, in margin : float, in percentage : float)
+SetLeftAnchor(in side : Edge, in margin : float, in percentage : float)
+SetLeftAnchor(in sibling : Shape, in side : Edge, in margin : float)
+SetLeftAnchor(in sibling : Shape, in side : Edge, in margin : float, in percentage : float)
+SetRightAnchor(in side : Edge, in margin : float)
+SetRightAnchor(in sibling : ShapeField, in side : Edge, in margin : float)
+SetRightAnchor(in sibling : ShapeField, in side : Edge, in margin : float, in percentage : float)
+SetRightAnchor(in side : Edge, in margin : float, in percentage : float)
+SetRightAnchor(in sibling : Shape, in side : Edge, in margin : float)
+SetRightAnchor(in sibling : Shape, in side : Edge, in margin : float, in percentage : float)
+SetTopAnchor(in side : Edge, in margin : float)
+SetTopAnchor(in sibling : ShapeField, in side : Edge, in margin : float)
+SetTopAnchor(in sibling : ShapeField, in side : Edge, in margin : float, in percentage : float)
+SetTopAnchor(in side : Edge, in margin : float, in percentage : float)
+SetTopAnchor(in sibling : Shape, in side : Edge, in margin : float)
+SetTopAnchor(in sibling : Shape, in side : Edge, in margin : float, in percentage : float)
+SetBottomAnchor(in side : Edge, in margin : float)
+SetBottomAnchor(in sibling : ShapeField, in side : Edge, in margin : float)
+SetBottomAnchor(in sibling : ShapeField, in side : Edge, in margin : float, in percentage : float)
+SetBottomAnchor(in side : Edge, in margin : float, in percentage : float)
+SetBottomAnchor(in sibling : Shape, in side : Edge, in margin : float)
+SetBottomAnchor(in sibling : Shape, in side : Edge, in margin : float, in percentage : float) |

1600

+CenterHorizontally()
+CenterHorizontally(in leftSide : Edge, in rightSide : Edge)
+CenterHorizontally(in leftSide : Edge, in sibling : Shape, in rightSide : Edge)
+CenterHorizontally(in leftSide : Edge, in leftSiblingSide : Shape, in rightSide : Edge)
+CenterHorizontally(in leftSibling : Shape, in leftSiblingSide : Edge, in rightSibling : Shape, in rightSiblingSide : Edge)
+CenterHorizontally(in leftSibling : Shape, in leftSiblingSide : Edge, in rightSibling : ShapeField, in rightSiblingSide : Edge)
+CenterHorizontally(in leftSibling : ShapeField, in leftSiblingSide : Edge, in rightSide : Edge)
+CenterHorizontally(in leftSibling : ShapeField, in leftSiblingSide : Edge, in rightSibling : Shape, in rightSiblingSide : Edge)
+CenterHorizontally(in leftSibling : ShapeField, in leftSiblingSide : Edge, in rightSibling : ShapeField, in rightSiblingSide : Edge)
+CenterHorizontally(in percentage : float)
+CenterHorizontally(in leftSide : Edge, in sibling : ShapeField, in rightSide : Edge, in percentage : float)
+CenterHorizontally(in leftSide : Edge, in sibling : Shape, in rightSide : Edge, in percentage : float)
+CenterHorizontally(in leftSibling : Shape, in leftSiblingSide : Edge, in rightSide : Edge, in percentage : float)
+CenterHorizontally(in leftSibling : Shape, in leftSiblingSide : Edge, in rightSibling : Shape, in rightSiblingSide : Edge, in percentage : float)
+CenterHorizontally(in leftSibling : Shape, in leftSiblingSide : Edge, in rightSibling : ShapeField, in rightSiblingSide : Edge, in percentage : float)
+CenterHorizontally(in leftSibling : ShapeField, in leftSiblingSide : Edge, in rightSide : Edge, in percentage : float)
+CenterHorizontally(in leftSibling : ShapeField, in leftSiblingSide : Edge, in rightSibling : Shape, in rightSiblingSide : Edge, in percentage : float)
+CenterHorizontally(in leftSibling : ShapeField, in leftSiblingSide : Edge, in rightSibling : ShapeField, in rightSiblingSide : Edge, in percentage : float)
+CenterVertically()
+CenterVertically(in topSide : Edge, in bottomSide : Edge)
+CenterVertically(in topSide : Edge, in sibling : Shape, in bottomSide : Edge)
+CenterVertically(in topSide : Edge, in sibling : ShapeField, in bottomSide : Edge)
+CenterVertically(in topSibling : Shape, in topSiblingSide : Edge, in bottomSide : Edge)
+CenterVertically(in topSibling : Shape, in topSiblingSide : Edge, in bottomSibling : Shape, in bottomSiblingSide : Edge)
+CenterVertically(in topSibling : Shape, in topSiblingSide : Edge, in bottomSibling : ShapeField, in bottomSiblingSide : Edge)
+CenterVertically(in topSibling : ShapeField, in topSiblingSide : Edge, in bottomSide : Edge)
+CenterVertically(in topSibling : ShapeField, in topSiblingSide : Edge, in bottomSibling : Shape, in bottomSiblingSide : Edge)
+CenterVertically(in topSibling : ShapeField, in topSiblingSide : Edge, in bottomSibling : ShapeField, in bottomSiblingSide : Edge)
+CenterVertically(in percentage : float)
+CenterVertically(in topSide : Edge, in sibling : Shape, in bottomSide : Edge, in percentage : float)
+CenterVertically(in topSide : Edge, in sibling : ShapeField, in bottomSide : Edge, in percentage : float)
+CenterVertically(in topSibling : Shape, in topSiblingSide : Edge, in bottomSide : Edge, in percentage : float)
+CenterVertically(in topSibling : Shape, in topSiblingSide : Edge, in bottomSibling : Shape, in bottomSiblingSide : Edge, in percentage : float)
+CenterVertically(in topSibling : Shape, in topSiblingSide : Edge, in bottomSibling : ShapeField, in bottomSiblingSide : Edge, in percentage : float)
+CenterVertically(in topSibling : ShapeField, in topSiblingSide : Edge, in bottomSide : Edge, in percentage : float)
+CenterVertically(in topSibling : ShapeField, in topSiblingSide : Edge, in bottomSibling : Shape, in bottomSiblingSide : Edge, in percentage : float)
+CenterVertically(in topSibling : ShapeField, in topSiblingSide : Edge, in bottomSibling : ShapeField, in bottomSiblingSide : Edge, in percentage : float)

| ShapeElement |
|---|
| +Visible : bool = true |
| +Collapse() |
| +Expand() |

FIG. 23

StyleSet

- -parent : StyleSet = null
- +localNamedPens : NamedPenCollection = null
- +localNamedBrushes : NamedBrushCollection = null
- +localNamedFonts : NamedFontCollection = null

- +StyleSet(in parent : StyleSet)
- #Parent() : StyleSet
- +GetPenDescriptor(in penID : DesignSurfaceResourceId) : PenDescriptor
- +GetBrushDescriptor(in brushID : DesignSurfaceResourceId) : BrushDescriptor
- +GetFontDescriptor(in fontID : DesignSurfaceResourceId) : FontDescriptor
- #OverridePenWorker(in penID : DesignSurfaceResourceId, in basePenID : DesignSurfaceResourceId, in penSettings : PenSettings)
- #OverrideBrushWorker(in brushID : DesignSurfaceResourceId, in baseBrushID : DesignSurfaceResourceId, in brushSettings : BrushSettings)
- #OverrideFontWorker(in fontID : DesignSurfaceResourceId, in baseFontID : DesignSurfaceResourceId, in fontSettings : FontSettings)
- +OverridePen(in penID : DesignSurfaceResourceId, in penSettings : PenSettings)
- +OverrideBrush(in brushID : DesignSurfaceResourceId, in brushSettings : BrushSettings)
- +OverrideFont(in fontID : DesignSurfaceResourceId, in fontSettings : FontSettings)
- +ClearPenOverride(in penID : DesignSurfaceResourceId)
- +ClearBrushOverride(in brushID : DesignSurfaceResourceId)
- +ClearFontOverride(in fontID : DesignSurfaceResourceId)
- +AddPen(in newPenID : DesignSurfaceResourceId, in basePenID : DesignSurfaceResourceId, in penSettings : PenSettings)
- +RemovePen(in penID : DesignSurfaceResourceId)
- +AddBrush(in newBrushID : DesignSurfaceResourceId, in baseBrushID : DesignSurfaceResourceId, in brushSettings : BrushSettings)
- +RemoveBrush(in brushID : DesignSurfaceResourceId)
- +AddFont(in newFontID : DesignSurfaceResourceId, in baseFontID : DesignSurfaceResourceId, in fontSettings : FontSettings)
- +RemoveFont(in fontID : DesignSurfaceResourceId)
- +GetPen(in penID : DesignSurfaceResourceId) : Pen
- +GetBrush(in brushID : DesignSurfaceResourceId) : Brush
- +GetFont(in fontID : DesignSurfaceResourceId) : Font

2900

ApplicationStyleSet

- -theAppStyleSet : ApplicationStyleSet = null

- +ApplicationStyleSet(in parent : StyleSet)
- +StyleSet() : ApplicationStyleSet
- -InitializeDefaultPens()
- -InitializeDefaultBrushes()
- -InitializeDefaultFonts()

| ShapeSubField |
|---|
| +ShapeSubField() |
| +GetFocusable(in parentShape : ShapeElement, in parentField : ShapeField) : bool |
| +GetSelectable(in parentShape : ShapeElement, in parentField : ShapeField) : bool |
| +GetPotentialMouseAction(in mouseButtons : MouseButtons, in point : PointD, in hitTestInfo : DiagramHitTestInfo) : MouseAction |
| +OnKeyDown(in keyArgs : DiagramKeyEventArgs) |
| +OnKeyUp(in keyArgs : DiagramKeyEventArgs) |
| +OnKeyPress(in keyPressArgs : DiagramKeyPressEventArgs) |

| DiagramItem |
|---|
| -shape : ShapeElement = null
-field : ShapeField = null
-subField : ShapeSubField = null |
| +DiagramItem()
+DiagramItem(in shape : ShapeElement)
+DiagramItem(in shape : ShapeElement, in field : ShapeField)
+DiagramItem(in shape : ShapeElement, in field : ShapeField, in subField : ShapeSubField)
+Shape() : ShapeElement
+Field() : ShapeField
+SubField() : ShapeSubField
+SetItem(in shape : ShapeElement)
+SetItem(in shape : ShapeElement, in field : ShapeField)
+SetItem(in shape : ShapeElement, in field : ShapeField, in subField : ShapeSubField)
+CanSelect() : bool |

| DiagramHitTestInfo |
|---|
| -diagramClientView : DiagramClientView = null
-hitItem : DiagramItem = null
-hitGrabHandle : GrabHandle = null
-emptyHitItem : DiagramItem = new DiagramItem() |
| +DiagramHitTestInfo(in diagramClientView : DiagramClientView)
+DiagramClientView() : DiagramClientView
+HitDiagramItem() : DiagramItem
+HitGrabHandle() : GrabHandle |

| ShapeField |
|---|
| +DoPaint(in e : DiagramPaintEventArgs, in parentShape : ShapeElement) |
| +DoHitTest(in point : PointD, in parentShape : ShapeElement, in diagramHitTestInfo : DiagramHitTestInfo) |

| SelectedShapesCollection |
|---|
| -diagramItemCollection : DiagramItemCollection = new DiagramItemCollection()<br>-selectionChanging : bool = false<br>-diagramClientView : DiagramClientView = null<br>-focusedItem : DiagramItem = null<br>-anchorItem : DiagramItem = null |
| +SelectedShapesCollection(in diagramClientView : DiagramClientView)<br>+PrimaryItem() : DiagramItem<br>+FocusedItem() : DiagramItem<br>+AnchorItem() : DiagramItem<br>+Add(in diagramItem : DiagramItem)<br>+Remove(in diagramItem : DiagramItem)<br>+Set(in diagramItem : DiagramItem)<br>+Add(in diagramItems : DiagramItemCollection)<br>+Remove(in diagramItems : DiagramItemCollection)<br>+Set(in diagramItems : DiagramItemCollection)<br>+Toggle(in diagramItems : DiagramItemCollection)<br>+Clear()<br>+Contains(in diagramItem : DiagramItem) : bool<br>-Invalidate()<br>+Count() : int |

FIG. 35

DiagramSelectionRules — 3700

- +DiagramSelectionRules()
- +GetCompliantSelection(in currentSelection : SelectedShapesCollection, in proposedItemsToAdd : DiagramItemCollection, in proposedItemsToRemove : DiagramItemCollection, in primaryItem : DiagramItem) : bool

| SelectedShapesCollection |
|---|
| +SelectedShapesCollection(in diagramClientView : DiagramClientView)<br>+PrimaryItem() : DiagramItem<br>+FocusedItem() : DiagramItem<br>+AnchorItem() : DiagramItem |

FIG. 38

ShapeSubField

+ShapeSubField()
+GetFocusable(in parentShape : ShapeElement, in parentField : ShapeField) : bool
+GetSelectable(in parentShape : ShapeElement, in parentField : ShapeField) : bool
+GetPotentialMouseAction(in mouseButtons : MouseButtons, in point : PointD,
    in hitTestInfo : DiagramHitTestInfo) : MouseAction
+OnKeyDown(in keyArgs : DiagramKeyEventArgs)
+OnKeyUp(in keyArgs : DiagramKeyEventArgs)
+OnKeyPress(in keyPressArgs : DiagramKeyPressEventArgs)

API FOR BUILDING SEMANTICALLY RICH DIAGRAMMING TOOLS

TECHNICAL FIELD

The present invention relates generally to computer system(s), and more particularly, to system(s) and method(s) facilitating diagramming tools.

BACKGROUND OF THE INVENTION

Diagramming tool(s) make it easier to create tools that allow people to display and edit information. Conventional diagramming tool(s) have suffered from three major flaws. First, conventional diagramming tool(s) have focused on just the problem of creating diagrams and generally ignored the fact that the diagrams are essentially views of semantically rich data. This makes the application program interface(s) (APIs) cumbersome to use in practice since software developers generally are required to write large amounts of code to keep the diagram and the underlying data synchronized.

Secondly, conventional diagramming tool(s) have had cumbersome APIs that have required software developers to write large amounts of code to support the high quality user interfaces expected in commercial diagramming tools. Finally, The APIs have not supported large complex drawings. Large and complex drawings either cause the software to fail or carry out operations unacceptably slowly.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method facilitating diagramming. In accordance with an aspect of the present invention, a diagram system is provided which manages presentation elements (diagrams and shapes) in the same context as the subject elements they depict. The diagram system includes an object model application program interface (API) with a control that facilitates access to the presentation elements, scoped on one diagram at a time. The control maintains state information associated with the diagram. For example, application(s) can employ the API to access and/or modify the diagram.

The system employs a rich framework to support both document and diagram state. Because the same framework is used to manipulate the state in a consistent way, it becomes much easier to keep the diagram synchronized with the underlying data than with conventional system(s).

The system facilitates customizability through modern API design techniques, for example, class inheritance. Standard default ways to perform common behavior customizations (e.g., static appearance of a shape in the diagram) is provided. However, mechanism(s) to override this behavior, for example, through inheritance are provided. Additionally, the system facilitates control-less design that makes it easier to appropriately and efficiently respond to state changes in the underlying data and operating system.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 5 is a diagram of an exemplary ShapeElement class in accordance with an aspect of the present invention.

FIG. 6 is a diagram of an exemplary NodeShape class in accordance with an aspect of the present invention.

FIG. 14 is a diagram of an exemplary AssociatedIMSProperty class in accordance with an aspect of the present invention.

FIG. 16 is a diagram of an exemplary BoundsBehavior class in accordance with an aspect of the present invention is illustrated.

FIG. 17 is a diagram further illustrating the exemplary BoundsBehavior class of FIG. 16.

FIG. 23 is a diagram of an exemplary Shape Element class in accordance with an aspect of the present invention.

FIG. 29 is a diagram of an exemplary StyleSet class in accordance with an aspect of the present invention.

FIG. 31 is a diagram of an exemplary ShapeSubField class in accordance with an aspect of the present invention.

FIG. 32 is a diagram of an exemplary DiagramItem class in accordance with an aspect of the present invention.

FIG. 33 is a diagram of an exemplary DiagramHitTestInfo structure in accordance with an aspect of the present invention.

FIG. 34 is a diagram of an exemplary Shapefield class in accordance with an aspect of the present invention.

FIG. 35 is a diagram of an exemplary SelectedShapesCollection class in accordance with an aspect of the present invention.

FIG. 37 is a diagram of an exemplary DiagramSelectionRules class in accordance with an aspect of the present invention.

FIG. 38 is a diagram of an exemplary SelectedShapesCollection class in accordance with an aspect of the present invention.

FIG. 39 is a diagram of an exemplary ShapesSubField class in accordance with an aspect of the present invention.

DETAILED DESCRIPTION OF THE INVENTION

Figure 1:
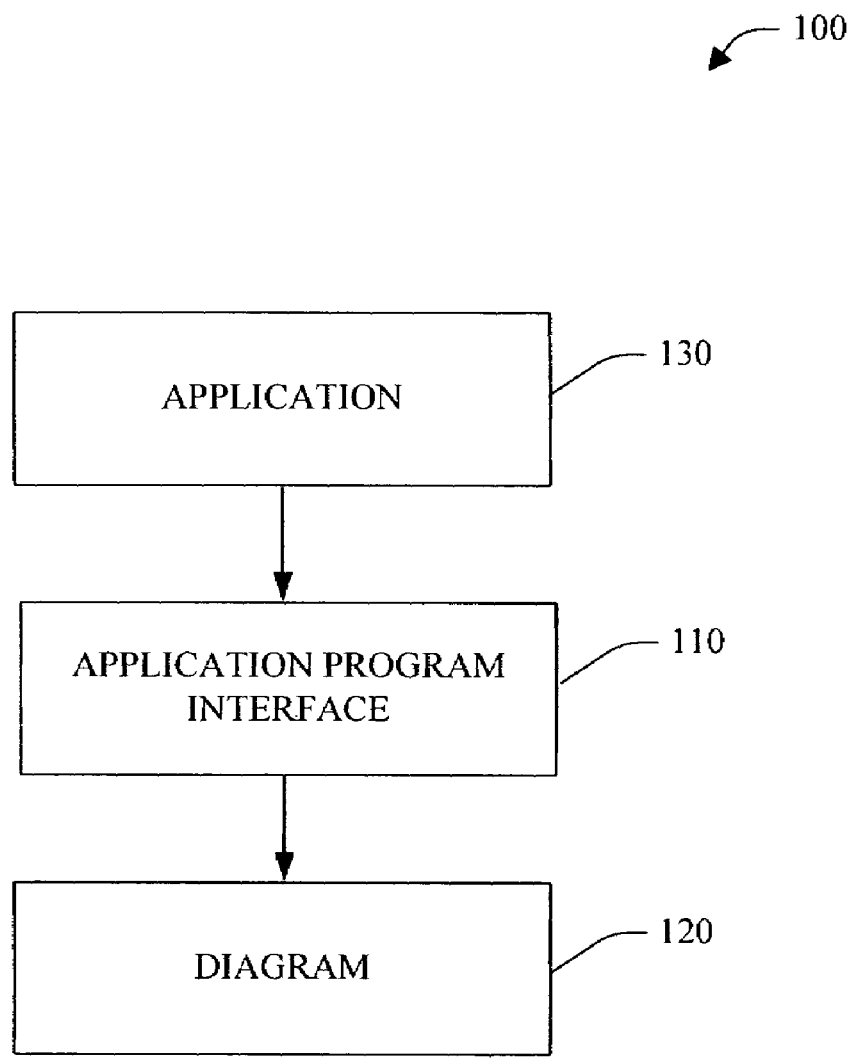
FIG. 1 is a block diagram of a diagram system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Further "hittest" refers to functionality that can test a shape that has been dropped by dragging. For example, the test can return information which indicates if the shape has been dropped outside the boundary of a target shape, on the boundary of a target shape, inside the filled-area of a two-dimensional shape and/or on the line of a one-dimensional shape. Further, the target can be a single shape and/or a collection of shapes.

"Object role modeling" (ORM) employs objects and roles to provide a conceptual approach to modeling. ORM can employ natural language and intuitive diagram(s) (e.g., ORM diagram(s)).

The present invention relates to systems and methods that facilitate application development by providing an Application Programming Interface (API) and framework that supports modeling diagram object manipulation and/or interaction. A diagram object is provided that models, for example, application(s), class(es), relational database(s) and/or object role modeling (ORM). Accordingly, developer(s) can easily describe attribute(s), relationship(s) and/or constraint(s).

System 100

Referring to FIG. 1, a diagram system 100 in accordance with an aspect of the present invention is illustrated. The system 100 includes an application program interface (API) 110 and a diagram 120. Application(s) 130 employ the API 110 to access and/or modify the diagram 120.

The system 100 employs a rich framework to support both document and diagram state. Because the same framework is used to manipulate the state in a consistent way, it becomes much easier to keep the diagram synchronized with the underlying data than with conventional system(s).

The system 100 further facilitates customizability through modern API design techniques, for example, inheritance. Simple default ways to perform common behavior customizations (e.g., static appearance of a shape in the diagram) is provided. However, mechanism(s) to override this behavior, for example, through inheritance are provided. Additionally, the system 100 facilitates control-less design that makes it easier to appropriately and efficiently respond to state changes in the underlying data and operating system.

Conventional system(s) suffered from poor scalability which the system 100 can mitigate by using a control-less design and designing data structure(s) to scale well. Generally, operating system(s) do not scale well when there are large numbers of windows present. This makes the implementation easier but at the cost of scalability. The invention instead uses a single window for whole diagramming surface and provides fast scalable APIs that replace operating system functionality.

Core Design Surface

Figure 2:
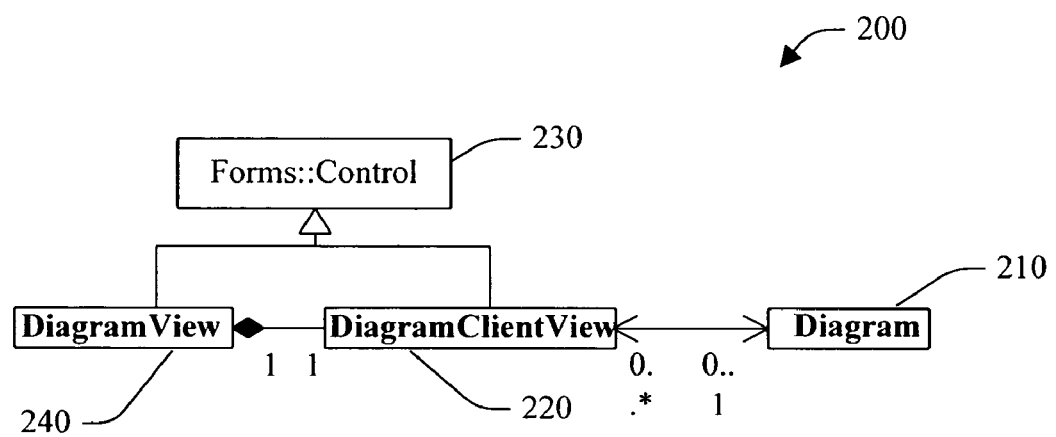
FIG. 2 is a block diagram of a diagram system in accordance with an aspect of the present invention

Turning briefly to FIG. 2, a diagram system 200 in accordance with an aspect of the present invention is illustrated. The system 200 includes a diagram 210 coupled to a DiagramClientView 220. DiagramClientView 220 is derived from Forms:Control 230.

The DiagramClientView 220 class is a control that allows an end-user to interact with a Diagram 210 object. The DiagramClientView 220 owns the state information such as the selection, zoom, and scroll position, and reroutes paint, keyboard, and mouse events to the Diagram 210 and the member shapes. DiagramClientView 220 can provide the control to draw upon and to capture events. The Diagram 210 and its shapes, on the other hand, are responsible for painting themselves and for responding to user interaction. This makes the implementation of DiagramClientView implementation very light weight and independent of any specific Diagram 210.

Figure 3:
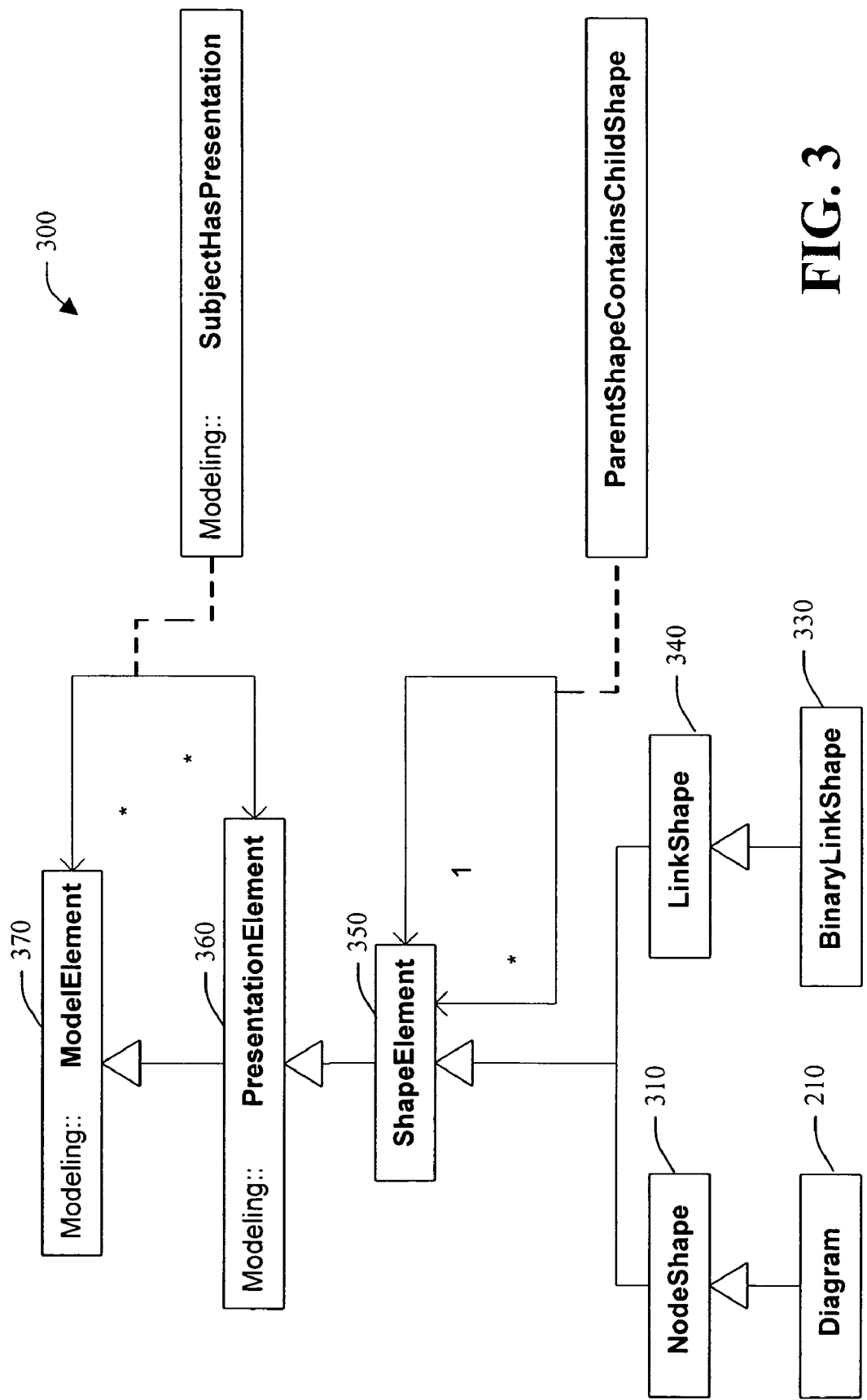
FIG. 3 is a block diagram of major classes of a diagram system in accordance with an aspect of the present invention.

The design surface operates on model(s) managed by an In-Memory-Store (IMS). The IMS core meta-model is extended to include diagram(s) and diagram shape(s). FIG. 3 illustrates an overview of major classes of a diagram system 300 in accordance with an aspect of the present invention. The system 300 includes a diagram class 210, a NodeShape class 320, a BinaryLinkShape class 330, a ShapeElement class 350, a PresentationElement class 360 and a ModelElement class 370.

In this example, the design is based on an existing PresentationElement 360 base class in the IMS. The PresentationElement 360 is a display element for zero or more ModelElement 370 derived classes. With a PresentationElement (PEL) 360 based design surface, the PEL 360 and corresponding object on the design surface are one and the same; therefore there are no synchronization issues between PEL 360 and another object on the design surface. This means that the developer doesn't have to create and maintain classes which mirror the PEL 360 classes. Rather than having some attributes & operations of a shape living in a PEL 360 and some other attributes/operations of the same shape living in another design surface object, the entire shape is embodied within a single class.

The ShapeElement class 350 is responsible for painting itself and responding to mouse action(s), hittest and/or keystroke(s). A ShapeElement 350 can have child shapes as noted by the ParentShapeContainsChildShape class 380.

The NodeShape class 320 is characterized by a Bounds property which defines its location and size. An example of a NodeShape 320 is a rectangle or an ellipse shape.

The BinaryLinkShape class 330 is a line with two endpoints.

The Diagram class 210 is a container of shapes which is associated with zero or more DiagramClientView control(s) 220 as discussed previously. The diagram class also inherits from NodeShape.

Custom Diagram(s)

Figure 4:
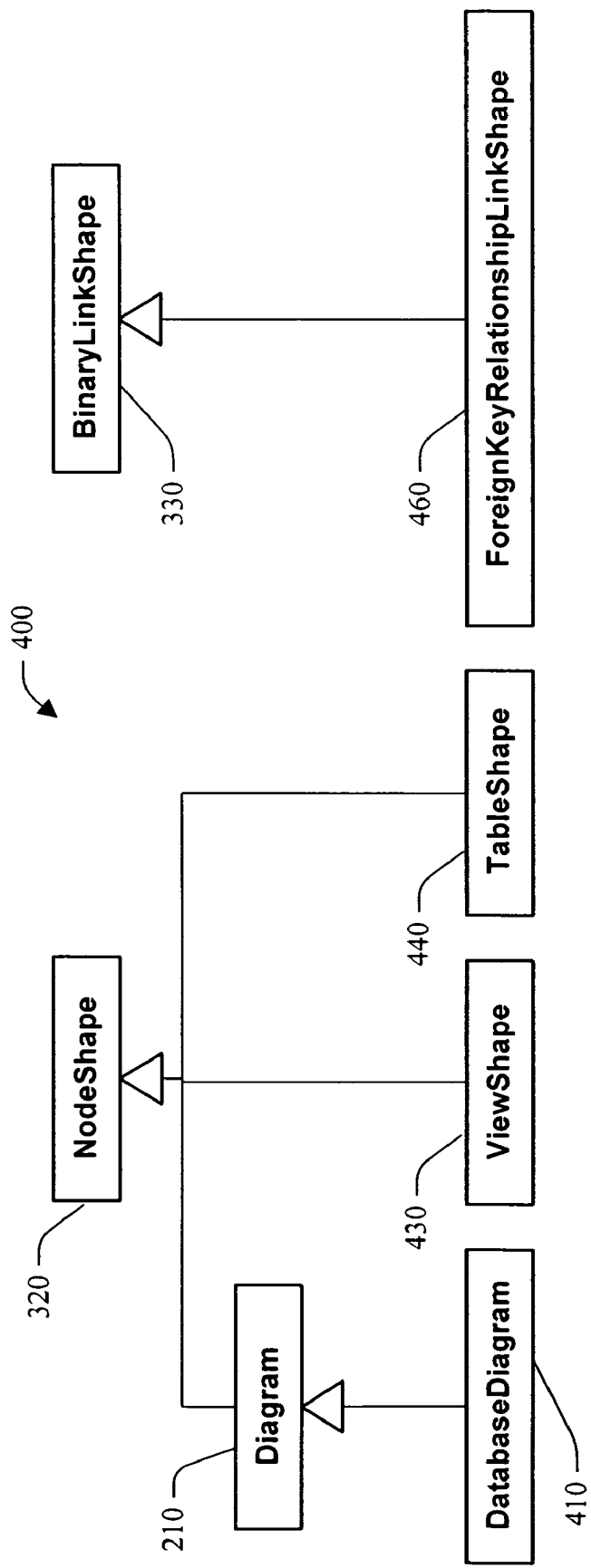
FIG. 4 is a block diagram of classes of an exemplary database diagram in accordance with an aspect of the present invention.

Custom diagram types are implemented by deriving from the Diagram class 210. Shapes specific to a custom diagram derive from the NodeShape 320 or BinaryLinkShape classes 330. FIG. 4 illustrates classes 400 of an exemplary database diagram in accordance with an aspect of the present invention. The classes 400 include a DatabaseDiagram class 410 derived from a diagram class 210, a ViewShape class 430 and a TableShape class 440. The diagram class 210, the ViewShape class 430 and the TableShape class 440 derive from a NodeShape class 320. Further, a ForeignKeyRelationshipLinkShape class 460 derives from a BinaryLinkShape class 330.

ShapeElement Class 350

The abstract ShapeElement class 350 is derived from PresentationElement 360 and represents the basic foundational class on the design surface.

The ShapeElement class 350 mimics the Control class 230 in the sense that it responds to mouse, keyboard, and/or paint event(s). These events are rerouted from the DiagramClientView 220. The DiagramClientView 220 creates new event argument(s) which carry more information than the standard event argument(s) as discussed below.

Referring briefly to FIG. 5, an exemplary ShapeElement class 350 in accordance with an aspect of the present invention is illustrated.

The ShapeElement class 350 can include a Geometry property which defines the outline of the shape. The Geometry property can be used to paint the shape, perform shape hit-testing, and perform "link folding" (which will be discussed later). To change the Geometry, this property can be overridden to return a different Geometry-derived object.

The ShapeElement class 350 can include StyleSet property which is the object by which operating system drawing resources are retrieved and managed. More details regarding the StyleSet property is the Managing Shape Appearance section below.

The ShapeElement class 350 can further include a ShapeFields property which returns a list of ShapeFields. A ShapeField is to a ShapeElement as a Control is to a dialog. For example, if a user wanted to display text or an image on a shape, the user can display the text or image using a ShapeField. More details regarding ShapeField are discussed below.

To add a child ShapeElement to a ShapeElement, the AddChild( ) method is called. An IMS parent-child relationship is created between the two shapes.

To create a custom shape, the shape developer does not derive directly from ShapeElement 350. Instead, the developer will derive from the NodeShape 320 or BinaryLinkShape class 330 and override the appropriate method(s).

The ShapeElement 350 can have more method(s) as discussed below.

NodeShape Class 320

Turning to FIG. 6, an exemplary NodeShape class 320 in accordance with an aspect of the present invention is illustrated. The NodeShape class 320 is characterized by a location and size which collectively define the bounds of the shape. This defines the bounding area in which the shape can draw and hittest. Although the bounds are rectangular, the shape does not have to be.

In this example, the NodeShape class has an AbsoluteBounds property which is implemented as an IMS property. The absolute bounds is relative to the top left corner of the diagram 210. The NodeShape class can also have a Bounds property which is relative to the top left corner of the parent shape. The Bounds property is calculated based on contained elements or other criteria that the implementation deems appropriate.

Figure 7:
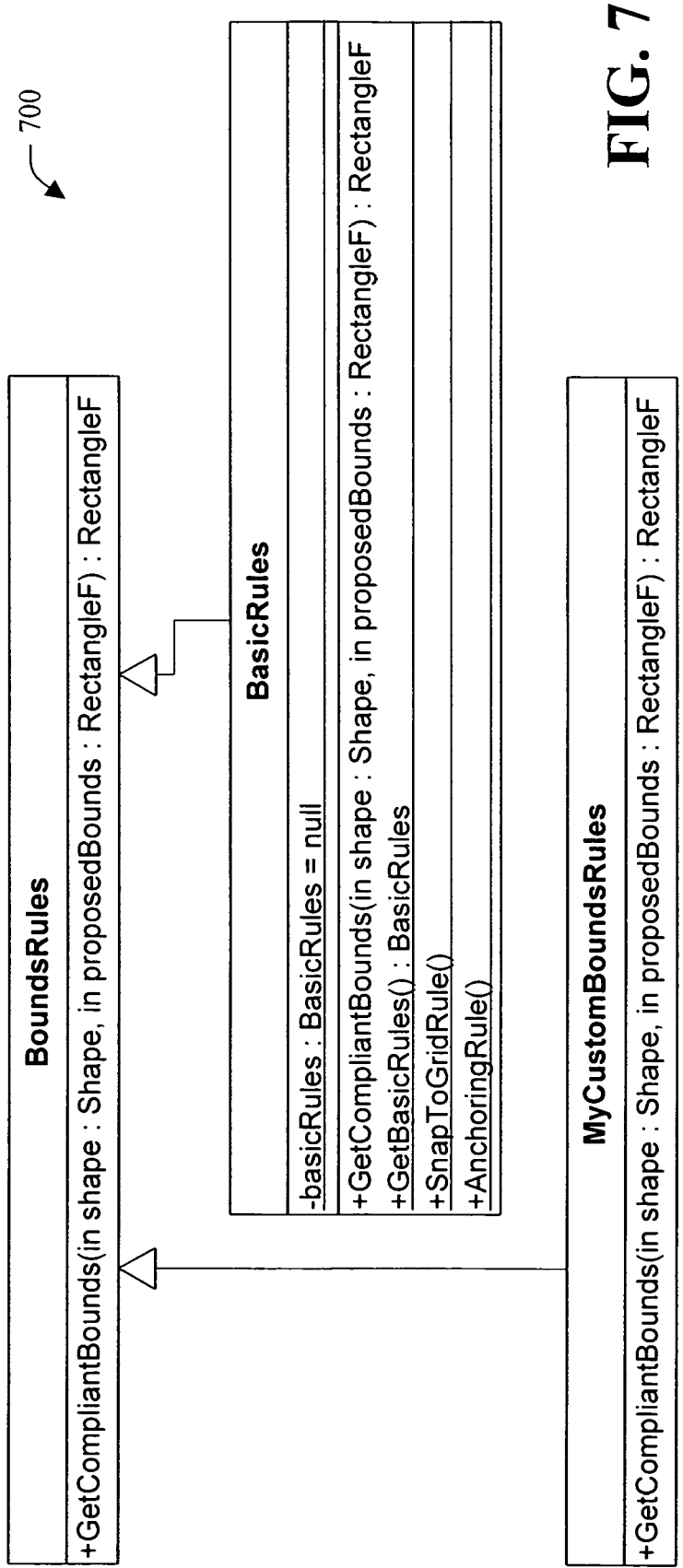
FIG. 7 is a diagram an exemplary BoundsRules class in accordance with an aspect of the present invention.

Referring briefly to FIG. 7, an exemplary BoundsRules class 700 in accordance with an aspect of the present invention is illustrated. A child shape class can have rules as to where it can be located and how large or small it can be sized. When the AbsoluteBounds property setter is called, the bounds are adjusted to comply with these rules. These rules can be defined in a BoundsRules-derived class, and the ShapeElement 350 class can have a BoundsRules property whose getter returns a valid BoundsRules object. The BoundsRules class has one method GetCompliantBounds whose responsibility it is to return a rectangle which complies with whatever bounds rules are in effect.

For example, by default, the BoundsRules property getter can return a reference to a BasicRules object which is a Singleton pattern capable of performing snap-to-grid and anchoring. A Singleton pattern is a creational pattern to dictate how and when objects get created—employed, for example, to ensure a class has only one instance, and provide a global point of access to it.

Diagram Class 210

Figure 8:
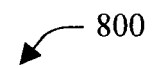
FIG. 8 is a diagram an exemplary diagram in accordance with an aspect of the present invention.

Next, turning to FIG. 8, an exemplary diagram 210 in accordance with an aspect of the present invention is illustrated. The Diagram class 210 is derived from the NodeShape class 320 primarily because it shares much of the same behavior. A Diagram 210 is different from a NodeShape 320 in primarily the following ways:

(1) The Diagram 210 contains the link to associated DiagramClientView 220 objects. A DiagramClientView 220 object is the actual control, which is intended to be a generic displayer of a Diagram 210 object and a receiver (and rerouter) of events. To associate the diagram 210 with a design surface, the Associate( ) method is called.

BinaryLinkShape Class 330

BinaryLinkShape class 330 represents the connection between two NodeShapes 320. BinaryLinkShape 330 derives from the ShapeElement 350 class and is responsible for the visual representation of a connector in the diagram 210. A connector refers to a physical and/or logical connection between two or more shapes.

Control-Less Shapes

This design does not use control as the base class for each shape as other conventional design surfaces have done in the past. Instead, the design surface of the present invention is a single control with control-less based shapes.

The control-less based design can lead to, for example:

(1) Lower usage of operating system drawing resources. Although a control-based shape can be faster to implement, it consumes one control per shape. A single diagram with 10,000 shapes would use 10,000 controls. Additionally, the number of shapes on the diagram is not restricted by a operating system drawing resource limit.

(2) Smaller memory footprint.

(3) Faster. With a control-based design, there is limited ability to optimize. For example, when zoomed out to show the entire diagram of 10,000 shapes, painting can be sluggish at best using a control-based design. With the system 100 (e.g., a control-less design), special purpose algorithms can, optionally, be employed to address performance issues on shape painting, hittesting, and/or updating.

(4) Greater control. Default shape behavior can be customized elegantly. Further deep optimizations can be achieved.

(5) Hittesting capability using conventional diagram system(s). In accordance with an aspect of the present invention, the system 100 can further include at least a portion of a convention, control-based design which can facilitate hittesting capability.

(6) Tight coupling with the core meta-model reduces synchronization issues. By not separating the subject elements (data) from the presentation elements (diagrams and shapes) 300, 360, 370, this synchronization issue is eliminated Graph Object In one example, the diagram class 210 employs a conventional diagram system graphic object to manage its graphic space. In this example, a diagram instance has exactly one graph object. The diagram's children can be mapped to graph layout objects, maintained by the graph object. This approach allows the diagram to delegate hittest queries, auto-layout (e.g., placement of shapes), and auto-routing (e.g., stream of coordinates that make up a path of a connector, for example BinaryLinkShape 330) to its graph object. Shapes contained in the diagram are mapped to a graph layout object; this allows the graph object to "see" the shapes on the diagram.

The Graph Object can further enable:

(1) auto-routing of connections (2) auto-layout of shapes (3) hit-testing through spatial queries (4) keyboard navigation through spatial queries (5) lasso-selection through spatial queries Each diagram element has a corresponding conventional graph object within its diagram's Graph object. The conventional graph objects maintain the spatial properties for a diagram element. The Graph Wrapper contains a series of maps that provide mappings between both sides of the interface, so that a ShapeElement can be queried for its GraphLayoutObject or query the GraphLayoutObject for its ShapeElement.

In one example, each Diagram contains a GraphWrapper Object which is responsible for maintaining consistency between the conventional graph object and the Diagram Shapes. In another example, the conventional graph object functionality integrates directly into the core meta-model so that it ultimately operates on Diagram Shapes, eliminating the duplication maintained by the conventional graph object.

In order to operate more effectively with the graph object and the objects that it supports, in one example, the following objects can be wrapped:

(1) Conventional graph.Graph is wrapped by GraphWrapper (2) Conventional graph.LayoutObject is wrapped by GraphLayoutObject (3) Conventional graph.Node is wrapped by GraphNode (4) Conventional graph.Edge is wrapped by GraphEdge This wrapper layer achieves several purposes:

(1) Complex operations that employ the graph objects highly granular interface can be hidden in a more useable API.

(2) Mappings between Shapes and GraphLayoutObjects can be maintained and hide the relationships between them in the wrapper classes.

(3) Lifetime issues are much better dealt with in this manner.

Figure 9:
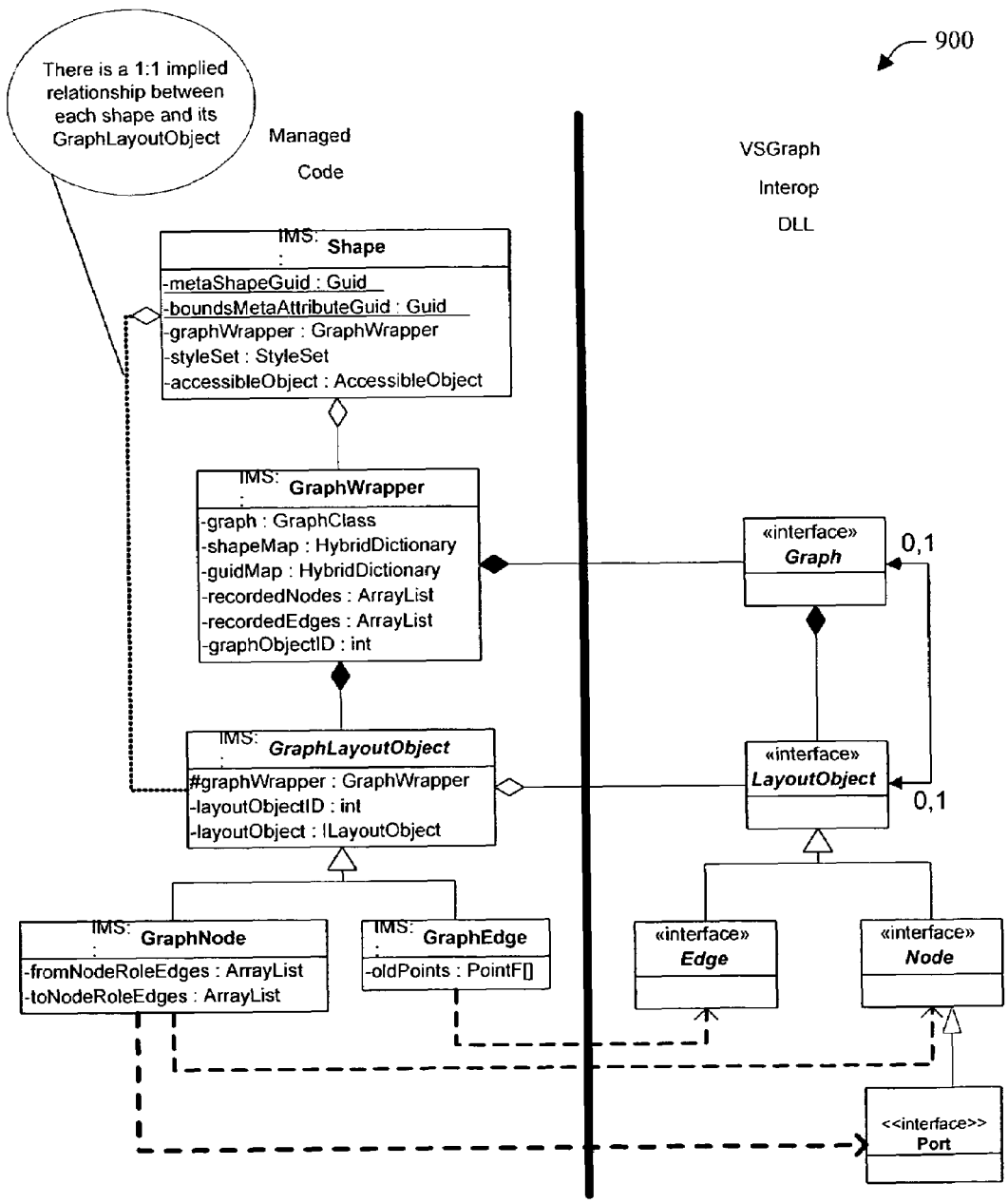
FIG. 9 is a block diagram of an exemplary system in which a diagram class employs a conventional diagram system graphic object to manage its graphic space in accordance with an aspect of the present invention.

FIG. 9 illustrates an exemplary system 900 in which a diagram class employs a conventional diagram system graphic object to manage its graphic space. As illustrated in FIG. 9, a LayoutObject may own a sub-graph.

Figure 10:
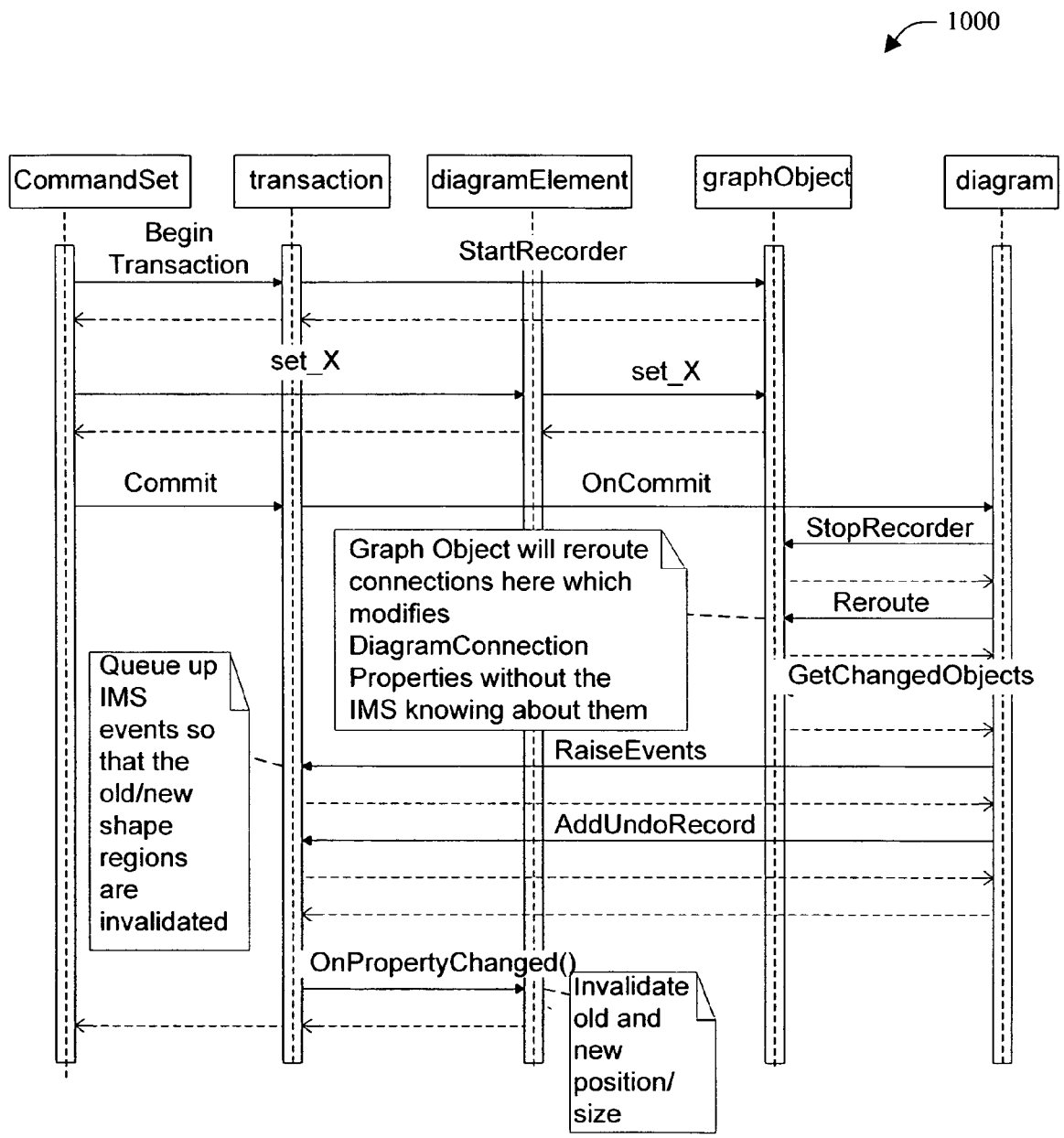
FIG. 10 is a sequence diagram of an exemplary process facilitating auto-layout and auto-routing in accordance with an aspect of the present invention is illustrated.

Referring briefly to FIG. 10, a sequence diagram 1000 of an exemplary process facilitating auto-layout and auto-routing in accordance with an aspect of the present invention is illustrated. For auto-layout and auto-routing, the graph object can modify the bounds of the shapes during a pre-commit phase without the IMS's knowledge. Before the pre-commit phase is done, the changed objects are retrieved from the graph object, and changed events can be artificially generated.

Responding to Object Model Changes: In-Memory Store (IMS) Rules

In one example, a model contains a SourceFile model element which can contain Component model elements through a SourceFile-contains-Component relationship. In this example, there exists a corresponding Diagram which can contain Component shapes. Finally, for every Component model element, a corresponding Component shape must exist on the diagram.

In this example, if a Component model element is added to the model, it is desired to reflect this change in the diagram by automatically generate the corresponding Component shape. If this were handled as an IMS Add event handler, a second undo record would be created for creating the Component shape, which is undesirable.

To move the creation of the Component shape into the same transaction as the creation of the Component model element, the shape developer can create an IMS rule instead. An IMS rule is similar to event handling except that it is executed within a transaction rather than after the transaction. In this particular example, the shape developer needs to listen to the creation of the SourceFile-contains-Component relationship.

Figure 11:
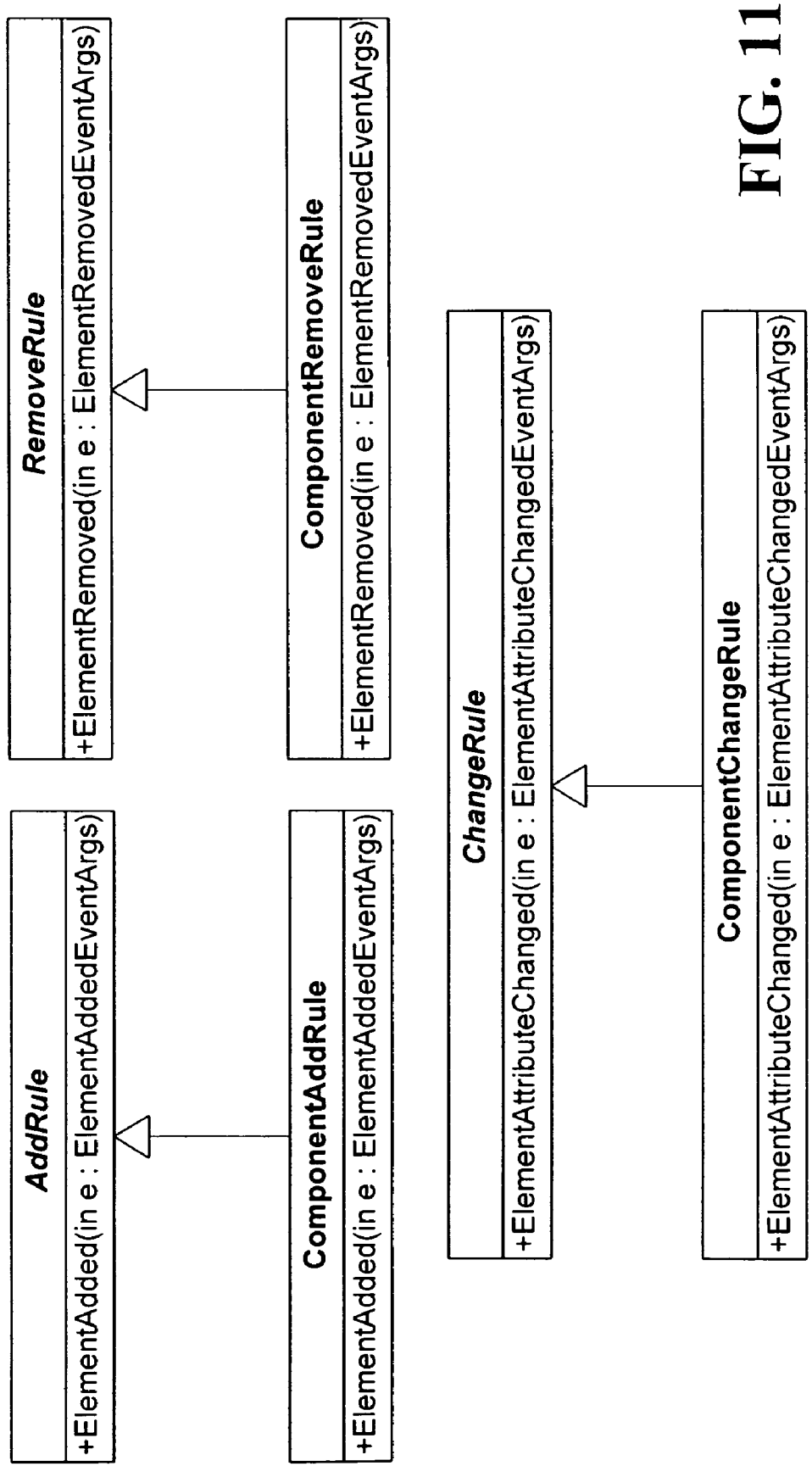
FIG. 11 is a diagram of AddRule, RemoveRule, and ChangeRule classes in accordance with an aspect of the present invention.

To create an IMS rule, the shape developer derives from the appropriate IMS base rule (AddRule, RemoveRule, or ChangeRule) and overrides the method (ElementAdded, ElementRemoved, ElementAttributeChanged) as illustrated in FIG. 11. In the example above, the ElementAdded method can respond by creating the Component shape.

To activate the rule for a particular class, add the RuleOn attribute above the rule-derived class, for example, employing C# syntax:

```
[RuleOn(typeof(SourceFileContainsComponent))]
public sealed class ComponentAddRule : AddRule
{
```

Layered Painting

In one example, the DiagramClientView.OnPaint method draws the design surface in layers in the following sequence:

(1) Paint shapes (2) Paint selection outlines and grab handles (3) Paint mouse action feedback (such as rubberband or resize feedback)

(4) Paint Ole drag/drop feedback

This layering permits performance optimizations. More details are provided in the Managing Shape Appearance section below.

Painting Performance Optimization

For example, painting can be optimized by the following techniques:

(1) Draw only the shapes within the invalid rectangle. By using the rectangle hittesting functionality of the graph object to find the shapes, this simple optimization will iterate only those shapes rather than starting with the root shape (the Diagram) and recursively calling DoPaint on its child shapes.

(2) Use a shadow bitmap. This will enable faster redraw as the shapes don't have to be individually redrawn using their own DoPaint methods. Instead, it's a snapshot of the drawing surface without the selection drawing and mouse feedback.

(3) Greeking.

(4) Painting by bands. This addresses the case where the user grabs the scroll thumb and moves through the diagram quickly. It allows for the canceling of partial painting if another scroll event has been detected.

ShapeFields and Properties

A single shape can include displayable item(s), for example, a name, an image and the like. Unlike subshapes, these items are typically not selectable nor do they correspond to any Element. Rather, these items generally correspond to properties of the shape or properties of the corresponding element and can optionally be editable. When one of these items is clicked on, it can potentially receive focus, but it is desirable that the shape itself remain selected and not the item.

Figure 12:
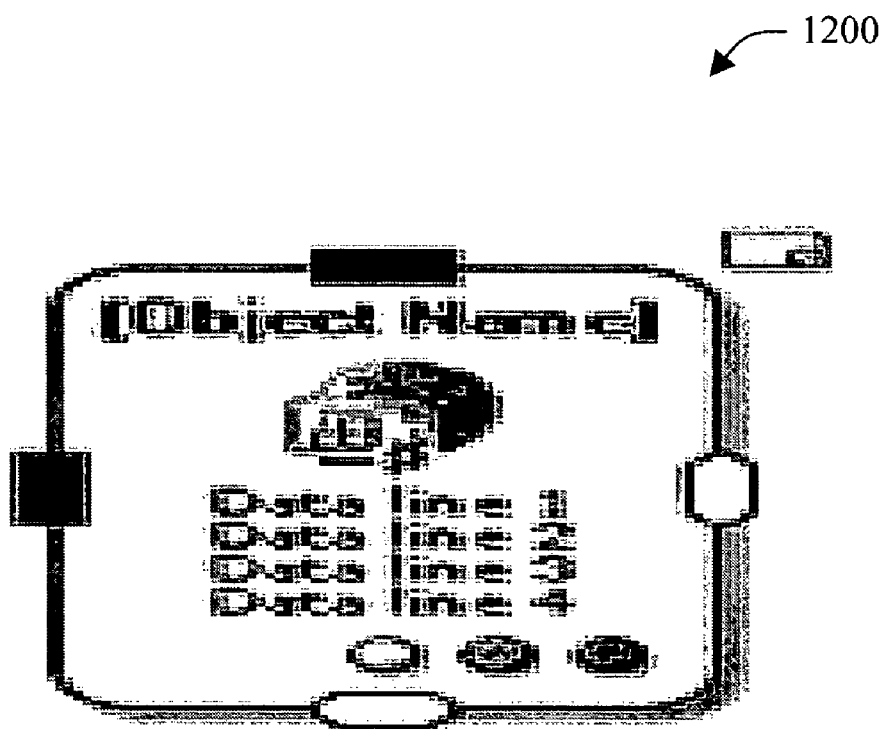
FIG. 12 is a diagram of a WebService shape in accordance with an aspect of the present invention.

Referring briefly to FIG. 12, a WebService shape 1200 includes an object name, an image, a list of data lines, and indicator "lights." The sub shapes that are along the perimeter and outside of the component shape can be disregarded for purposes of discussion.

By clicking on the object name, it is expected the WebService shape itself to be selected. If the object name is editable, it is expected that a blinking caret will appear with the object name highlighted. By pressing the tab key, it is expected that the focus will be moved to the next item within the shape, namely the data lines. All the while, the WebService shape 1200 remains selected and the content of the property browser remains unchanged.

These items can be implemented as shape. In this example, to be useful, the shape field includes at least some of the following characteristics:

(1) Ability to paint itself.

(2) Ability to provide hittest information (e.g., the field may be a circle, so clicking in its bounding rectangle may not necessarily mean it was hit.)

(3) Reuse of PropertyDescriptors (e.g., created for the Property Browser).

(a) Support GetValue and optionally SetValue.

(b) If the property is editable, then support GetEditor.

(4) Lightweight in terms of memory and resource usage.

The shape fields can be able to support the following properties:

Value

Bounds (x, y, width, height) that define position and size within the parent shape.

Visibility

Editability (is the field in-place editable?)

CanFocus (can the field receive the focus?)

Font

Pen

Brush

Text formatting (alignment, bold, italics, etc)

Geometry

To keep the shapes lightweight, ShapeFields describe these properties rather than store instance information. For example, the "value" property can be described using an IMS property and the "bounds" property can be described by anchoring styles. By doing so, ShapeFields can be static members of a Shape-derived class.

Figure 13:
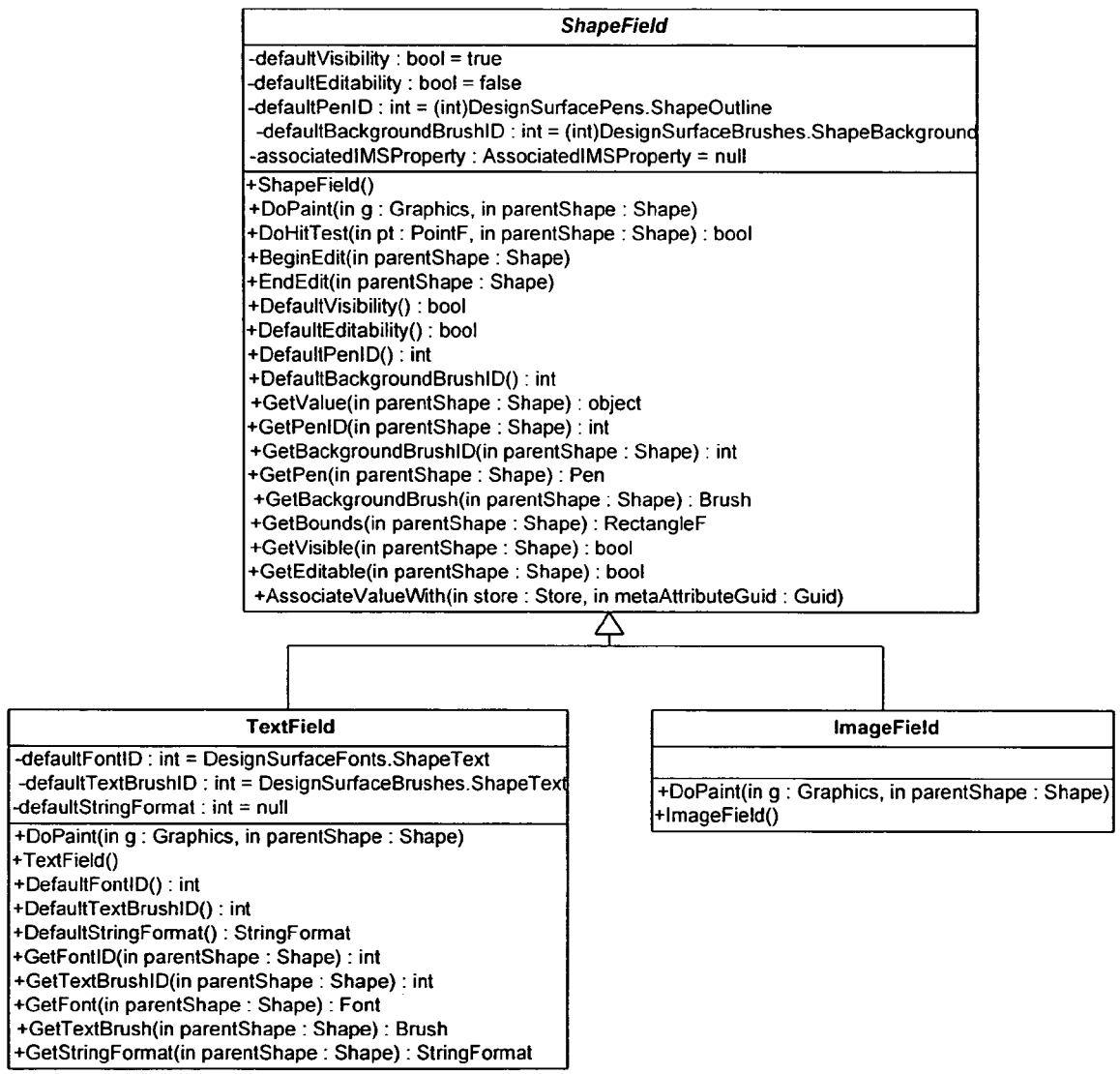
FIG. 13 is a diagram of an exemplary abstract ShapeField class in accordance with an aspect of the present invention.

Referring briefly to FIG. 13, an exemplary abstract Shape-Field class 1300 in accordance with an aspect of the present invention is illustrated.

In this example, the Get methods (GetVisible, GetFontID, etc.) are virtual methods which return the default value (DefaultVisibility, DefaultFontID, etc.). The default values are settable. Because shape fields are intended to be static, these default values affect the shape class, not the particular shape instance.

To customize the behavior of the shape field, the shape developer can derive a new class from ShapeField or any other ShapeField-derived class. Then the Get methods can be overridden to create customized behavior.

In this example, the "Associated IMS Property" functionality is part of the base ShapeField class because it eliminates the need for a dual class hierarchy, one with a base class that has an associated IMS Property and one with a base class that is not.

Associated IMS Property

In one example, it is expected common practice is to display IMS properties on the shapes, such as "Name." An IMS property is a MetaAttribute of a ModelElement. A MetaAttribute is the description of property on the ModelElement.

The ShapeField is capable of rendering an IMS property based on its domain type. It is also able to respond to property changed events and update appropriately. Because not all ShapeFields need this functionality, it can be placed in its own class and instantiated only as needed. To instantiate this class, the shape field's AssociateValueWith( ) method is called which takes a MetaAttribute guid. This will instantiate the class, subscribe to the property changed events and invalidate the proper shape(s) upon receiving the PropertyChanged events.

Referring back to FIG. 12, the WebServiceShape 1200 needed to draw the name in the shape. To do so, the InitializeShapeFields( ) method of the WebServiceShape 1200 instantiates a TextField, sets any default(s), and associates the value with the appropriate IMS property. Again, these shape fields are static; the shape fields only exist on a per class basis. For example:

TABLE 1

```
static TextField nameField = null;
protected override void InitializeShapeFields( ShapeFieldCollection
shapeFields )
{
    TextField nameField = new TextField( );
    nameField.DefaultFontID = DesignSurfaceFonts.ShapeTitleText;
    nameField.AssociateValueWith( Store,
WebServiceShape.NameMetaAttributeGuid );
    shapeFields.Add( nameField );
    // continue adding other shape fields...
}
```

Proxy Property

Typically, the property that the shape needs to display is not found on the shape itself, but rather on another MEL 370 elsewhere. For example, the WebServiceShape 1200 can maintain the Name property on a WebService element rather than on the WebServiceShape 1200 as the previous example showed. In one example, to support such a scenario, the IMS support for a proxy property is taken advantage of. The proxy property will point to the real property by adding the attributes as shown. For example,

TABLE 2

```
[MetaAttribute(
XPathExpression="/WebServiceShape/ElementHasDisplay.Subjects/
Subjects",
RealAttributeName="Name",
ReverseXPathExpression="/WebService/
ElementHasDisplay.Presentations/Presentations",
ProxyAttributeName="Name")]
[StringDomain( )]
[MetaObject("DD74DBDE-C032-4773-8854-7838AB947906", "Name")]
public String Name
{
get
{
return
(string)GetAttributeValue(WebServiceShape.NameMetaAttributeGuid);
}
set
{
SetAttributeValue(WebServiceShape.NameMetaAttributeGuid, value);
}
}
```

In this example, the WebServiceShape 1200 has a Name proxy property which points to the real Name property on the WebService. The WebService can be found by traversing from the WebServiceShape, across the ElementHasDisplay relationship, and to the instance that plays the Subjects role using the XPathExpression. Once the instance is found, the RealAttributeName is used to identify the property from which to get the value.

The XPathExpression provides the forward traversal path from the shape containing the proxy property to the element containing the real property. A description of the path is necessary because the shape field is static and only describes behavior. If a shape field instance existed for every shape instance, the path would not need to be described.

When the real property changes, the shape needs to be notified. To do so, the real property's changed event could be individually subscribed for every shape instance. But that has the downside of consuming memory for each shape and defeats the flyweight design pattern of the shape field. An alternative is to subscribe once per shape type. The lone event handler then runs a reverse traversal from the element containing the real property to the shape(s) containing the proxy property. This is specified by the ReverseXPathExpression. Since XPath expressions don't provide a means of reversing a path, the reverse XPath expression must be explicitly provided.

The forward XPathExpression and the ReverseXPathExpression both have the syntax of:

"/" meta_class_name {"/" meta_relationship_name "." meta_role_name "/" meta_role_name} where:

the meta_class_name is either:

the name of the class that contains the proxy property for the forward XPathExpression.

the name of the class that contains the real property for the ReverseXPathExpression.

In both cases, a derived class name cannot be supplied; it must be the class that actually contains the proxy or real property that supplies it.

The meta_relationship_name is the name of the relationship class to be traversed. A typical meta relationship class is ElementHasDisplay, which has the role SubjectHasPresentations. This is the relationship that associates a MEL 370 with a PEL 360. Another typical meta relationship class is Containment. This is the relationship that associates a parent shape with a child shape.

The meta_role_name is the name given to one of the roles in the relationship. Subjects in the meta-relationship class ElementHasDisplay is an example of a meta_role_name.

In one example, to associate a proxy property with a Shape-Field, the following ShapeField method is called:

public void AssociateValueWith(Store store, Guid proxyMetaAttributeGuid, Guid realMetaAttributeGuid)

Bounds Behavior

To specify how shape fields are to be laid out within a shape, the bounds behavior of each shape field is set. Bounds behavior is used to describe the positions and sizes of a shape's shape fields, regardless of the shape's actual size. This allows a developer to specify the layout of a shape's shape fields without knowledge of the exact size of the shape. It also makes resizing the shape a non-issue.

As an example, when a shape is sized smaller than the combined minimum widths of its shape fields, the shape fields are laid out from top to bottom, left to right using the minimum heights and minimum widths provided, and clipped to the bounds of the shape.

Figure 15:
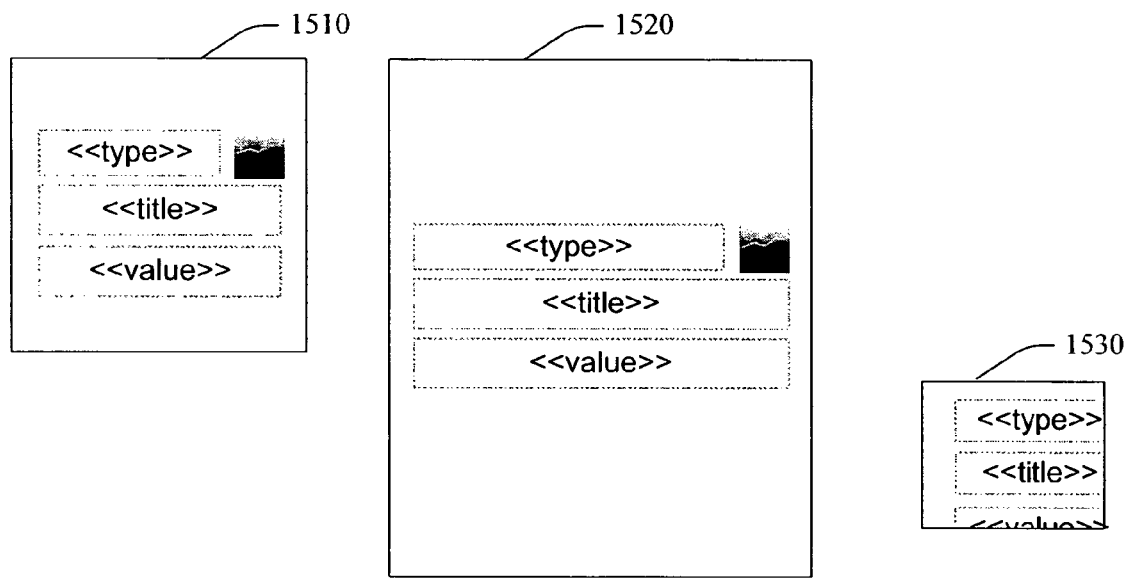
FIG. 15, is a diagram of views of a shape in accordance with an aspect of the present invention.

Referring to FIG. 15, a first view of a shape 1510 is illustrated. In this example, the shape's field layout can be described via the bounds behavior's of the shape fields. For example: (1) center the title shape field vertically, (2) make it one line tall, and (3) make it stretch as the shape's width is changed. On the line above the title, display the type and an icon shape fields, anchor the icon to the left side of the shape, and stretch the type between the right side of the shape and the icon. A second view of the shape 1520 and a third view of the shape 1530 are further illustrated.

Exemplary code is:

TABLE 3

```
public class MyShape : Shape
{
    :
protected override void InitializeShapeFields( ShapeFieldCollection shapeFields )
{
const private float fiftyPercent = 0.50F;
const private float horizontalMargin = 0.125F; //⅛th inch
const private float verticallMargin = 0.125; // ⅛th inch
const private float iconSize = 0.25.0F; // quarter inch
const private float oneInch = 1.0F; // one inch
    // Set the height of the title field to one line tall. Anchor it to stretch between the left and
    // right edges of the shape, leaving an 8 unit margin. Finally, center the field between the
    // top and bottom edges of the shape.
    ShapeField titleField = new TextField( );
    titleField.BoundsBehavior.MinimumHeightInLines =1.0F;
    titleField.BoundsBehavior.MinimumWidth = oneInch;
    titleField.BoundsBehavior.AnchorLeftTo(Edge.Left, horizontalMargin);
    titleField.BoundsBehavior.AnchorRightTo(Edge.Right, horizontalMargin);
    titleField.BoundsBehavior.CenterVertically(fiftyPercent);
    titleFieldKey = shapeFields.Add( titleField );
    // Set the size of the icon field to be 16x16, and Anchor it to the right side of the shape,
    // leaving an 8 unit margin.
    ShapeField iconField = new ImageField( );
    iconField.BoundsBehavior.MinimumWidth = iconSize;
    iconField.BoundsBehavior.MinimumHeight = iconSize;
    iconField.BoundsBehavior.AnchorRightTo(Edge.Right, horizontalMargin);
    iconFieldKey = shapeFields.Add( iconField );
    // Set the size of the type field to be one line tall. Anchor it to stretch between the left edge
    // of the shape, and the left edge of the icon field, leaving an 8 unit margin on each side.
    // Also, anchor the shape vertically to the title field, leaving a 4 unit vertical margin.
    ShapeField typeField = new TextField( );
    typeField.BoundsBehavior.MinimumHeightInLines = 1.0F;
    typeField.BoundsBehavior.MinimumWidth = oneInch;
    typeField.BoundsBehavior.AnchorLeftTo(Edge.Right, horizontalMargin);
    typeField.BoundsBehavior.AnchorRightTo(Edge.Left, iconField, horizontalMargin);
    typeField.BoundsBehavior.AnchorBottomTo(Edge.Top, titleField, verticallMargin);
    typeFieldKey = shapeFields.Add( typeField );
    // Set the size of the value field to be one line tall. Anchor it to stretch between the left and
    // right edges of the shape, leaving an 8 unit margin on each side.
    // Also, anchor the shape vertically to the title field, leaving a 4 unit vertical margin.
    ShapeField valueField = new TextField( );
    valueField.BoundsBehavior.MinimumHeightInLines = 1.0F;
    valueField.BoundsBehavior.MinimumWidth = oneInch;
    valueField.BoundsBehavior.AnchorLeftTo(Edge.Right, horizontalMargin);
    valueField.BoundsBehavior.AnchorRightTo(Edge.Right, horizontalMargin);
```

TABLE 3-continued

```
    valueField.BoundsBehavior.AnchorTopTo(Edge.Bottom, titleField,
verticallMargin);
        valueFieldKey = shapeFields.Add( valueField );
    }
```

Thus, in accordance in an aspect of the present invention, the bounds of a shape field are not set—instead, its bound behavior are specified.

Bounds Behavior Implementation

In one example, the shape field has exactly one private instance of bounds behavior. The bounds behavior class defines its anchors and springs with internal visibility so that ShapeField's GetBounds(Shape parent) (not pictured) can access them to calculate the shape field's size and position. Referring to FIGS. 16 and 17, an exemplary BoundsBehavior class 1600 in accordance with an aspect of the present invention is illustrated.

The BoundsBehavior class 1600 includes four methods: SetLeftAnchor, SetTopAnchor, SetRightAnchor, and SetBottomAnchor. Alternatively, one method SetAnchor, which takes as its first parameter an AnchorSide enum (Left, Top, . . . ) can be employed.

Figure 18:
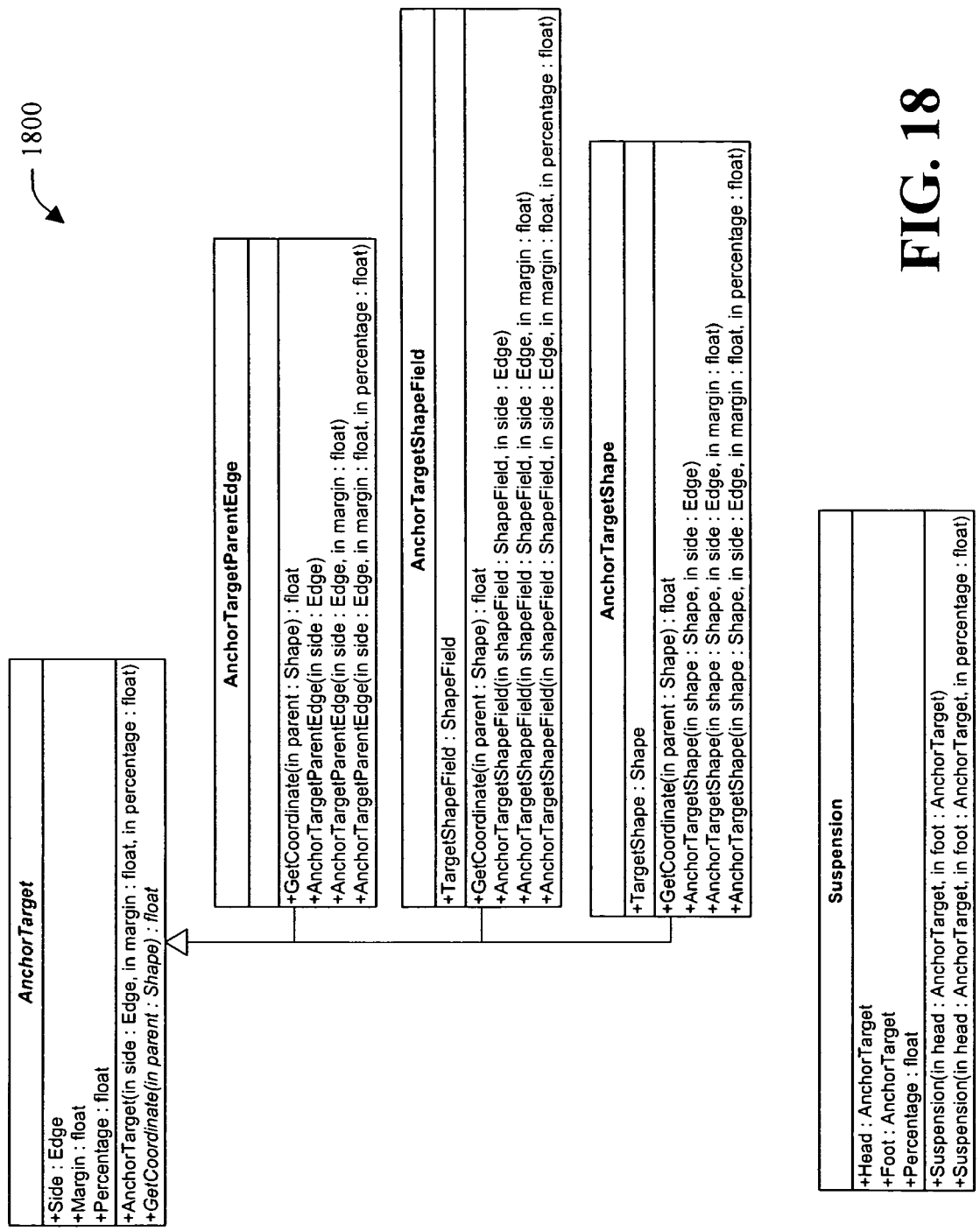
FIG. 18 is a diagram of an exemplary AnchorText class in accordance with an aspect of the present invention.

Next, referring to FIG. 18, an exemplary AnchorText class 1800 in accordance with an aspect of the present invention is illustrated. Anchor targets specify WHAT to anchor to, and WHERE to anchor to it. An anchor target can be shape field's parent shape (AnchorTargetParentEdge), a sibling shape field (AnchorTargetShapeField), or a sibling shape (AnchorTargetShape.) For any anchor target, the side to anchor to is specified, and the margin specifies how far from that edge to anchor. Specifying an anchor target percentage allows targeting of the center (50%) of a shape as the anchor point. A suspension object is used to implement CenterVertically and CenterHorizontally. A suspension takes two anchor targets, and a percentage which indicates how to center it (50%, the default, would center the shape field, 33% would position the shape ⅓ of the way between the two anchors.

In Place Editing

FieldTextEditor

In one example, FieldTextEditor is an internal control, generally one instance per DiagramClientView 220, to edit the various text fields throughout the diagram 210. It can either be shown/hidden or created/destroyed each time editing begins and ends. The control is derived from the RichTextBox so that the text font appears the same while editing as it does while displaying.

void TextField.BeginEdit( )

void TextField.BeginEdit(PointD cursorPosition)

Begin editing: (invoked, for example, by F2, double-clicking, "rename" command):

(1) The view auto-scrolls:

Top-left of field is scrolled into view if it is not already. The control is positioned at the top-left of the field.

Overlapping Shapes:

To avoid the case where focused text is partially or entirely covered by another shape, the following z-order (e.g., drawing order) change can be performed:

If a shape (or a field or subfield within that shape) is selected or has focus, the shape is temporarily brought to the top of the z-order. When the user deselects the shape or the focus moves to another shape, the shape returns to its original z-order.

If more than one shape is selected, only the primary shape in the selection is temporarily brought to the top of the z-order.

PropertyDescriptor driven

In-place editing can be supported on text fields that are bound to IMS properties.

In-place editing uses the ElementPropertyDescriptor of the ModelElement for:

GetValue: Getting the value to display/edit.

SetValue: Setting the value.

IsReadOnly: Determines whether the field is editable or not.

GetEditor: Retrieving the UITypeEditor when the builder button and drop down button are supported.

Miscellaneous: Text for a tooltip (e.g., Name, DisplayName, Description).

The shape developer can alter the default editability of the text field by performing the following:

Override ModelElement.CreatePropertyDescriptor to return a custom property descriptor with the IsReadOnly property overridden.

Add the System.ComponentModel.ReadOnly attribute to the property.

Programmability:

To alter the default editability of the text field:

Override ModelElement.CreatePropertyDescriptor to return an ElementPropertyDescriptor-derived class with the IsReadOnly property overridden.

Add the System.ComponentModel.ReadOnly attribute to the property.

By default, the text field will be read/write if:

(1) its associated IMS property has a property setter, (2) its associated IMS property has the Browsable attribute set to true, and (3) its associated IMS property does not have a ReadOnly attribute, or if it has one, it is set to false.

ElementPropertyDescriptor.GetValue can be called to get the value.

ElementPropertyDescriptor.SetValue can be called to commit the value.

Nested Shape

Nested shapes allow designers to show containment relationships of ShapeElements 350 in the Core Design Surface. To model some relationships, like nested classes and compound component types, ShapeElements 350 have the ability to fully contain other shape(s) and hide/show them as the user selects. In order, to support this functionality—the ability to affect the parent's size and plowing—it has to be fully integrated with other auto-sizing and placement features in the design surface.

"Nest shape" refers to a ShapeElement 350 fully contained within another ShapeElement 350. "Designer(s)" refer to application(s) derived from the core design surface that implement their own unique meta-model and functionality. Further, "plowing" refers to moving other shape(s) out of the way so they don't overlap.

Public Interfaces and Programmability

Nested shapes provide auto fixup code that is run when a ShapeElement's 350 Bounds is updated. For example:
1. Pel fix-ups from drag-drop/copy/paste
2. Shape plowing
3. OnBoundsFixup
4. Auto-sizing of parent
5. OnBoundsFixup
6. Shape anchoring
7. Routing lines For nested shapes, most of the functionality is automatically done by the design surface, so there are only a few points of integration with for designers.

Adding NestedShape to Parent

Adding a nested shape to its parent is a matter of adding it to the appropriate collection.

```
// first, create new child shape.
MyShape myChildShape =
Store.ElementFactory.CreateElement(typeof(MyShape));
// for simplicity, let's start with the diagram.
NodeShape myParentShape = Diagram;
myParentShape.NestedChildShapes.Add(myChildShape);
```

Making ShapeField Size-to-Content

The AnchorTargetSizeToContent works similarly to the other AnchorTargets. It is set on the right or bottom of a ShapeField, depending on which direction it is desired for the content to flow.

```
public class MyShape : NodeShape
{
    public override void InitializeShapeFields
    {
        // Create NameField
        TextField nameField = new TextField( );
        if(layout.TitleFieldAssociation!=null)
        nameField.AssociateValueWith(Store,
MyShape.NameMetaAttributeGuid,
NamedElement.NameMetaAttributeGuid);
        // setup the NameField presentation information.
        nameField.DrawBorder = false;
        nameField.DefaultPenID =
DiagramPens.ShapeTitleOutline;
        nameField.FillBackground = false;
        nameField.DefaultBackgroundBrushID =
DiagramBrushes.ShapeTitleBackground;
        nameField.DefaultFontID =
DiagramFonts.ShapeTitle;
        StringFormat nameFieldStringFormat = new
StringFormat( StringFormatFlags.NoClip );
        nameFieldStringFormat.Alignment =
layout.TitleTextAlignment;
        nameFieldStringFormat.LineAlignment =
StringAlignment.Near;
        nameFieldStringFormat.Trimming =
StringTrimming.EllipsisCharacter;
        nameField.DefaultStringFormat =
nameFieldStringFormat;
        // set the ShapeField anchoring.
        nameField.AnchoringBehavior.SetTopAnchor(AnchoringBehavior.Edge.Top);
        nameField.AnchoringBehavior.SetLeftAnchor(AnchoringBehavior.Edge.Left);
        nameField.AnchoringBehavior.SetRightAnchor(AnchoringBehavior.Edge.Right);
        // set the size to content anchor.
        nameField.AnchoringBehavior.SetBottomAnchor(0.25);
        nameField.AnchoringBehavior.MinimumHeightInLines
= 1;
        // add the NameField to the shapeFields
```

```
-continued collection for this ShapeElement.
        nameFieldKey = shapeFields.Add(nameField);
    }
}
```

Make ShapeElement Plowable

In order to make a ShapeElement plow other shape(s), the WillPlow property is overridden:

```
public class MyShape : NodeShape
{
    public override bool WillPlow
    {
        get
        {
            return (this.NestedChildShapes.Count > 0);
        }
    }
}
```

Responding to OnBoundsFixup

The OnBoundsFixup method can be overridden to customize position and/or size based on the BoundsRules set up for the particular NodeShape:

```
public class MyShape : NodeShape
{
    public override OnBoundsFixup(CustomModelEventArgs
e)
    {
        // apply the snap-to-grid bounds rule.
        RectangleD newBounds =
this.BoundsRules.GetCompliantBounds(this.Bounds);
        if (newBounds != this.Bounds)
        {
            this.Bounds = newBounds;
        }
    }
}
```

Nested Children Detailed Design

Figure 19:
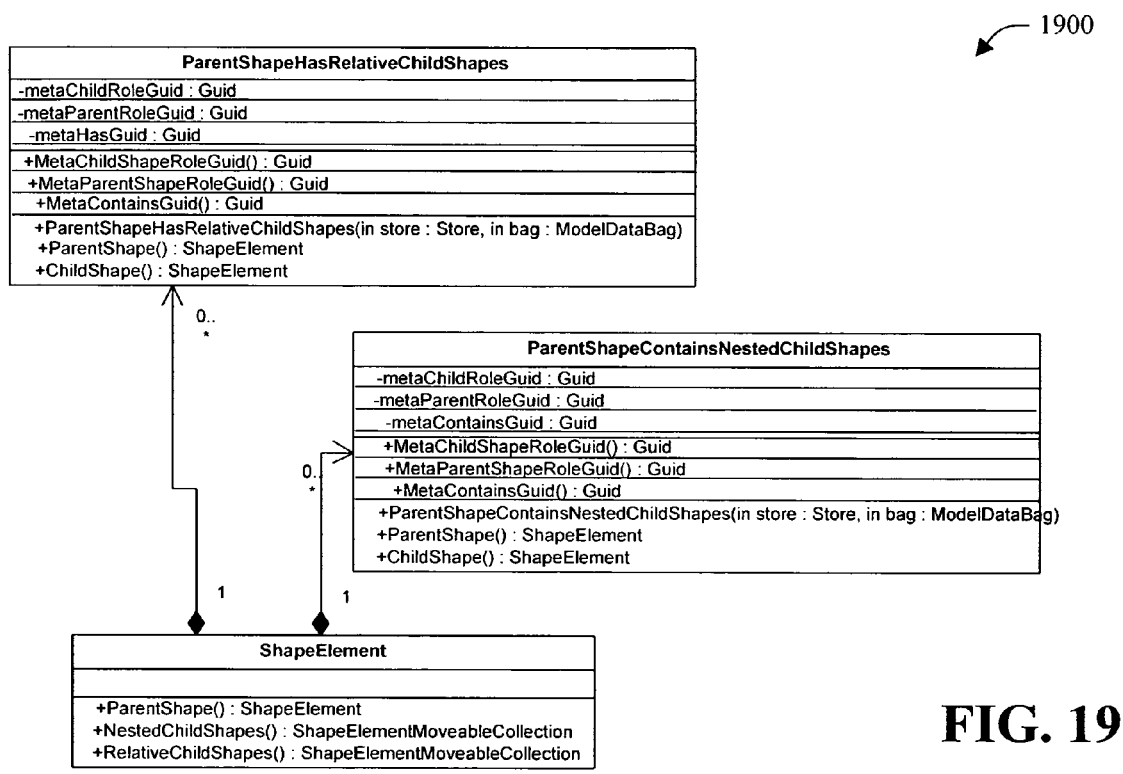
FIG. 19 is a diagram of an exemplary ParentShapeHasRelativeChildShapes class in accordance with an aspect of the present invention.

Referring next to FIG. 19, an exemplary ParentShapeHasRelativeChildShapes class 1900 in accordance with an aspect of the present invention is illustrated.

Nested shapes are ShapeElements 350 with a particular relationship with other ShapeElements 350 that restrict them to be fully contained within their parent. Nested children contained within a parent ShapeElement 350 can be represented by the ParentShapeContainsNestedChildShapes relationship. This relationship contains ParentShape and NestedChildShape role players. For example, they can be accessed on a ShapeElement through the ParentShape and NestedChildShapes properties.

Adding to NestedChildShapes

In one example, in order to add or remove ShapeElements 350 from the NestedChildShapes collection, the ShapeElement class 350 does not expose additional methods. Since NestedChildShapes is a ShapeElementMoveableCollection, child shapes in this relationship can be added by calling the Add method on the collection (e.g., same thing for Remove). If the ShapeElement 350 is already parented to a different shape (e.g., it already has a ParentShape role player), then the original relationship is broken first, and the new relationship is established. A re-parented ShapeElement 350 can disconnect any BinaryLinkShapes 330 connected to it as part of this operation as well. In this example, it is up to the designer to re-establish appropriate connections as they are required.

parent.NestedChildShapes.Add(myShape);

Child shape(s) of the ShapeElement that is added are moved along with it to the new ParentShape.

Auto-size and Positioning

Nested shapes support several auto-size and positioning features. These features are fully integrated with other positioning code (e.g., PEL fixup code and bounds rules) that can also change the position or size of a shape. The following are additional exemplary auto-size/positioning features for nested shapes and a description of how these integrate together to figure out the final position and size of a ShapeElement 350.

Order of Auto-Size/Positioniong Rules

In this example, the overall order in which the auto-size and positioning occurs is important and can be integrated with other features that create or delete PresentationElements 360 from the design surface. The following is an exemplary list of the priority order in which rules will be processed. These design surface related priorities can be in the ViewFixupConstants class.

1. ModelElement(s) 370 and/or PresentationElement(s) 360 are creates and/or deleted; properties are updated;
2. PresentationElement(s) 360 fix up 1: PresentationElement(s) 360 are created and/or deleted;
3. PresentationElement 360 fix up 2:
   PresentationElement(s) 360 are positioned;
   Bounds fix up called.
4. Plow and Auto-size parent:
   Plow sibling shape(s) that require it.
   OnBoundsFixup called
   To fit shape field sizes—grows/shrinks (e.g., Size-to-content).
     Text changed
     Font changed
   To satisfy minimum size to contain nested shapes (e.g., Auto-size parent).
   OnBoundsFixup called.
   Changes occur at child leafs first and work their way up the hierarchy.
5. Auto-position/size self-based on shape anchoring.
   In order of dependency, which means parent is auto positioned/sized first and then works down the hierarchy.
6. Routing.
7. The process then returns to step 3 and will repeat until the solution becomes quiescent (e.g., no values change or trigger rules firing)—or up to N times where N is the maximum number of iterations allowed (to avoid looping infinitely).

AutoFixup Custom Rules

Figure 20:
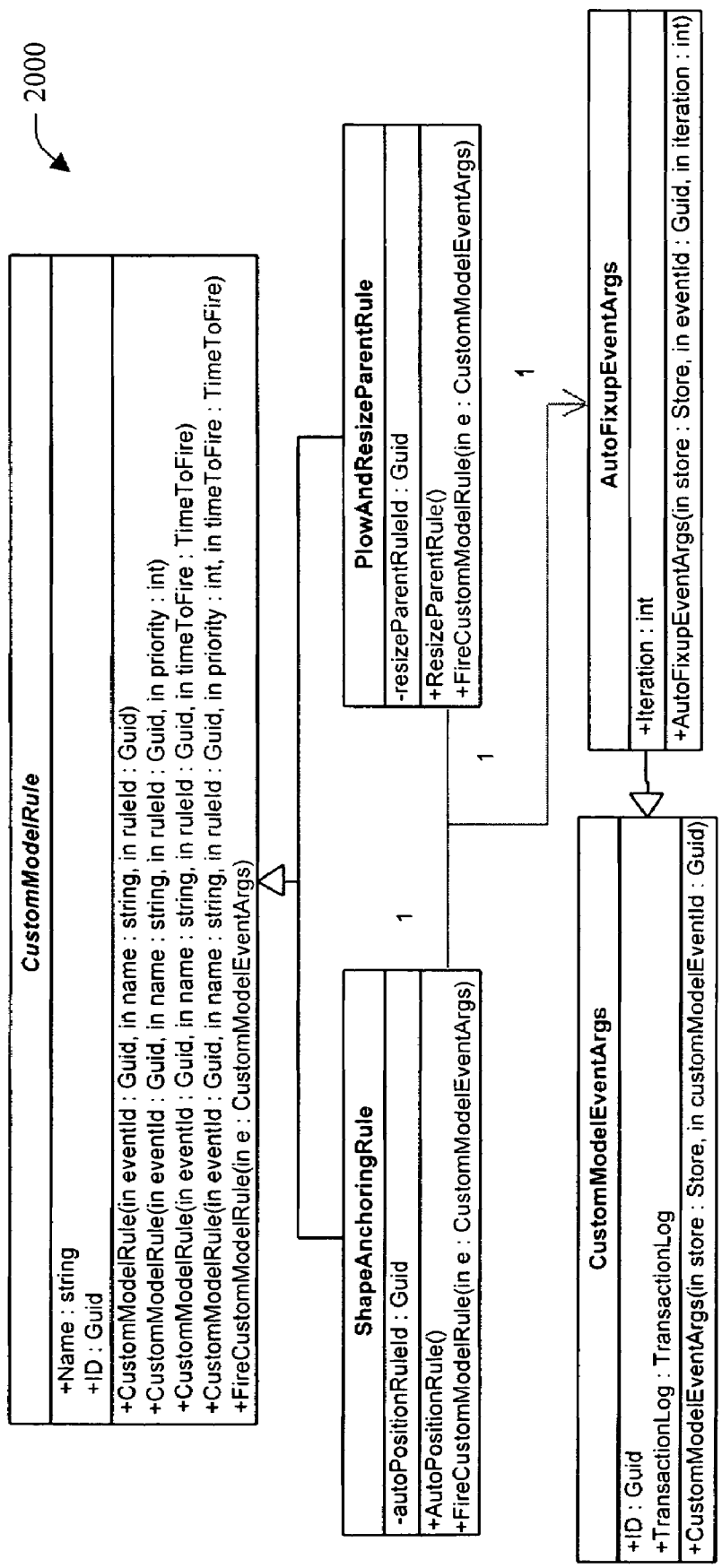
FIG. 20 is a diagram of an exemplary CustomModelRule class in accordance with an aspect of the present invention.
Figure 21:
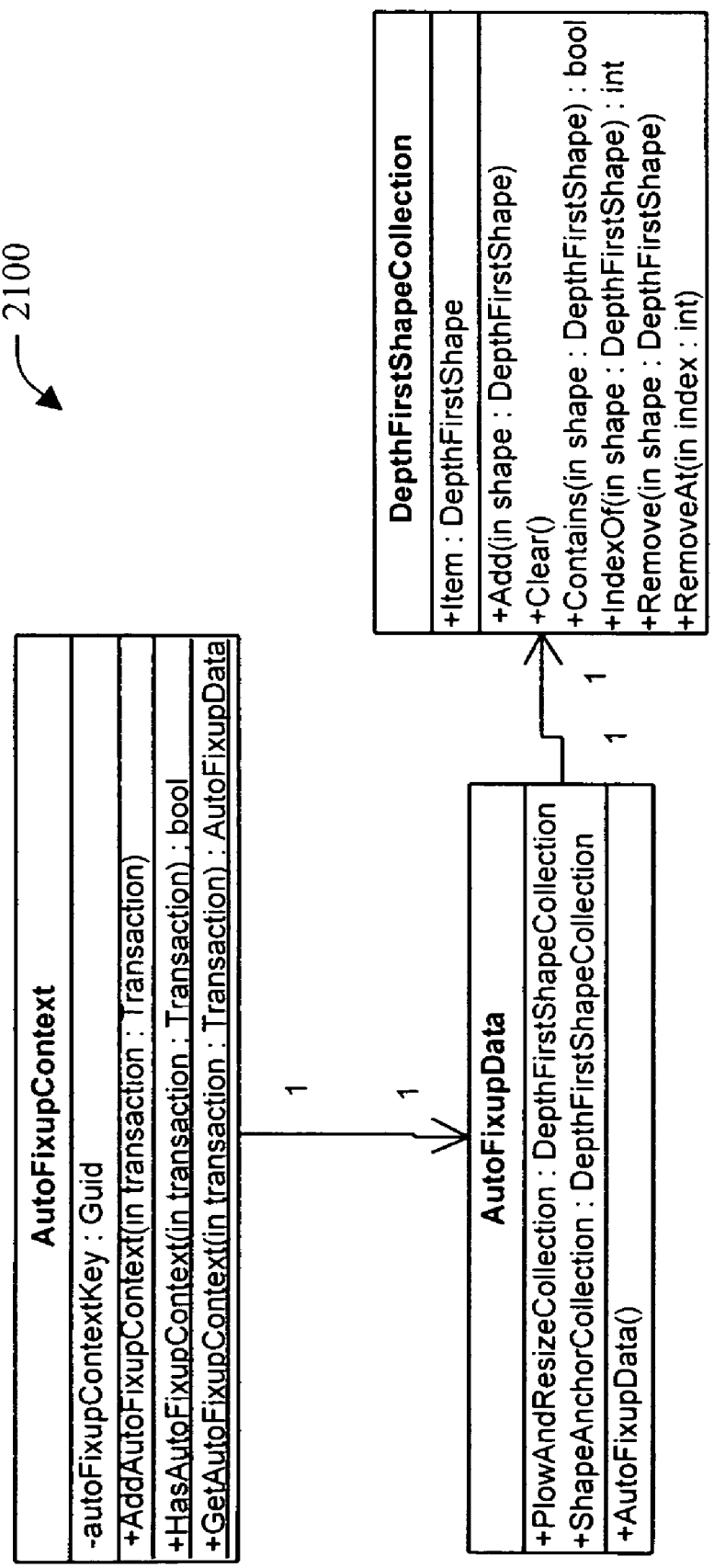
FIG. 21 is a diagram of an exemplary AutoFixupContext class in accordance with an aspect of the present invention.

Turning to FIG. 20, an exemplary CustomModelRule class 2000 in accordance with an aspect of the present invention is illustrated. Further, FIG. 21 illustrates an exemplary AutoFixupContext class 2100 in accordance with an aspect of the present invention.

During the BoundsChanged rule handling for NodeShapes 320, the shapes that have changed either their position or size are added to the appropriate collection which is cached in the Transaction's Context property. If it is the first item added to that particular collection, then one of the rules is fired. For example, if a shape's size is changed, then it's added to the ShapeAnchorCollection, and since it's the first one, the ShapeAnchoringRule is fired. Additional changes are stored in the collection until the rule is finally handled. During the rule handling in ShapeAnchoringRule.FireCustomModelRule method, the ShapeAnchorCollection is copied and the one in the Transaction.Context is cleared, so that other change(s) caused by this rule can be queued correctly and have this rule fired again as needed. The shapes in the collection are then processed and their Bounds are fixed, as needed, by each step in the process.

In one example, the following conditions in the BoundsChanged rule causes the custom rules to be fired:

If the shape can be plowed, then the PlowAndResizeParentRule is queued, adding the parent shape to the PlowAndResizeCollection if it has not already been added.

If the parent shape auto-sizes to fit its child shapes, then the PlowAndResizeParentRule is queued, adding the parent shape to the PlowAndResizeCollection if it has not already been added.

If the shape has any anchoring, then the ShapeAnchoringRule is queued, adding the shape to the AnchoringCollection if it has not already been added. If the shape's size has changed and any child shape has any anchoring, then queue the ShapeAnchoringRule, adding the child shape to the AnchoringCollection if it has not already been added.

In this example, the fix up process is divided up into these sections so that other designers can plug into the process and add their own fix up code in their appropriate location.

Size to Content Anchor

Figure 22:
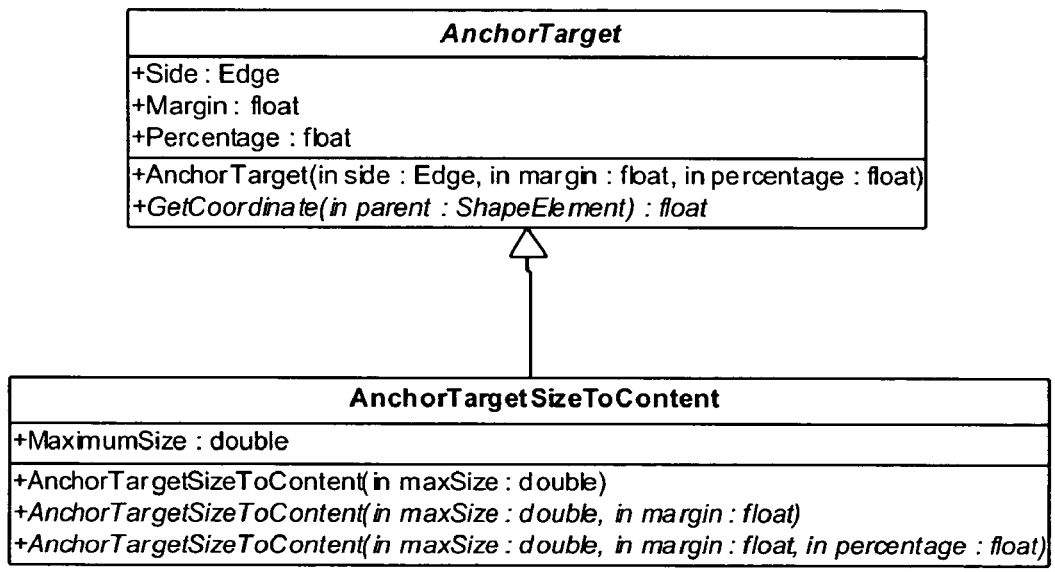
FIG. 22 is a diagram of an exemplary AnchorTarget class in accordance with an aspect of the present invention

Referring next to FIG. 22, an exemplary AnchorTarget class 2200 in accordance with an aspect of the present invention is illustrated. In this example, the AnchorTargetSizeToContent does not actually target a specific edge of the parent shape or another ShapeField, but allows the ShapeField's height or width (but not both) to flow depending on the content it is going to display. Thus, a ShapeField can size itself to its contents.

AnchorTarget 2200 can be set on the AnchoringBehavior class by calling the SetLeftAnchor, SetTopAnchor, SetRightAnchor or SetBottomAnchor methods. When calculating the height for a ShapeField with the AnchorTargetSizeToContent anchor, the anchor calculation code can get the content for the corresponding ShapeField and determine its size requirements based on that content. In this example, the Size to Content setting can only have one floating side. The other size is fixed by anchoring to something else, for example, the edge of the parent ShapeElement or another ShapeField.

The AnchorTargetSizeToContent allows a designer to set its maximum size in number of lines. That way, if it is desired to allow flowing content but only up to a certain threshold, then this can be accomplished by setting the maximum size to the number of lines desired to be allowed. Although the size in lines is set, the actual size of the ShapeField itself is determined by the number of lines as well as the line height, which depends on the font being used.

Resizing Parent

For the parent resize functionality required by the design surface, whenever there is a BoundsChangedRule fired, the design surface checks that the ShapeElement is a NestedChildShape. If that is the case, then this ShapeElement's ParentShape can be placed in the PlowAndResizeParentCollection in the Transaction.Context. If this is the first one in the collection, then the PlowAndResizeParentRule can be added to the event queue.

Later, when the PlowAndResizeParentRule is fired, the collection can be copied locally and the one in the Transaction.Context can be cleared. Thus, if any bounds changes here cause another parent resize, the rule can be fired again, as needed. Also, in handling the PlowAndResizeParentRule, each shape in the PlowAndResizeParentCollection can be resized to fit its nested children.

If the child shapes have anchoring set on them, then the resize code can use the anchor margins to determine how much larger to make the parent shape to accommodate those margins. If the child shapes don't have anchoring, then a default margin size can be employed.

Virtual Document Size

The virtual document size is implemented in the same way as sizing the parent; in this case the parent ShapeElement 350 is the Diagram 210. The Diagram.Bounds is changed to contain all of its NestedChildShapes. It can then fire the appropriate event (ScrollRangeChanged) to ensure that the scroll bars update correctly with size of the document.

Resize Feedback

Resize feedback is drawn as the user uses the selection grab handles to make a ShapeElement's size larger or smaller. The feedback allows users to see what the new size will look like before committing the change. Resize feedback is limited by the ShapeElement.MinimumSize property.

For the resize feedback to work correctly with parent resize features, the MinimumSize property is calculated, so that for a parent of nested shapes, it cannot be smaller than the size required to fit all of its nested children. That is because the parent is allowed to be sized larger, but cannot size smaller than the area needed to display all of its nested children if they are currently marked as visible.

For it to work with size to content, the MinimumSize calculation also allows content to wrap and ShapeFields to be repositioned as needed for the content to be displayed.

Plowing

In one example, the core design surface implements a simple form of shape plowing. Plowing moves overlapping shapes out of the way, so that they no longer overlap. ShapeElement(s) 350 that are identified as causing a plow forces other sibling ShapeElement(s) 350 or themselves down and to the right, depending on which direction the overlap occurs on. The plowed ShapeElement(s) 350 can be moved to the next grid unit past the Bounds.Right or Bounds.Bottom of the plowing ShapeElement 350. This plowing mechanism can be implemented in the design surface itself.

To allow designers to specify if a ShapeElement 350 can or cannot plow, the WillPlow property can be exposed. If it returns true, then this shape can plow others, so any move it does will have an effect on its siblings. Also, any shapes that move and affect it (by overlap this plowable shape) will also cause shapes to move, including possibly moving the plowable shape.

During the handling of the PlowAndResizeParentRule, the plowing code can reposition shapes that overlap another shape that has the WillPlow property set to true.

Bounds Fixup

The design surface allows several points of integration for designers to plug into during the transaction processing. At these points, designer(s) are given an opportunity to adjust ShapeElement.Bounds as needed by calling the ShapeElement.OnBoundsFixup method. OnBoundsFixup can be called at the end of Pel Fixup, after shapes have been plowed, and after parent shapes have been resized. Each time, OnBoundsFixup can be called with the appropriate flag letting the method implementers know what step in the process they're in and the number of auto sizing/positioning iterations.

In this example, the design surface no longer implicitly calls the BoundsRules on a ShapeElement 350 during its BoundsChangedRule processing. Instead, the default implementation of OnBoundsFixup applies the ShapeElement.BoundsRules. But designers can override this behavior and select which BoundsRules to apply and when to apply them in the OnBoundsFixup method.

Expand/Collapse of Nested Shapes

Next, referring to FIG. 23, an exemplary Shape Element class 2300 in accordance with an aspect of the present invention is illustrated. The ShapeElement class 2300 can expose the Visible property. This property can control when shapes are displayed on the design surface. If a ShapeElement 350 has its Visible property set to false, then it will not be drawn, hit tested, and cannot be keyed to.

For the expand/collapse feature of nested shapes, the Visible property can be employed to turn off child shapes that are nested within a containing shape. ShapeElement can expose two methods—Expand and Collapse—to support the expand/collapse feature. Both methods can go through the RelativeChildShapes and change their Visible flag to the appropriate setting.

Graph Object Changes

In one example, to fully support nested shapes, the Graph Object can support a hierarchy of container shapes. Each container in the Graph Object can create its own instance of a Graph Object to track its NestedChildShapes. ShapeElements 350 can continue to be Nodes on that Graph Object; however, when the first NestedChildShape is added to a ShapeElement 350, then it becomes a Container instead at that point, it will be given its own instance of a Graph Object Container (which is the equivalent of another diagram inside the Graphic Object) to use for manipulating its NestedChildShapes. This is also referred to as hierarchy or a sub-container.

Figure 23A:
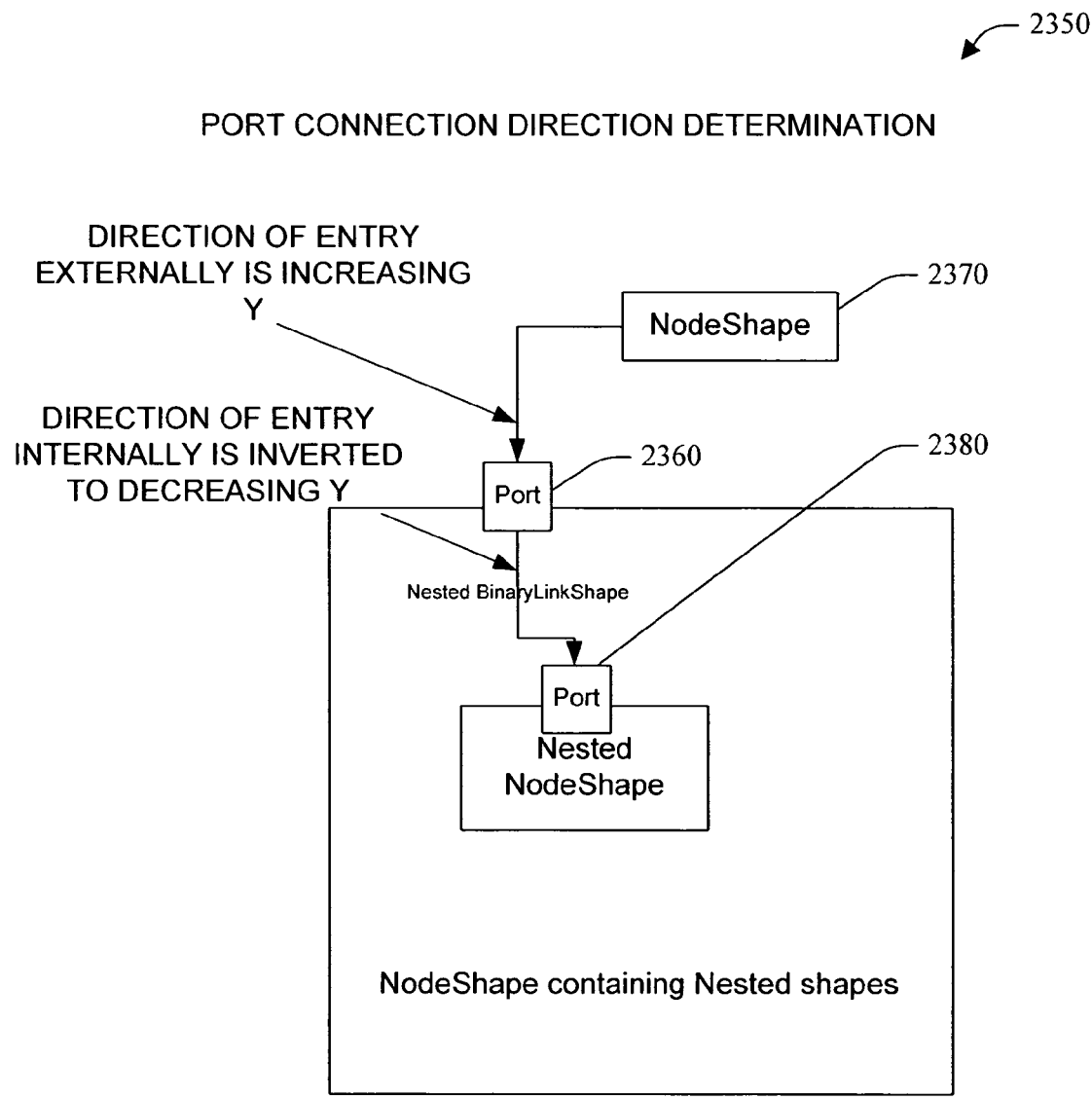
FIG. 23A is a diagram of an exemplary port connection direction determination in accordance with an aspect of the present invention.

Referring briefly to FIG. 23A, to support the Graph Object, PortShapes that are on the container can be exposed in two places within the Graph Object. First, a PortShape relative object 2360 can be placed on the parent ShapeElement's Node, 2370 so that it can be routed correctly in the outer Graph Object. Then, a duplicate PortShape relative object 2380 can be placed within the container's Graph Object, so that lines within the ParentShape can be routed to it correctly. The outer Port connection direction (the direction a route is allowed to touch the Port in) is determined by the Port's position on the parent's bounding box. The inner Port simply uses the inverse direction of that determined for the outer port.

Hit test results can return objects in sub-containers to get all the possible shapes hit within it. Sub-containers may also be marked as visible or not letting clients ignore portions of the hierarchy. For example, when a container is "collapsed" (e.g., analogous to collapsing a tree view of files), hit results from that container are ignored.

Declarative Design

A diagram's 210 style is defined by the pens, colors, fonts, and brushes used to paint it. The style can be changed without changing the semantic meaning of the diagram. The shape(s) in a diagram 210 fall into various categories, each having a specific style set used for painting.

In terms of the object model, a shape has a property named StyleSet which effectively acts as a tray of pens, colors, brushes, and fonts. DoPaint( ) can request any of these by name and the StyleSet returns a valid pen, brush, font, or color. For example, painting an ORM Role:

Pen pen=someRole.StyleSet.GetPen("default");
e.Graphics.DrawRectangle(pen, someRole.Bounds);

If a named resource is requested that does not exist, a default can be returned. Thus, assuming there is no pen named "RoleBoundingBox" the following code would return the default pen.

Pen pen=someRole.StyleSet.GetPen("ORM.RoleBoundingBox");
   e.Graphics.DrawRectangle(pen, someRole.Bounds);

However, if the "ORM.RoleBoundingBox" pen was defined as a thick blue line, the above code would paint the role's bounding box with a thick blue line.

In order to define named resources, named pens, brushes, fonts, and colors can be specified declaratively on a shape class using the attributes: NamedPen; NamedBrush; NamedFont; & NamedColor. These attributes can be applied more than once and can be inherited. A class's overall "style" is determined by the combination of its locally defined and inherited named pens, brushes, fonts, & colors.

In addition to the above attributes, in one example, there are the five more: StyleSet, BrowsablePens, BrowsableBrushes, BrowsableFonts, & BrowsableColors. The StyleSet attribute names a style set. The BrowsableXxx attributes identify pens, brushes, fonts, & colors that will appear in the property browser when a shape is selected. These five attributes are not inherited and cannot be applied more than one time per class. These attributes are discussed in greater detail below.

Figure 24A:
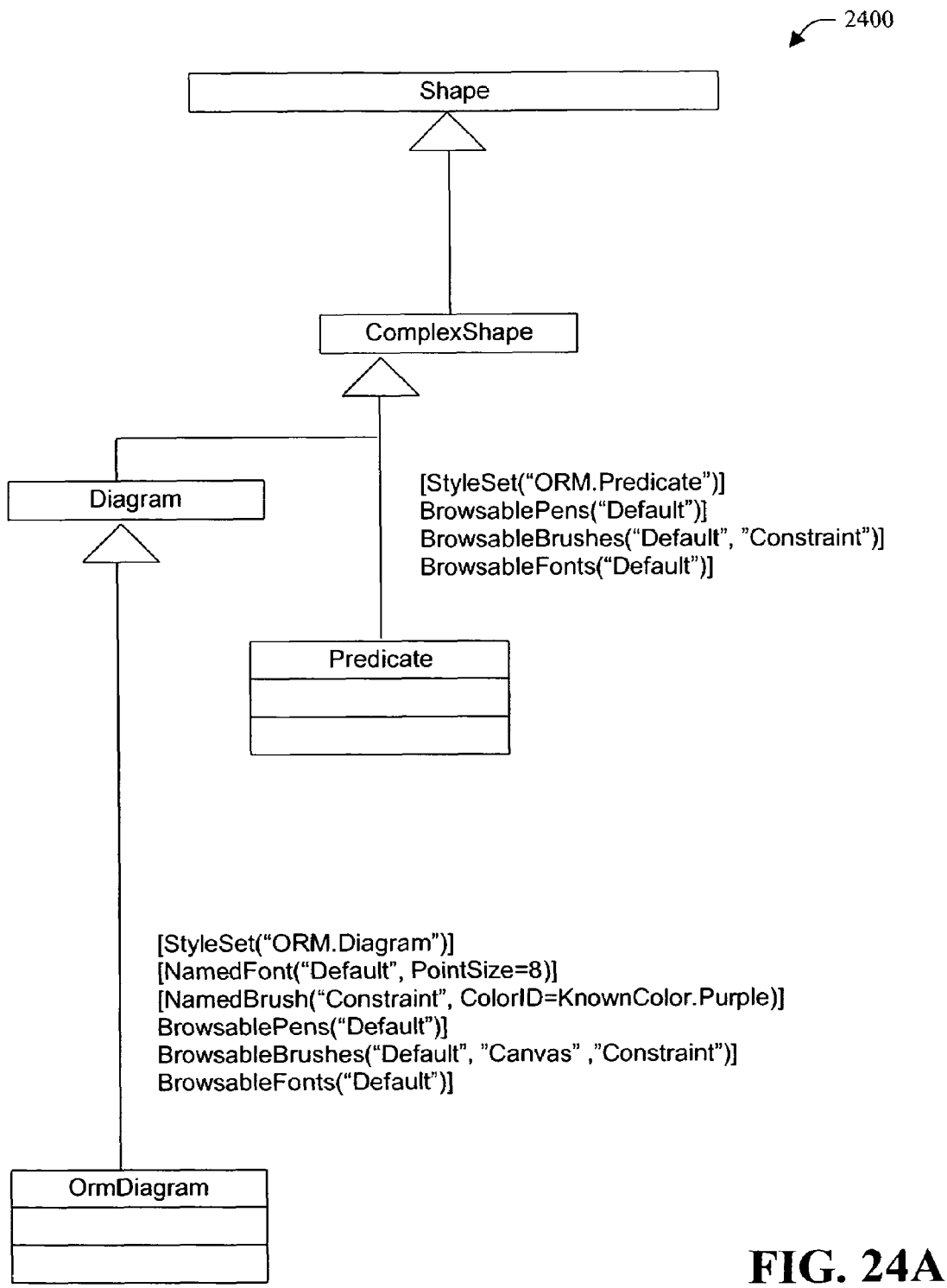
FIG. 24A is a diagram of exemplary shapes of an ORM diagram in accordance with an aspect of the present invention.
Figure 24B:
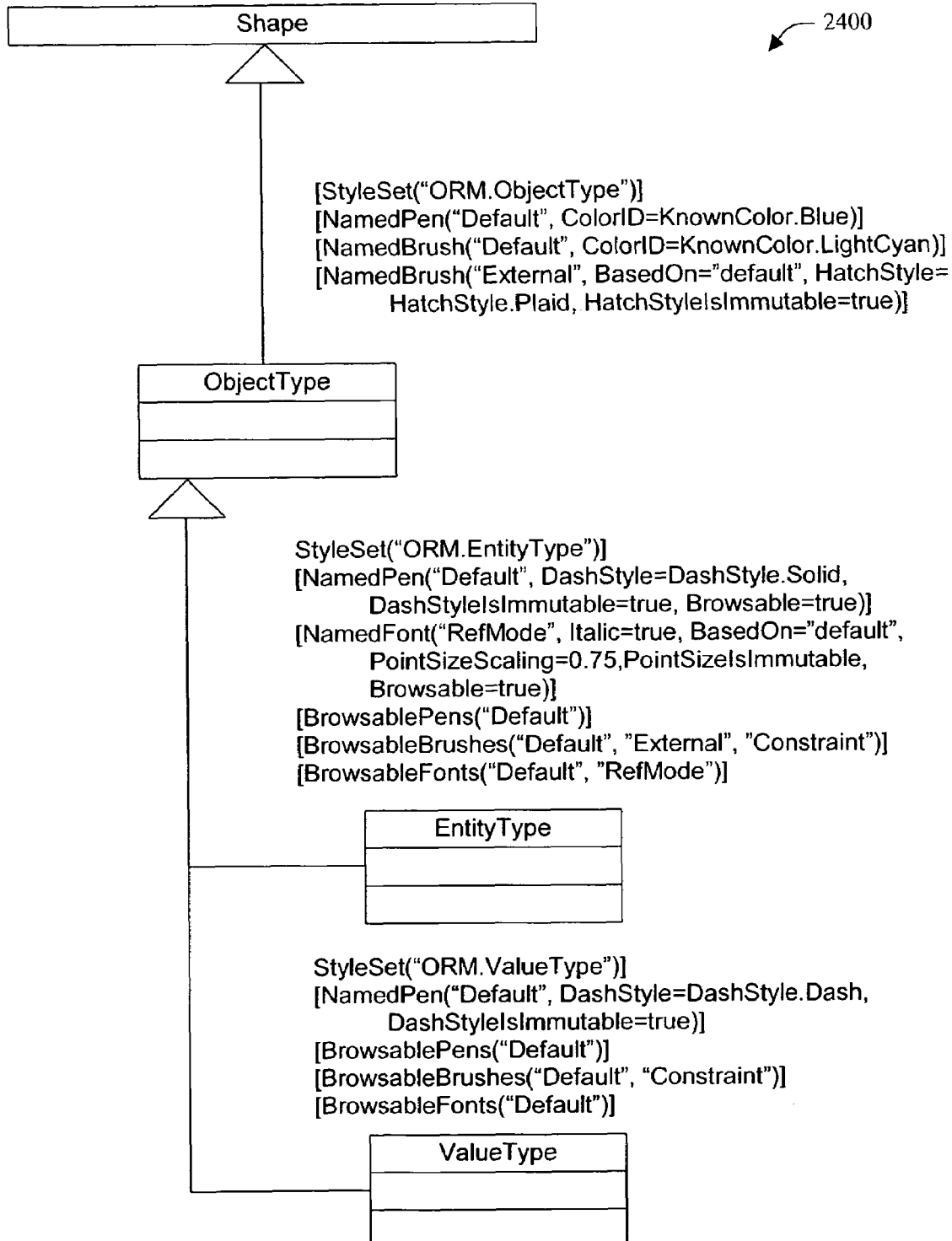
FIG. 24B is a diagram further illustrating the exemplary shapes of an ORM diagram of FIG. 24A.
Figure 24C:
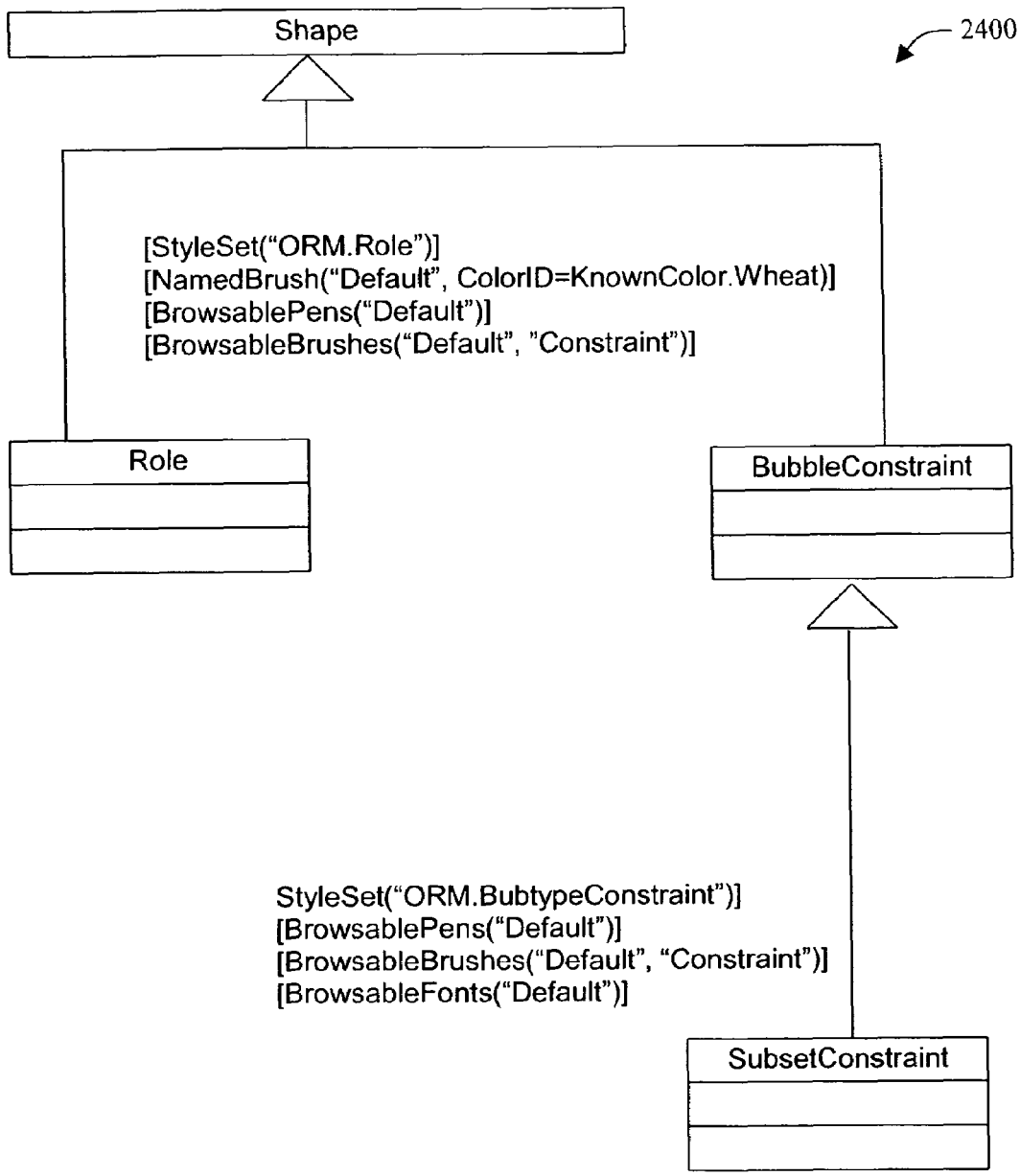
FIG. 24C is a diagram further illustrating the exemplary shapes of an ORM diagram of FIGS. 24A and 24B.
Figure 25A:
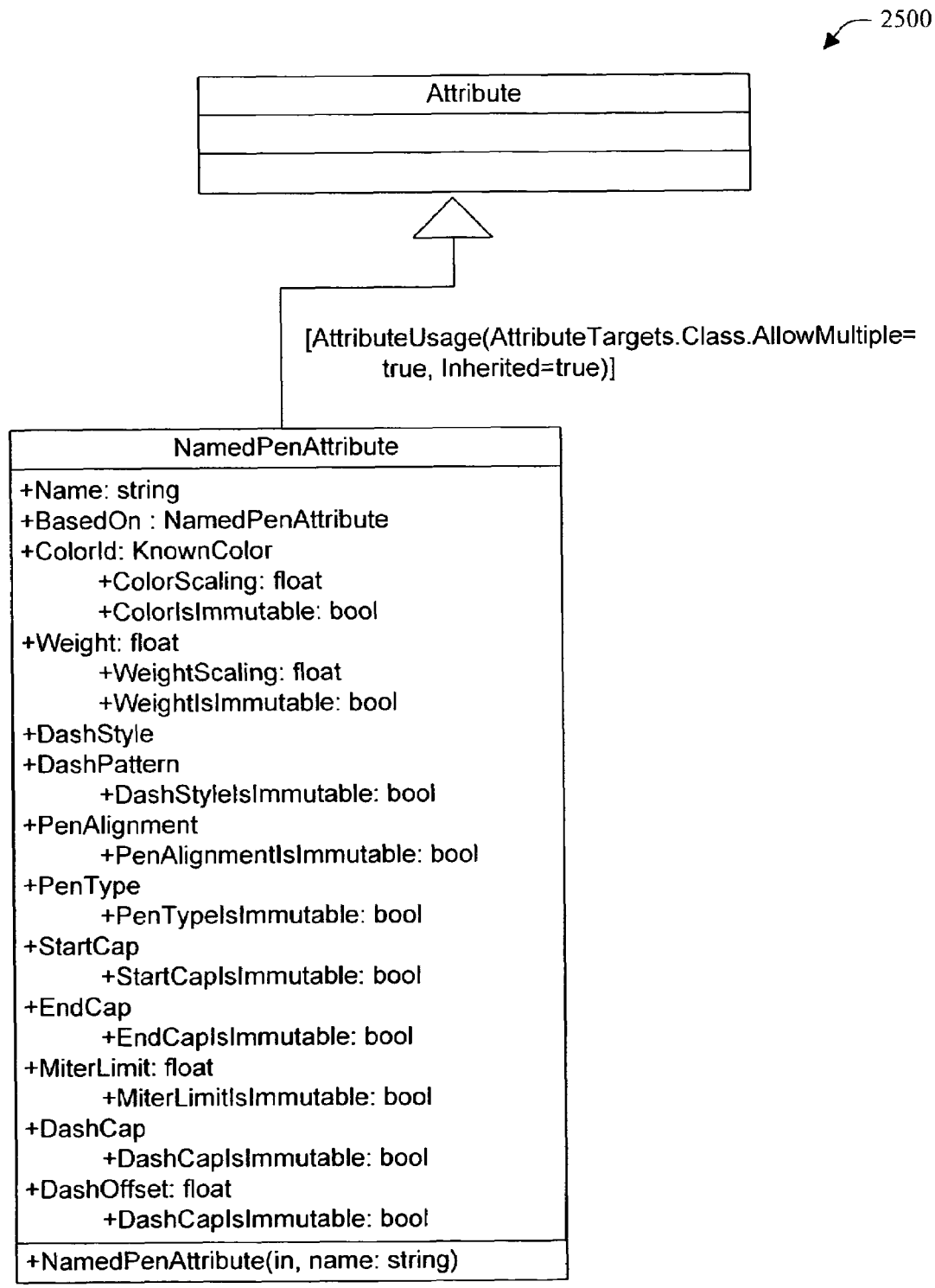
FIG. 25A is a diagram of exemplary attributes in accordance with an aspect of the present invention.
Figure 25B:
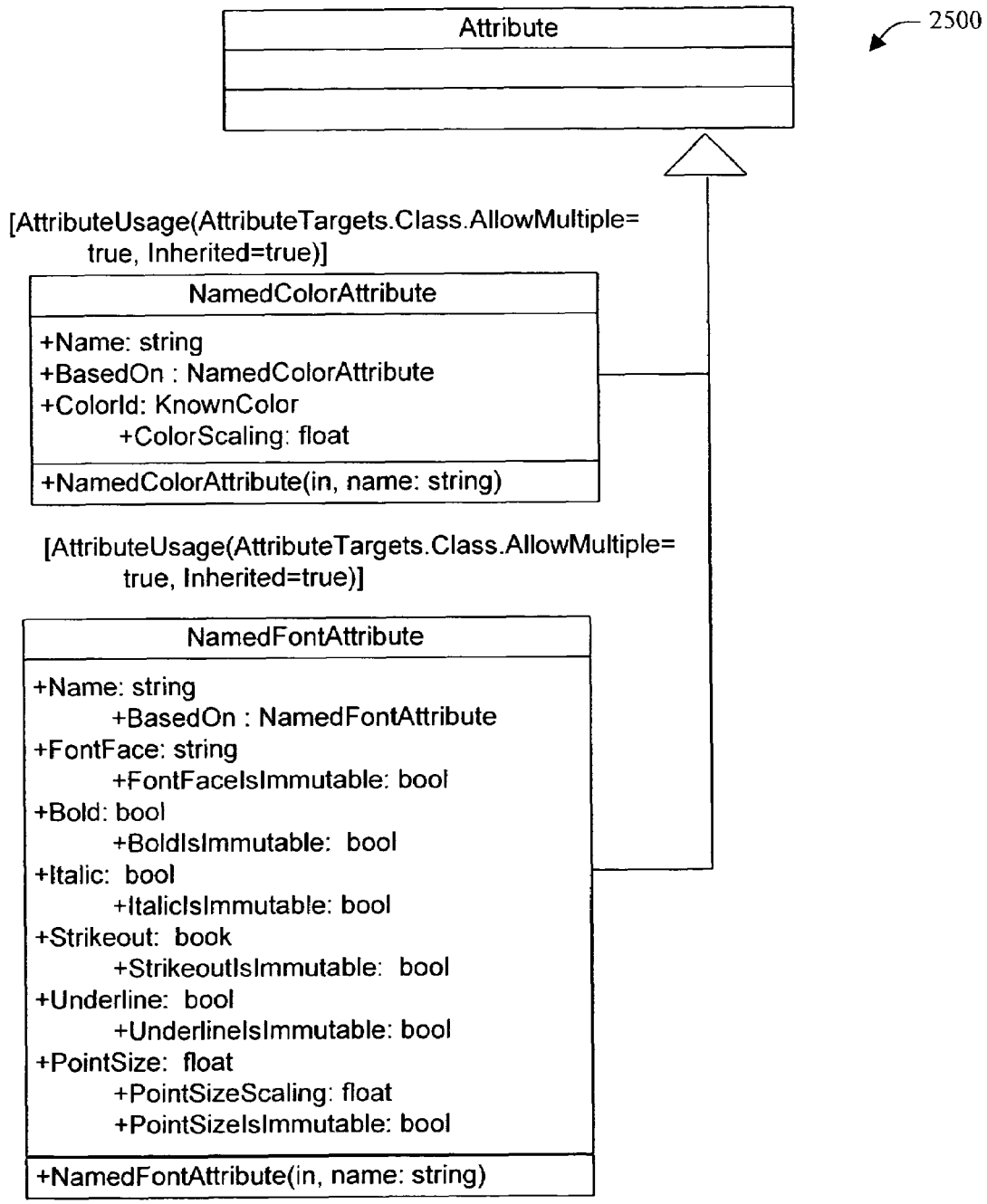
FIG. 25B is a diagram further illustrating the exemplary attributes of FIG. 25A.
Figure 25C:
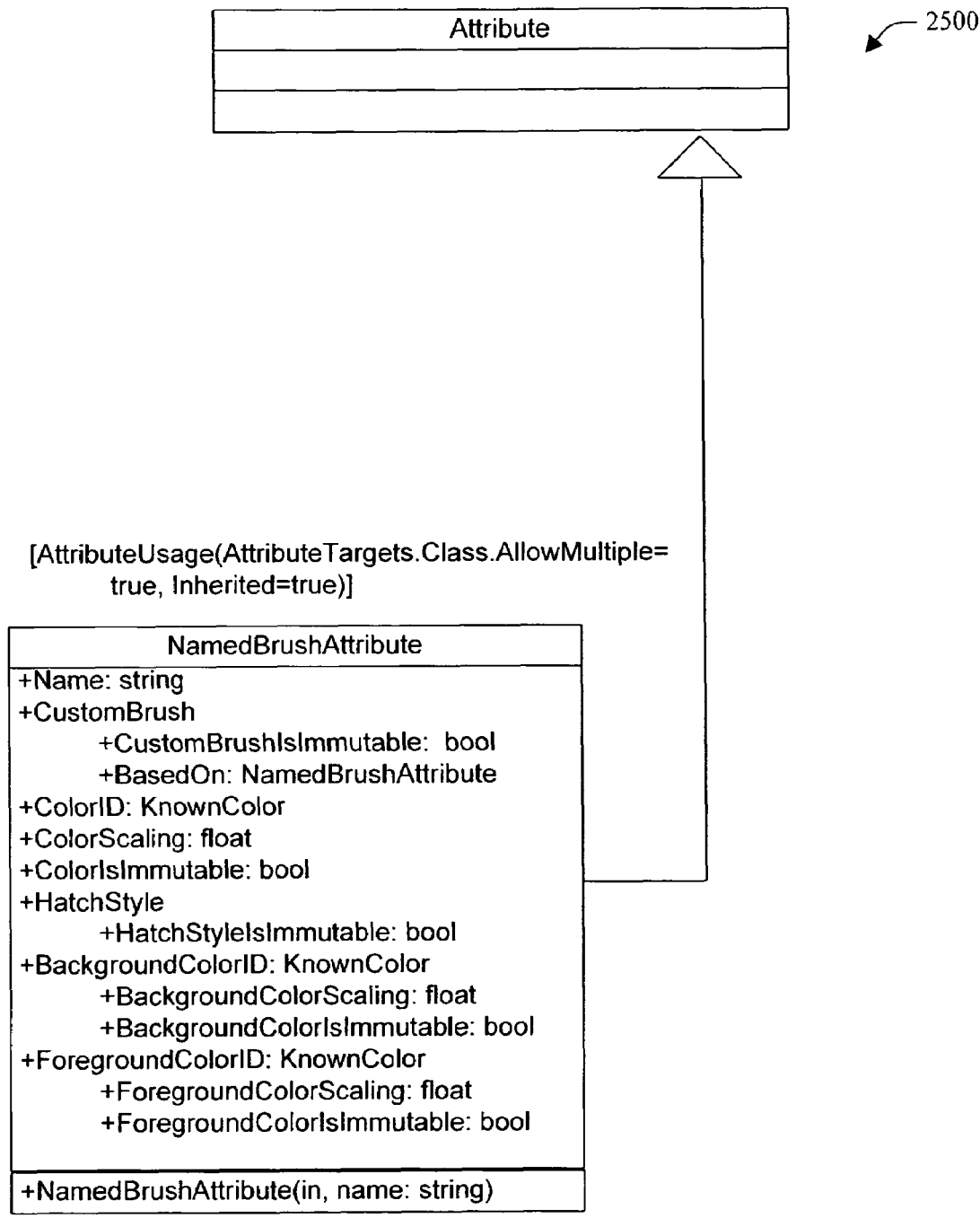
FIG. 25C is a diagram further illustrating the exemplary attributes of FIGS. 25A and 25B.
Figure 25D:
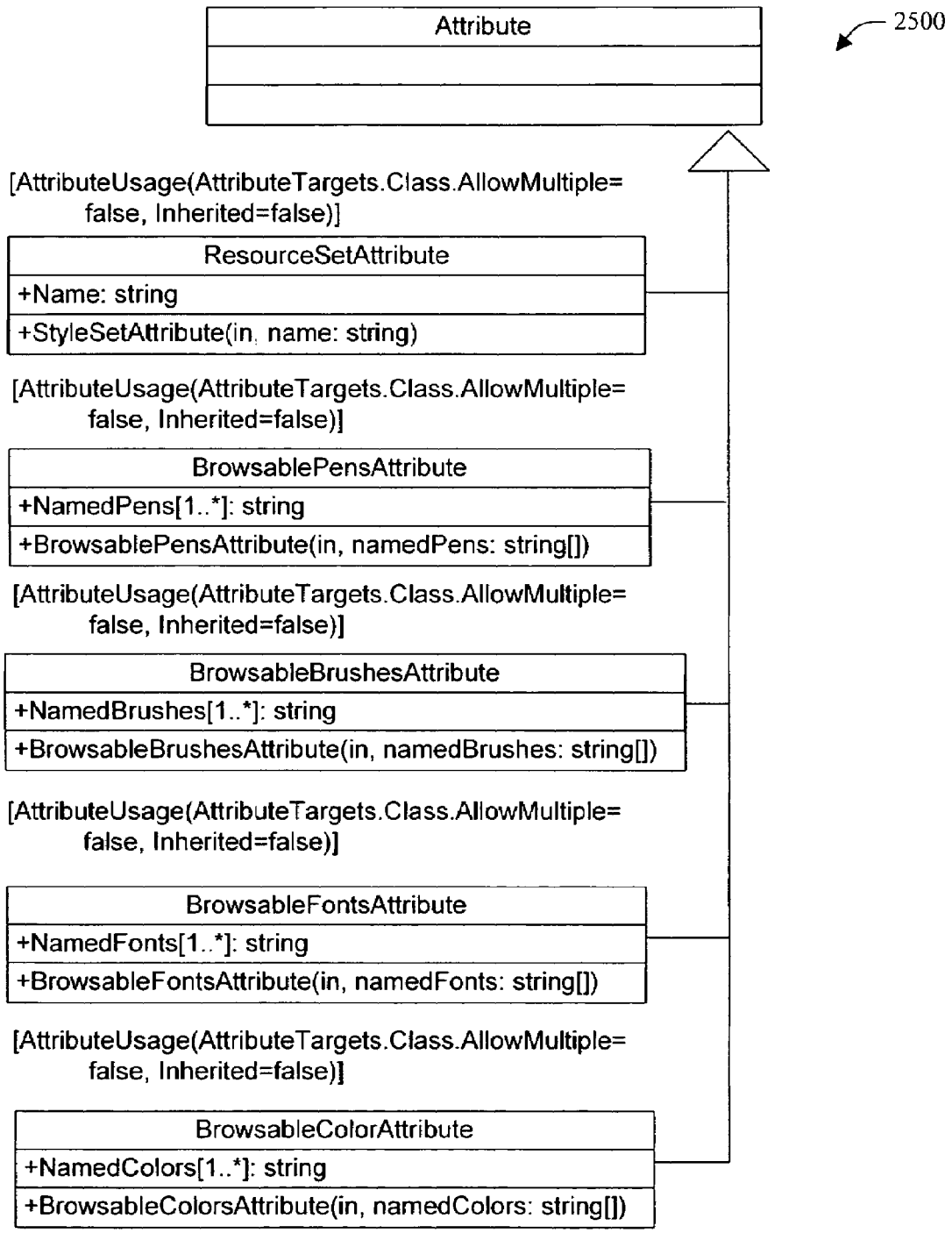
FIG. 25D is a diagram further illustrating the exemplary attributes of FIGS. 25A, 25B and 25C.

Referring briefly to FIGS. 24A, 24B and 24C, exemplary shapes of an ORM diagram 2400 in accordance with an aspect of the present invention is illustrated.

Attribute Descriptions

These attributes can be applied to additively specify properties for named pens, brushes, fonts, and colors. Generally, an unspecified property defers to its parent. If no parent exists, the ResourceCache's absolute default can be used. If the default pen (brush, font, color) is appropriate with no alteration, then no attribute need be specified.

[AttributeUsage (AttributeTargets.Class, AllowMultiple=true, Inherited=true)]

The NamedPen attribute names a pen that is defined by its specified & inherited property values.

Name: string—specifies the pen's name
   BasedOn: string—specifies a named pen which this pen extends
   ColorID:KnownColor—specifies the pen's color
   ColorIsImmutable:bool—if true, the color cannot be overridden
   ColorScaling:float—this value is an HSB value used to scale this pen's color with respect to the color of the pen that this pen is based on.
   Weight:float—specifies the pen's line thickness
   WeightIsImmutable:bool—if true, the weight cannot be overridden
   WeightScaling:float—a signed value that indicates a the delta of this pen's line width with respect to the width of the pen that this pen is based on.
   DashStyle:DashStyle—specifies the pen's dash style.
   DashPattern:float[ ]—applicable if DashStyle=DashStyle.Custom specifies the custom dashPattern. An array of real numbers that specify the lengths of alternating dashes and spaces in dashed lines.
   DashStyleIsImmutable:bool—if true, the dash style cannot be overridden
   PenAlignment:PenAlignment—specifies the pen's alignment
   PenAlignmentIsImmutable:bool—if true, the pen alignment cannot be overridden
   PenType:PenType—specifies the pen's type
   PenTypeIsImmutable:bool—if true, the pen's type cannot be overridden
   StartCap:LineCap=specifies the pen's starting line cap
   StartCapIsImmutable:bool—if true, the pen's starting line cap cannot be overridden
   EndCap:LineCap—specifies the pen's ending line cap
   EndCapIsImmutable:bool—if true the pen's ending line cap cannot be overridden
   MiterLimit:float—specifies the pen's miter limit
   MiterLimitIsImmutable:bool—if true, the pen's miter limit cannot be overridden
   DashCap:DashCap—specifies the pen's dash cap
   DashCapIsImmutable:bool—if true, the pen's dash cap cannot be overridden
   DashOffset:float—specifies the pen's dash offset
   DashOffsetIsImmutable:bool—if true, the pen's dash offset cannot be overridden

[AttributeUsage (AttributeTargets.Class, AllowMultiple=true, Inherited=true)]

The NamedBrush attribute names a brush that is defined by its specified & inherited property values.

Name:string—name of the brush
   CustomBrush:System.Type—If specified, all other properties are ignored. The property identifies a class derived (directly or indirectly) from Brush. The class must have a default constructor (e.g., one w/no parameters.)
   CustomBrushIsImmutable:bool—if true, the brush cannot be overridden
   BasedOn:string—specifies a named brush which this brush extends
   ColorID:KnownColor—specifies the color of a solid brush
   ColorScaling:float—this value is an HSB value used to scale this brush's color with respect to the color of the brush that this brush is based on.
   ColorIsImmutable:bool—if true, the color of the brush cannot be overridden
   HatchStyle:HatchStyle—if set specifies that the brush is a HatchBrush, and also sets the brushes HatchStyle. If not set, the brush is a solid brush.
   HatchStyleIsImmutable:bool—if true, the hatch style cannot be overridden
   BackgroundColorID:KnownColor—specifies the background color of a hatch brush
   BackgroundColorScaling:float—this value is an HSB value used to scale this brush's color with respect to the background color of the brush that this brush is based on.
   BackgroundColorIsImmutable:bool—if true, the background color cannot be overridden
   ForegroundColorID:KnownColor—specifies the foreground color of a hatch color
   ForegroundColorScaling:float—this value is an HSB value used to scale this brush's color with respect to the foreground color of the brush that this brush is based on.
   ForegroundColorIsImmutable:bool—if true, the foreground color cannot be overridden

[Attribute Usage (AttributeTargets.Class, AllowMultiple=true, Inherited=true)]

The NamedFont attribute names a font that is defined by its specified & inherited property values.

Name:string—name of the font
   BasedOn:string—specifies a named font which this font extends.
   FontFace:string—specifies this font's fontface (e.g., "Tahoma").
   FontFaceIsImmutable:bool—if true, the font face cannot be overridden
   Bold:bool—if true, the font's FontStyle will include bold
   BoldIsImmutable:bool—if true, the font's boldness cannot be overridden
   Italic:bool—if true, the font's FontStyle will include italic
   ItalicIsImmutable:bool—if true, the font's italicness cannot be overridden Strikeout:bool—if true, the font's FontStyle will include strikeout StrikeoutIsImmutable:bool—if true, the font's strikeoutness cannot be overridden Underline:bool—if true, the font's FontStyle will include underline UnderlineIsImmutable:bool—if true, the font's underlineness cannot be overridden PointSize:float—specifies the font's point size PointSizeScaling:float—a percentage used to scale this font's point size with respect to the point size of the font that this font is based on.

PointSizeIsImmutable:bool—if true the point size cannot be overridden

[AttributeUsage (AttributeTargets.Class, AllowMultiple=true, Inherited=true)]

The NamedColor attribute names a color that is defined by its specified & inherited property values.

Name:string—name of the color

BasedOn:string—specifies a named color which this color extends

ColorID:KnownColor—specifies the color

ColorScaling:float—this value is an HSB value used to scale this color with respect to the named color that this color is based on.

[Attribute Usage (AttributeTargets.Class, AllowMultiple=false, Inherited=false)]

The StyleSet attribute names the style set associated with the class that the attribute is applied to. If this attribute is not specified, the name defaults to the name of the class.

Properties include:

Name:string—name of the style set

BrowsablePens, BrowsableBrushes, BrowsableFonts, & BrowsableColors

When a shape is selected, the Visual Studio Properties grid can display the properties for the element. If the style properties for a diagram element class are meant to be editable, then the class should be marked with the BrowsableXxx attributes. Property Descriptors can be created for every named pen, brush, font, & color that is listed in the BrowsableXxx attribute.

It is to be appreciated that immutable properties cannot be overridden, and cannot be set via the user interface. If a named resource has immutable properties and is listed as browsable, the immutable properties show up as read-only in the UI. For example, the following attributes define a browsable default pen, so when a shape associated with this pen is selected, the default pen will be appear in the property browser. The user will be able to set the pen's width and color, but will not be able to change the pen's dash style.

[NamedPen("default", DashStyle=DashStyle.Solid, DashStyleIsImmutable=true)]

[BrowsablePens("default")]

[Attribute Usage (AttributeTargets.Class, AllowMultiple=false, Inherited=false)]

BrowsablePens

NamedPens:string[ ]—lists the named pens that should show up in the Property browser.

[AttributeUsage (AttributeTargets.Class, AllowMultiple=false, Inherited=false)]

BrowsableBrushes

NamedBrushes:string[ ]—lists the named brushes that should show up in the Property browser.

[Attribute Usage (AttributeTargets.Class, AllowMultiple=false, Inherited=false)]

BrowsableFonts

NamedFonts:string[ ]—lists the named fonts that should show up in the Property browser.

[AttributeUsage (AttributeTargets.Class, AllowMultiple=false, Inherited=false)]

BrowsableColors

NamedColors:string[ ]—lists the named colors that should show up in the Property browser.

FIGS. 25A, 25B, 25C and 25D illustrate exemplary attributes 2500 in accordance with an aspect of the present invention.

Managing Shape Appearance

This section describes how the core design surface manages shape geometry and shape resources such as scarce system drawing resources (e.g., pens, fonts and brushes).

Public Interfaces & Programmability

Defining the Default Appearance of a Shape Class

To define the default (or static) appearance of a shape, the shape's geometry and resources are initialized. The resources include the fonts used throughout the shape, the pen characteristics such as color and thickness to draw such things as the shape outline and text rectangle outlines, and the shape background brush characteristics such as color and pattern.

In one example, to do so, following steps are taken:

(1) Override the ShapeGeometry property getter in a ShapeElement-derived class to define the geometry of the shape. Return an existing geometry from the ShapeGeometries class or create the designer's own geometry by deriving from ShapeGeometry.

(2) Override the InitializeResources method in the ShapeElement-derived class to define the default fonts, pens, and brushes for the shape.

```
protected override void InitializeResources( StyleSet classStyleSet )
{
base.InitializeResources( classStyleSet );
PenSettings outlinePenSettings = new PenSettings( );
outlinePenSettings.Color = Color.Blue;
outlinePenSettings.Width = 0.75f/72.0f; // in inches
classStyleSet.OverridePen( DiagramPens.ShapeOutline,
outlinePenSettings);
}
```

This method is called by the core design surface prior to painting for the first time, allowing the designer to modify the class style set. The class style set is a collection of resources to be used for the shape instances of the ShapeElement-derived class.

In the body of your overridden method, it is important to call the base InitializeResources method first since it will initialize the class style set to the designer's base class's class style set. Without calling the base method, the base appearance of the shape will not be inherited.

In InitializeResources, call the style set's OverridePen, OverrideFont, and OverrideBrush to modify the default appearance of the shape. To determine which resources to override:

This is not the place to override resources that are linked to modifiable IMS properties. InitializeResources is only called before the first paint of the first shape instance of the ShapeElement-derived class. It is not called before the first paint of subsequent shape instances. If the application style set is altered, then InitializeResources will be called again before the very next paint of the first shape instance of your ShapeElement-derived class.

When drawing the outline of the shape, the core design surface uses the pen whose id is DiagramPens.ShapeOutline.

When drawing the shape background, the core design surface uses the brush whose id is DiagramBrushes.ShapeBackground.

Child shape fields use the resources of their parent shape. Shape fields by default will use the aforementioned ids as well; however, the designer can customize them to use other pens, brushes, and fonts by setting DefaultBackgroundBrushId, DefaultPenId, and DefaultFontId of the ShapeField or TextField.

If it is important to guarantee that shapes which derive from the shape class inherit the shape class's appearance, the designer can use the pattern shown below in the designer's own shape class. This is especially important if a resource property, such as pen width, which should be immutable because it carries semantic meaning is involved.

```
sealed protected override void InitializeResources( StyleSet classStyleSet )
{
  base.InitializeResources( classStyleSet );
  MyInitializeResources( classStyleSet );
}
protected virtual void MyInitializeResources( StyleSet classStyleSet )
{
}
```

To define the default resources of all shapes application-wide, OverridePen, OverrideFont, and OverrideBrush on the ApplicationStyleSet singleton class are called.

Defining the Appearance of Shape Instance Based on IMS Property Values

To define the appearance of a shape instance based on IMS property values, IMS properties are associated with specific pens, brushes, and fonts. When the IMS properties change, an opportunity can be presented to udpate the pens, brushes, and fonts before using them.

For example:

(1) Call RegisterForPropertyChangedEvent method at the end of InitializeResources. This method associates an IMS property with a particular resource. When one of the IMS properties changes, then the ShapeElement will be automatically invalidated. The IMS property must be on the shape, not on an element-behind. If the property is on an element-behind, then create a proxy property on the ShapeElement.

```
protected override void InitializeResources( StyleSet classStyleSet )
{
  base.InitializeResources( classStyleSet );
  // ...<class style set initialization>
  //        :
      RegisterForPropertyChangedEvent( this.Store,
      IsExternalMetaAttributeGuid
  );
}
```

(2) Override the InitializeInstanceResources method in the ShapeElement-derived class to define the instance specific fonts, pens, and brushes for the shape. This method is useful for setting instance style information that is different for each instance of a ShapeElement but doesn't change during the lifetime of the shape.

```
protected void InitializeInstanceResources( )
{
  base.InitializeInstanceResources( );
      if (this.AssociatedElements[0] is ProviderPort)
      {
          BrushSettings bs = new BrushSettings( );
          // Provider Fill (Background Brush)
          bs.Color = HslColor.White.ToRgbColor( );
      this.StyleSet.OverrideBrush(DiagramBrushes.ShapeBackground, bs);
      }
      else if (this.AssociatedElements[0] is ConsumerPort)
      {
          BrushSettings bs = new BrushSettings( );
          // Consumer Fill (Background Brush)
          bs.Color = ThemeColor.ToRgbColor( );
      this.StyleSet.OverrideBrush(DiagramBrushes.ShapeBackground, bs);
      }
}
```

This method is called by the core design surface when the instance style set for the shape is created, allowing the designer to modify the instance style set. The instance style set is a collection of resources to be used for this particular instance of the shape.

In the body of the overridden method, it is important to call the base InitializeInstanceResources method first since it will initialize the instance style set to the base class's instance style set. Without calling the base method, it will not inherit the base appearance of your shape.

(3) Override the OnBeforePaint method. This method is called by the core design surface right before any of the ShapeElement painting is done. This is the last chance to change any drawing resources (pens, brushes, fonts) before they're used in the ShapeElement drawing. In the body of this overridden method, the appearance of the pen, brush, or font are defined based on the current values of shape properties.

```
protected override void OnBeforePaint( )
{
  PenSettings outlinePenSettings = new PenSettings( );
  outlinePenSettings.DashStyle = ( IsExternal ) ? DashStyle.Dash : DashStyle.Solid;
  this.StyleSet.OverridePen( DiagramPens.ShapeOutline, outlinePenSettings );
}
```

(4) Call AssociateGeometryWith at the end of InitializeResources. This method associates a set of IMS properties with the shape geometry. When one of the IMS properties changes, then OnUpdateGeometry will be called. The IMS properties are on the shape, not on an element-behind. If the property is on an element-behind, then create a proxy property.

Making a Resource Property Immutable

In certain instances, it may be desirable to prevent a derived shape from modifying a resource property (such as pen color) because it has semantic meaning. This can be accomplished, for example, by marking the resource property as immutable. For example:

To make immutable a resource property in the class style set, set the Immutable<PropertyName> of the PenSettings, BrushSettings, and/or FontSettings while in the InitializeResources method. Once any resource property is set as immutable, it cannot generally be reversed without deleting the PenSettings, BrushSettings, or FontSettings object.

```
    protected override void InitializeResources( StyleSet classStyleSet )
    {
        base.InitializeResources( classStyleSet );
        PenSettings outlinePenSettings = new PenSettings( );
        outlinePenSettings.Color = Color.Blue;
        outlinePenSettings.ImmutableColor = true;
        this.StyleSet.OverridePen(
        DiagramPens.ShapeOutline,
        outlinePenSettings );
    }
```

Making the Entire Shape Highlight

To highlight or unhighlight a shape for a given view, call the Set, Add, Remove, or Clear methods on the DiagramClientView's HighlightedShapes property. Any shape in this collection is considered highlighted.

To modify the default luminosity of the highlighted shape, override the ShapeElement's CalculateHighlightLuminosity method. This converts the current luminosity value for a shape with a different luminosity to show that the shape is highlighted.

The default implementation does the following conversion:

if L>=160, then L=L*0.9 else, L+=40.

The core design surface will call this method prior to painting the shape instance if the shape instance is considered highlighted.

The luminosity will be adjusted on every color on the shape, not including child shapes since child shapes will retrieve their own luminosity level.

Architecture and Detailed Design

Abstract Geometry Classes

A ShapeElement 350 in a diagram 210 can define virtual methods which handle painting, hit testing, and connector folding:

```
    public virtual void OnPaintShape( DiagramPaintEventArgs
    paintArgs )
    public virtual bool DoHitTest( PointD point, DiagramHitTestInfo
hitTestInfo)
    public virtual PointD DoFoldToShape( PointD potentialPoint, PointD
vectorEndpoint )
```

However, many diagram shape types are represented using variations of the same basic geometric shape, even though they have completely different semantic meanings and are from completely unrelated branches of the shape type hierarchy. Along those lines, there are several shape behaviors that are loosely dependent upon each other because of their geometric representations. The geometry of the instance of the shape influences the process of hit testing a shape, painting the shape on the design surface and 'folding' a connector to the perimeter of that shape. All of these behaviors may be generically applicable not only vertically through class hierarchy, but also 'horizontally' across unrelated types. Therefore, a hierarchy of Geometry Helper classes can be defined to which the shape classes will delegate to these tasks in a general purpose manner.

The Shape object will expose a method which returns a Geometry class instance for use by the shape's DoPaint( ), DoHitTest( ), and DoFoldToShape( ) methods.

Using the helper object in this manner allows several advantages and flexibilities, for example:

Several varieties of these behavior(s) can be created as globally available classes that implement default behavior for common known shape types, such as rectangles, circles, ellipses, rounded rectangles, etc. The overridden classes can therefore return references to those pre-packaged objects and directly use their pre-built code with little or no developer effort. The only code is to ensure that the shape class overrides the Shape.Geometry property to return the desired pre-packaged Geometry instance.

The Shape Developer can choose to subclass one of the pre-packaged Geometry objects and override one or more of the methods to provide his/her own customizations to them. Here, the code necessary to achieve this is providing the appropriate subclassed default Geometry object and overriding the Shape.Geometry property to return a reference to the subclassed object.

Since the Geometry property can be overridden, the Shape developer can choose to implement more complex logic for deciding amongst several Geometry objects to return based on some criteria which is shape dependent.

In the case that none of the above is appropriate, the shape developer can simply override one, two or all three of the shape's DoPaint( ), DoHitTest( ), and DoFoldTo Shape( ) methods and completely define his/her own methodology from scratch.

Figure 26:
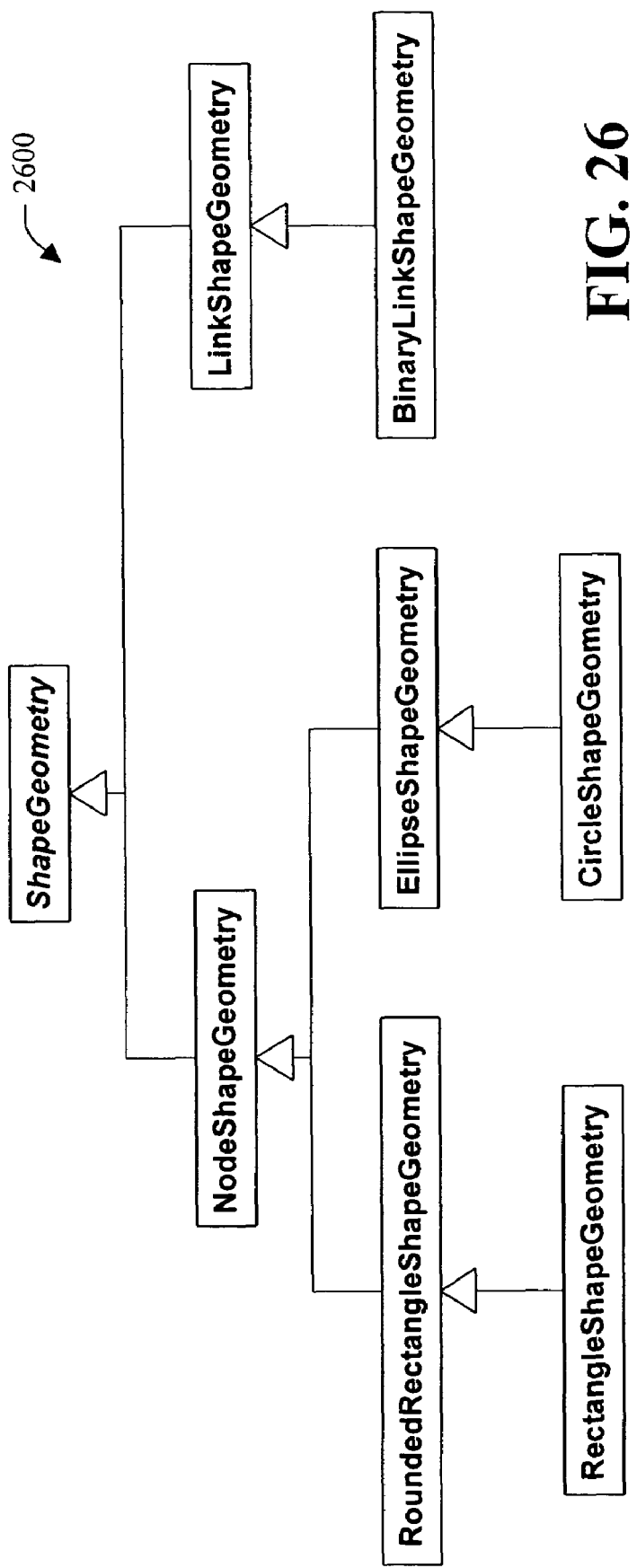
FIG. 26 is a diagram of an exemplary ShapeGeometry class in accordance with an aspect of the present invention.

Referring to FIG. 26, an exemplary ShapeGeometry class 2600 in accordance with an aspect of the present invention is illustrated.

Painting Behavior

A design surface view can be associated with one Diagram PresentationElement at a time. Drawing is triggered by invalidating (regions of) the design surface view (e.g., indication of area(s) that are required for redraw). The design surface view queries the Diagram's graph object to determine which shapes need to be rendered based on the clipping region to be redrawn. The identified shapes will be called to paint themselves through their OnPaintShape( ) method. By default, the ShapeElement OnPaintShape method can work in conjunction with the appropriate StyleSet and Geometry objects. This can occur for each element recursively in reverse z-order (e.g., drawing order) maintained by the diagram. Scrolling and pan-zoom are handled by the design surface view.

The ShapeElement::OnPaintShape( ) method can be overridden by subclasses, but the following pseudocode demonstrates how default implementation operates:

```
    OnPaintShape(args)
    {
        this.ShapeGeometry.DoPaint(args);
        For (each shapeField of this shape)
        {
            shapeField.Dopaint(args);
        }
    }
```

The Geometry DoPaint( ) methods use the shape's StyleSet to retrieve the designated outline pen and background brush when painting by default.

Shadows

In one example, the ability to set clipping regions into the Graphics surface is provided. One of the regions supported is a GraphicsPath region. Additionally, the clipping regions can be extended using several flags which allow xor, union, intersection, complement, etc. The Complement setting allows replacement of non-overlapping path regions that are not covered by prior paths in the region. Using this setting yields the 'sliver', which is painted using the Shadow brush from the shape's style set. For example:

```
ShapeGeometry::DoPaintShadow( )
{
    save current graphics state
    get path for the shape's geometry
    set the path into the clipping region
    offset the path by the shadow offset
    set the offset path into the clipping region using complement setting
    draw the path as a filled region using the shadow brush
    restore graphics state
}
```

Hit Test Behavior

In response to mouse action(s) and/or invalidated region(s), the design surface can query the Diagram 210 (which in turn queries the diagram's graph object) to determine which shape(s) are affected. The design surface view is responsible for converting the regions into rectangles to be used when querying the graph object. The shapes themselves can support fine grained hit testing since the Graph Object only works on bounding rectangles. For example, a rounded rectangle has small regions in the corners which lie within the bounding rectangle but are outside the shape's perimeter. Therefore, the Graph object will return all shapes (including those in sub-containers) whose bounding rectangles coincide with the hit test point, and the DoHitTest( ) method of each potential shape can be called in z-order for final determination with respect to fine grained selection of the shape itself as well as internal shape field selection. The graph object has no knowledge of shape fields, so this functionality is provided by the shapes themselves.

The Geometry object of the shape is delegated the task of determining whether the hit point lies within the interior of the shape. If so, then the shape's fields are tested to determine which was selected.

The following demonstrates how a ShapeElement's DoHitTest( ) method can operate:

```
virtual bool DoHitTest(args)
{
    if ( Geometry.DoHitTest(args))
    {
        for (each shapeField in this shape )
        {
            if ( shapeField.DoHitTest( args ) )
            {
                // save the shape field as a hit target
            }
        }
        return true;
    }
    return false;
}
```

Shape Folding Behavior

As stated above, the Graph object is only capable of supporting rectangular boundaries for its shapes. Complex outlining of a shape therefore requires "folding" a connector to the perimeter of a shape. This is accomplished by constructing a vector from two points. The vectorXY point marks the base of the vector. The potentialXY marks the point that the graph object determines that the vector intersects the bounding rectangle of the shape. The method returns the point where the vector intersects the actual perimeter of the shape.

Figure 27:
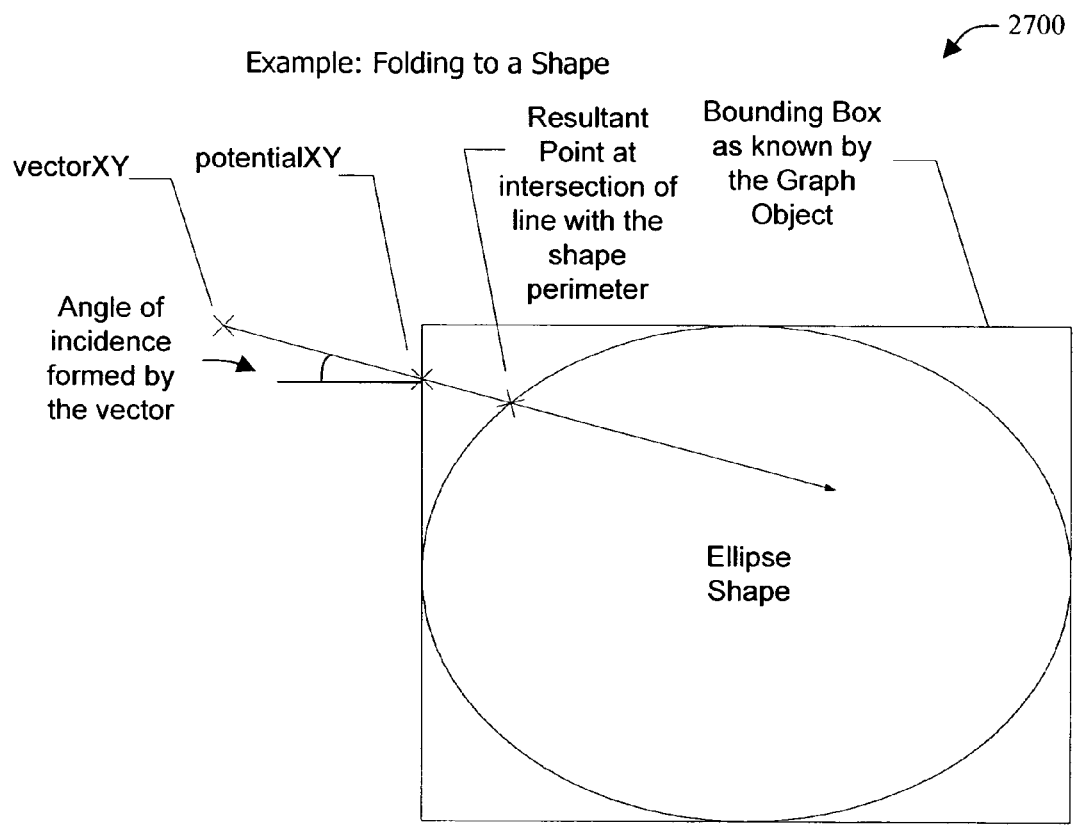
FIG. 27 is a diagram of an exemplary user interface in accordance with an aspect of the present invention.

Referring to FIG. 27, an exemplary user interface 2700 in accordance with an aspect of the present invention is illustrated. In this example, an elliptical shape is held by the graph object. A connector is "folded" to the perimeter of the ellipse. The following demonstrates how a ShapeElement's DoFoldToShape( ) method delegates to the geometry object by default:

```
virtual DoFoldToShape(args)
{
    return Geometry.DoFoldToShape(args);
}
```

Resource Cache

To draw a shape, the shape has access to any number of fonts, pens, and brushes. In an application containing perhaps tens of thousands (or even hundreds of thousands) of shapes and subshapes, management of these resources is important. The diagram and diagram shapes should minimize their use of memory and graphical resources without taking away functionality, perceptible performance, or ease of use for the shape developer to access and use them. By introducing a resource cache to the design surface, a means of sharing common resources among shapes and diagrams is provided.

The resource cache can be thought of as a pool of resource descriptions coupled with their corresponding font, pen, or brush resource. The resource cache is global across the entire application, so it is implemented as a singleton class which is instantiated the first time it is used. It can be optimized to locate a resource quickly given the resource description.

The relevant methods are GetPen( ), GetBrush( ), and GetFont( ). These methods take a resource description (a PenInfo, BrushInfo, or FontInfo which will be described later) and return a system drawing resource such as a pen, brush, or font. If a GDI+ resource does not exist which matches the resource description, a new resource descriptor will be created and its reference returned.

Internally, the resource cache contains maps of pen, font, and brush descriptors. A descriptor is comprised of the actual resource, the description of the resource, and a method to clone the private resource.

Figure 28:
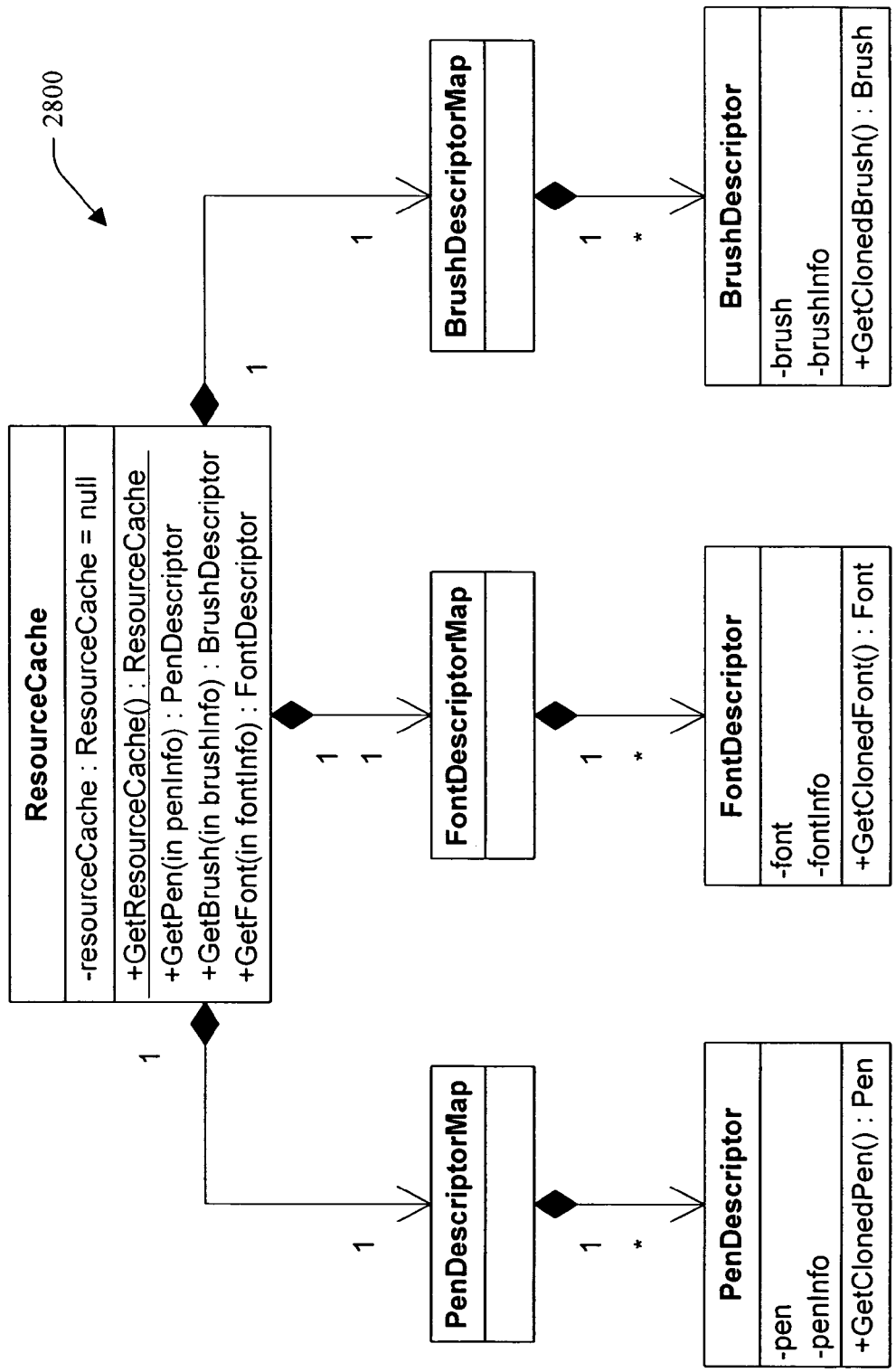
FIG. 28 is a diagram of an exemplary ResourceCache class in accordance with an aspect of the present invention.

Referring to FIG. 28, exemplary ResourceCache class 2800 in accordance with an aspect of the present invention is illustrated.

Named Resources

It can be useful to abstract the use or meaning of the pen, brush, or font from its appearance. The drawing code does not care what the pen, brush, or font looks like. However, it does care about the fact that it can get the shape's outline pen or the shape's background brush.

In accordance with an aspect of the present invention, an abstraction for shapes, for example, named resources is provided. A named resource associates a name with a resource in the ResourceCache.

The shape developer refers to the resource based on its meaning within the shape. The meaning of the resource is indicated by the name of the desired resource. This abstracts the meaning from the actual appearance that can be altered later independently.

Exemplary predefined resource identifiers include, but are not limited to:

```
public sealed class DiagramPens
{
    public static StyleSetResourceId DiagramOutline {get;}
    public static StyleSetResourceId ShapeOutline {get;}
    public static StyleSetResourceId ShapeTitleOutline {get;}
    public static StyleSetResourceId ShapeSubtitleOutline {get;}
    public static StyleSetResourceId ConnectionLine {get;}
    public static StyleSetResourceId ConnectionLineGhost {get;}
    public static StyleSetResourceId ConnectionLineDecorator {get;}
    public static StyleSetResourceId SelectionPrimaryOutline {get;}
    public static StyleSetResourceId SelectionNonPrimaryOutline {get;}
    public static StyleSetResourceId GridLines {get;}
    public static StyleSetResourceId Lasso {get;}
    public static StyleSetResourceId ZoomLasso {get;}
    public static StyleSetResourceId ShapeResizeOutline {get;}
    public static StyleSetResourceId SelectionGrabHandles {get;}
}
public sealed class DiagramBrushes
{
    public static StyleSetResourceId DiagramTitleBackground {get;}
    public static StyleSetResourceId DiagramSubtitleBackground {get;}
    public static StyleSetResourceId DiagramBackground {get;}
    public static StyleSetResourceId ShapeTitleBackground {get;}
    public static StyleSetResourceId ShapeSubtitleBackground {get;}
    public static StyleSetResourceId ShapeBackground {get;}
    public static StyleSetResourceId Shadow {get;}
    public static StyleSetResourceId PrimaryGrabHandles {get;}
    public static StyleSetResourceId SecondaryGrabHandles {get;}
    public static StyleSetResourceId CommentTitleBackground {get;}
    public static StyleSetResourceId CommentBackground {get;}
    public static StyleSetResourceId DiagramTitleText {get;}
    public static StyleSetResourceId DiagramSubtitleText {get;}
    public static StyleSetResourceId DiagramText {get;}
    public static StyleSetResourceId ShapeTitleText {get;}
    public static StyleSetResourceId ShapeSubtitleText {get;}
    public static StyleSetResourceId ShapeText {get;}
    public static StyleSetResourceId ConnectionLineText {get;}
    public static StyleSetResourceId CommentTitleText {get;}
    public static StyleSetResourceId CommentText {get;}
    public static StyleSetResourceId Selection {get;}
    public static StyleSetResourceId ConnectionLineDecorator {get;}
    public static StyleSetResourceId SelectionGrabHandles {get;}
}
public sealed class DiagramFonts
{
    public static StyleSetResourceId DiagramTitle {get;}
    public static StyleSetResourceId DiagramSubtitle {get;}
    public static StyleSetResourceId Diagram {get;}
    public static StyleSetResourceId ShapeTitle {get;}
    public static StyleSetResourceId ShapeSubtitle {get;}
    public static StyleSetResourceId ShapeText {get;}
    public static StyleSetResourceId ConnectionLine {get;}
    public static StyleSetResourceId CommentTitle {get;}
    public static StyleSetResourceId CommentText {get;}
}
```

Style Sets

In one example, the developer does not have to create common named resources such as the shape's outline pen, the shape's background brush, and the shape's text font. Instead, a base set of predefined named resources is available to the developer for immediate use. Having a base set of predefined named resources:

The developer should be able to customize the predefined named resources on a per shape instance basis, on a per shape class basis, and on a per application basis.

The developer should be able to add new named resources both on a per shape class basis and on a per application basis.

The developer should be able to define certain properties on each resource as immutable since they may carry semantic meaning. For example, changing a pen from a dashed line to a solid line changes the appearance of an ORM value type to look like an ORM entity type. This behavior must therefore be prohibited.

Furthermore, the developer can get default functionality from the Geometry object, which means that the Geometry object should assume (by default) the common resources when drawing.

The end user also has a few customization requirements to address:

The end user needs the ability to customize shape appearance on a per application basis. For example, in Visual Studio, the user can modify font and color via the Options dialog.

The end user needs the ability to change shape appearance on a pe r shape instance basis.

Referring briefly to FIG. 29, an exemplary StyleSet class 2900 in accordance with an aspect of the present invention is illustrated. The StyleSetclass 2900 can address the above needs, as the Shape can be given a StyleSet property which returns a StyleSet object. A StyleSet is essentially a group of named resources, with each resource being retrievable by a meaningful identifier. Resources within the style set can be added, removed and modified.

Resource Inheritance

In one example, there are three levels of inheritance, thus three levels of style sets:

The application style set is an application-wide default style set whose class (ApplicationStyleSet) is directly derived from StyleSet. The application style set is instantiated on a per-application basis. It provides the base pool of predefined resources. This contains such predefined resources such as the shape outline pen and the shape background brush. The ApplicationStyleSet is intended to be customizable by the end user.

The class style set is a style set shared among all instances of a particular shape class (e.g., the default style set for the shape type). The class style set inherits the resources from the application style set.

The instance style set is a style set belonging to a single shape instance. This maintains instance-level resource properties that are different from its class style set. It has the ability to update based on IMS properties on the shape. The instance style set inherits all the resources from the class style set.

Each style set has a collection of PenDescriptors. If a pen is overridden for a particular style set, then there will be an entry in that style set's PenDescriptor collection. The key for the collection is the pen id (a StyleSetResourceId) and, of course, the value is a PenDescriptor. The PenDescriptor keeps track of the pen description (color, width, etc) and a reference to the pen in the resource cache. If the pen is never asked for, it is never created, and the pen reference remains null.

Figure 30:
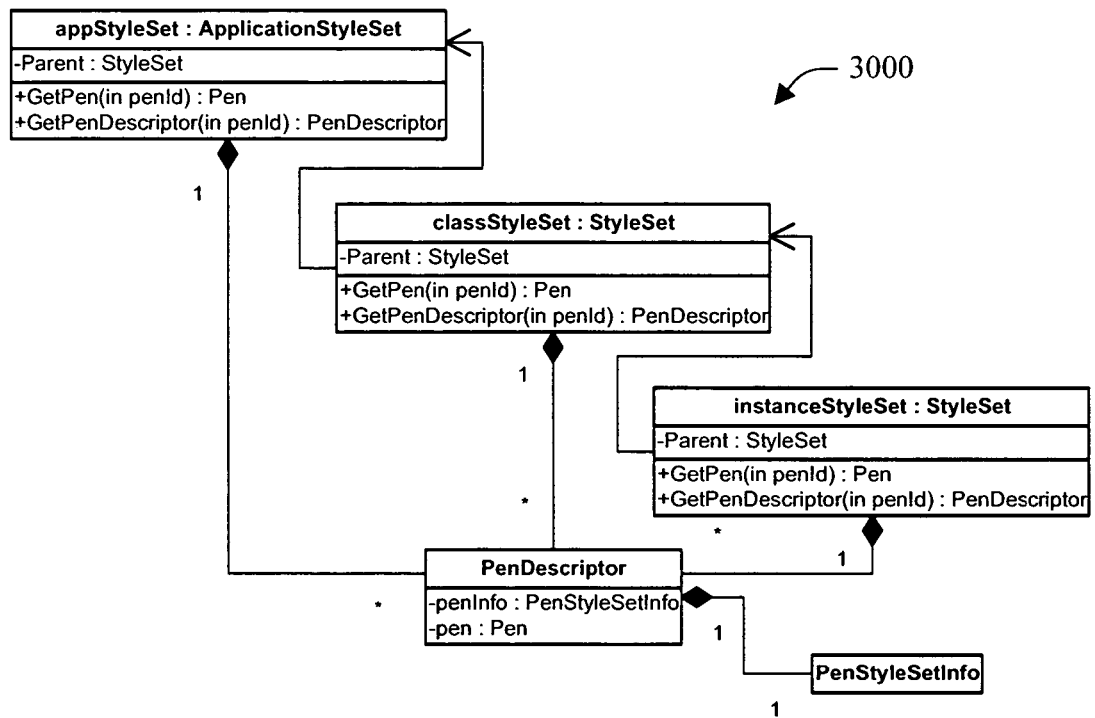
FIG. 30 is a diagram of an exemplary ApplicationStyleSet class in accordance with an aspect of the present invention.

FIG. 30 illustrated an exemplary ApplicationStyleSet class 3000 in accordance with an aspect of the present invention.

To describe the resource inheritance process, a pen retrieval example can be used:

In a shape's drawing code, the shape calls its instance style set's GetPen method to retrieve a pen of a specified pen id such as ShapeOutline before drawing.

If the instance style set had the ShapeOutline pen defined, then it would be in the instance style set's collection of PenDescriptors. Thus, GetPenDescriptor(ShapeOutline) is called to search for the pen descriptor in the instance style set. If the pen descriptor was found (meaning that an override was found), then the pen can be retrieved from the pen descriptor and our search is done.

If the instance style set did not have the ShapeOutline pen, then GetPenDescriptor(ShapeOutline) is called on the class style set, which is considered the parent style set of the instance style set. If the pen descriptor was found (meaning that an override was found), then the pen can be retrieved from the pen descriptor and our search is done.

If the class style set did not have the ShapeOutline pen, then GetPenDescriptor(ShapeOutline) is called on the application style set, which is considered the parent style set of the class style set. If the pen descriptor was found, then the pen can be retrieved from the pen descriptor and our search is done. In this example, ShapeOutline is guaranteed to exist, so it will always be returned. However, in the case where a pen descriptor was not found, the ShapeOutline pen will be returned since it is guaranteed to exist. (Pre-defined resources cannot be deleted.)

Style Set Initialization

Initializing the Application Style Set

There is only one application style set per process. The ApplicationStyleSet is a singleton which is instantiated the first time it is referenced.

The ApplicationStyleSet constructor is responsible for calling AddPen, AddBrush, and AddFont for every pre-defined resource. (See the section Adding a resource to a style set.)

The application style set, when calling AddPen, AddBrush, and AddFont during the constructor, will call system level methods to get defaults.

The application style set can be modified by OverridePen, OverrideBrush, and OverrideFont. Since this style set is the base style set, these methods replace the base resource.

Initializing the Class Style Set

There is one class style set per shape class. The class style set is a static member of every ShapeElement-derived class.

The first time the class style set is referenced:
  The class style set is instantiated.
  InitializeResources on the ShapeElement is called. The shape developer can initialize the class style set here. This method is primarily for ease of use—to point the shape developer to the class style set at the right time.
    protected virtual void InitializeResources(StyleSet classStyleSet)

Initializing the Instance Style Set

There is one instance style set per shape instance. An empty instance style set is created when it is first referenced.

The lifetime of the instance style set follows its shape instance.

InitializeInstanceResources on the ShapeElement is called. The shape developer can initialize the instance style set here. This method is primarily for ease of use—to give the shape developer a chance to set the instance style set at the right time.
    protected virtual void InitializeInstanceResources( )

The following ShapeElement methods can be called from InitializeResources in ShapeElement-derived classes. These methods provide a simple way to link up IMS properties on the shape with a specific resource.

```
public void RegisterForPropertyChangedEvent(Store store, Guid
metaAttributeGuid)
public void RegisterForPropertyChangedEvent(Store store, Guid
proxyMetaAttributeGuid, Guid realMetaAttributeGuid)
```

The RegisterForPropertyChangedEvent methods are responsible for subscribing to the attribute changed events. Rather than subscribe on a per shape instance, per shape class can be subscribed. The event handler will invalidate the shape instance that changed. This causes the shape to be repainted. Instance specific resources can then be changed in the OnBeforePaint method that is called by the design surface.

Immutability

The PenSettings, BrushSettings, and FontSettings structures maintain override information. When OverridePen, OverrideBrush, or OverrideFont is called, only the overridden information is transferred to the actual resource description. If nothing was overridden, no transfer takes place. The setter of each property keeps track if it was actually called, marking that property as overridden.

A particular property can be marked as immutable, such as the pen color. If so, then any attempt to set the property will be ignored.

```
public Color Color
{
    get
    {
        return this.PenStyleSetInfo.Color;
    }
    set
    {
        if (!IsImmutable(PenSettingsFlags.Color))
        {
            // marks property as overridden
            Override(PenSettingsFlags.Color);
            // set property value
            this.PenStyleSetInfo.Color = value;
        }
    }
}
```

To make a particular property immutable, the following type of <Resource> Settings property can be called:

```
public bool ImmutableColor
{
    get
    {
        return IsImmutable( PenSettingsFlags.Color );
    }
    set
    {
        // cannot clear once set.
        if ( value )
        {
            SetImmutable( PenSettingsFlags.Color );
        }
    }
}
```

Adding a Resource to a Style Set

Resources can be added to a style set through the methods below:

```
public void AddPen( StyleSetResourceId newPenID, StyleSetResourceId
basePenID, PenSettings penSettings )
public void AddBrush( StyleSetResourceId newBrushID,
StyleSetResourceId baseBrushID, BrushSettings brushSettings )
public void AddFont( StyleSetResourceId newFontID, StyleSetResourceId
baseFontID, FontSettings fontSettings )
```

The methods above associate a resource id with a description of the resource. They do not create the resource. The resources are created just before they are actually used. A weak reference to the resources are maintained.

The PenSettings, BrushSettings, and FontSettings are structures used to define the resource properties to override and their new values. If no resource properties are set in any of the structures, the resource is not added.

Application Style Set

Only the predefined resources are added during initialization.

Additional resources beyond the predefined resources may be added.

Class Style Set

Additional resources beyond the predefined resources may be added.

Instance Style Set

Not permitted in this example.

Modifying a Resource

Resources in a style set can be modified using the methods below:

```
public virtual void OverridePen( StyleSetResourceId penID, PenSettings
penSettings )
public virtual void OverrideBrush( StyleSetResourceId brushID,
BrushSettings brushSettings )
public virtual void OverrideFont( StyleSetResourceId fontID, FontSettings
fontSettings )
public virtual void ClearPenOverride( StyleSetResourceId penID )
public virtual void ClearBrushOverride( StyleSetResourceId brushID )
public virtual void ClearFontOverride( StyleSetResourceId fontID )
```

OverridePen, OverrideBrush, and OverrideFont do not create resources. Rather, they set the resource description for a given resource id (e.g., overriding the inherited resource description). That is, the instance style set inherits from the class style set; the class style set inherits from the application style set.

The override process is two step. Consider an overridden pen on a class style set as an example:

First the inherited pen descriptor of the specified pen id must be found. This is done via GetPenDescriptor on the StyleSet class. The GetPenDescriptor looks for the pen descriptor in the style set. If it is found, it is returned. Otherwise, it asks its parent style set for the pen descriptor of the specified pen id. This continues until the application style set is reached and a pen descriptor is returned.

```
internal virtual PenDescriptor GetPenDescriptor( StyleSetResourceId
penID )
{
```
-continued
```
    PenDescriptor penDescriptor = null;
    // Get the pen descriptor from this style set.
    if ( this.penDescriptors != null )
    {
        penDescriptor = this.penDescriptors[penID];
    }
    // If this style set doesn't have it, go up the parent hierarchy
    // and find it. Eventually, the application style set will be
    // reached, and a default resource will be given.
    if ( penDescriptor == null && this.Parent != null )
    {
        PenDescriptor penDescriptor =
this.Parent.GetPenDescriptor(penID);
    }
    if ( penDescriptor == null )
    {
        // This should never happen as the pen descriptor should
always be found
        throw new ArgumentOutOfRangeException( "penID" );
    }
    return penDescriptor;
}
```

The pen descriptor for the class style set is created by starting with the values from the inherited application style set PenDescriptor and replacing values from PenSettings.

Clearing an override removes the overridden resource description and the inherited resource description is used instead.

Application Style Set

Overriding a resource in the application style set

Class Style Set

Overriding a resource in the class style set means that the resource inherited from the application style set can be modified by the specified PenSettings, BrushSettings, or FontSettings.

Instance Style Set

Overriding a resource in the instance style set means that the resource inherited from the class style set can be modified by the specified PenSettings, BrushSettings, or FontSettings.

Getting a Resource

The actual GDI+ resources can be retrieved through the methods below:

```
public Pen GetPen( StyleSetResourceId penID )
public Brush GetBrush( StyleSetResourceId brushID )
public Font GetFont( StyleSetResourceId fontID )
```

Getting a resource follows a specific search sequence until the resource is found. The sequence is as follows:

The shape's instance style set is searched first (if the shape instance happens to have one).

The shape's class style set is searched next.

The application style set is searched last, and a default resource is returned if the requested resource is not found.

When a resource is found by the style set mechanism, a clone is returned. This implies that the client code can modify the resource without modifying the original resource. Performance measurements indicate that cloning an existing resource object performs much better than creating one from scratch using new( ), but returning the resource directly performs the best. If immutable GDI+ resources are implemented, then direct access to the resource can be provided.

Propagating Changes of a Base Style Set

If the application style set changes, then the class style sets and the instance style sets need to mark their resources as invalid so that the next time they are used, they are reinitialized.

Likewise, if the class style set changes, then the instance style sets need to mark their resources as invalid.

Removing a Resource from a Style Set

Resources can be removed from a style set through the methods below:

```
public void RemovePen( StyleSetResourceId penID )
public void RemoveBrush( StyleSetResourceId brushID )
public void RemoveFont( StyleSetResourceId fontID )
```

Predefined resources are not allowed to be removed in this implementation but that should not be considered as the only option available.

High contrast

Color Choice

Pen color(s) and font color(s) can be contrasted with background brush color(s) in the Application Style Set. In one example, the base color mapping in the Application Style Set will be used strictly for supporting high contrast. It is not intended to provide reasonable default colors since the designers typically will want to override the colors anyway. Therefore, in this example, the default base color mapping in the Application Style Set should be as follows (with a few exceptions):

Solid background brushes should be SystemColors.Window by default

Hatch background brushes should have a BackColor of SystemColors.Window and a ForeColor of SystemColors.WindowText.

Pen colors should be SystemColors.WindowText by default.

Font colors should be SystemColors.WindowText by default. (Font colors are specified using brushes.)

In this example, the colors SystemColors.Window and SystemColors.WindowText were chosen to support both black-on-white and white-on-black.

To provide reasonable default colors, the Application Style Set will override its own base resources after the base resources have been initially defined. The following resources will be overridden to provide a more palatable appearance:

zoomLasso pen: the color will be overridden and set to Color.DarkGreen.

The shape developer can also choose to override the same application style set resources. For example, fore color and font can be set by overriding the resources in the application style set. In this case, the default overrides are replaced by those provided by the shape developer.

To enable the above, a single internal style set can be maintained within the application style set singleton.

The internal StyleSet will not be visible outside of the ApplicationStyleSet.

The internal StyleSet will be initialized with substantially all the predefined pens, brushes, and fonts. The settings of the resources are chosen primarily for high contrast support.

The internal StyleSet should never be modified after it is initialized. (Override, Remove, etc should not be called.)

The internal StyleSet allows the ApplicationStyleSet to be overridden by shape developers without disturbing the high-contrast color mappings.

For better maintainability, a new BaseStyleSet class can be derived from StyleSet as the type for the internal style set. This will enforce the assumptions listed above.

Resolving Resources

When SystemInformation.HighContrast is set to true, then substantially all overridden colors (including application style set overrides) are ignored. The color properties of fonts, pens, and brushes will be made temporarily immutable at the application style set level. If SystemInformation.HighContrast is set to false, then resolution of colors is performed normally by traversing the style set hierarchy.

To force a re-resolution of the resources, the ResolvedBaseXxSettings and ResolvedXxDescriptor properties of the XxSettingsStruct must be nulled out. The StyleSet will have a new method RecomputeResources which will iterate all of its local XxSettingsStructs and null out the aforementioned properties. The ApplicationStyleSet will have a RecomputeAllResources method that will call its own RecomputeResources as well as iterate every shape instance and invoke RecomputeResources on both the instance style set as well as the class style set.

Updating Resources

The colors will be updated when the following events occur:

Creation of diagram.

Loading of diagram.

System Display Properties changed: Since some system colors may not be overridden (such as diagram background, lasso, and focus indicators), these need to be updated when system display properties are changed. The DiagramClientView's OnSystemColorsChanged method will call the ApplicationStyleSet's RecomputeAllResources.

High Contrast mode changed. The DiagramClientView's OnSystemColorsChanged method will call the ApplicationStyleSet's RecomputeAllResources.

Color Assignments

Exemplary color assignments of base resources in the application style set are:

| Pens (Default: Color=(SystemColors.WindowText) unless otherwise specified) | |
|---|---|
| shapeOutline | Default |
| shapeTitleOutline | Default |
| shapeSubtitleOutline | Default |
| connectionLine | Default |
| connectionLineGhost | Color=(SystemColors.GrayText) |
| connectionLineDecorator | Default |
| gridLines | Color=(SystemColors.GrayText) |
| lasso | Color=(SystemColors.GrayText) |
| zoomLasso | default -- override( Color= (Color.DarkGreen)) |
| shapeResizeOutline | Color=(SystemColors.GrayText) |
| selectionGrabHandles | Default |
| focusIndicatorBackground | Color=(SystemColors.Window) |
| focusIndicator | Default |

| Brushes (Default: Color=(SystemColors.Window) and SolidBrush unless otherwise specified) | |
| --- | --- |
| diagramTitleBackground | Default |
| diagramSubtitleBackground | Default |
| diagramBackground | Default |
| shapeTitleBackground | Default |
| shapeSubtitleBackground | Default |
| shapeBackground | Default |
| shapeBackgroundSelected | Color=(SystemColors.Highlight); SolidBrush |
| shapeBackgroundSelectedInactive | Color= (SystemColors.InactiveCaption); SolidBrush |
| shadow | Color=(SystemColors.WindowText); SolidBrush |
| commentBackground | Default |
| selection | ForeColor=(SystemColors.GrayText); BackColor=(SystemColors.Window); HatchBrush |
| connectionLineDecorator | Color=(SystemColors.WindowText); SolidBrush |
| selectionGrabHandles | Default |

| Text Brushes (Default: Color=(SystemColors.WindowText) and SolidBrush unless otherwise specified) | |
| --- | --- |
| diagramTitleText | Default |
| diagramSubtitleText | Default |
| diagramText | Default |
| shapeTitleText | Default |
| shapeSubtitleText | Default |
| shapeText | Default |
| shapeTextSelected | Color=(SystemColors.HighlightText); SolidBrush |
| shapeTextSelectedInactive | Color=(SystemColors.InactiveCaptionText); SolidBrush |
| connectionLineText | Default |
| commentText | Default |

List Field

This section describes the list field, a shape field capable of displaying a list of items efficiently.

Adding a List Field to a Shape

To add a list field to a shape:

1. In the InitializeShapeFields of the parent shape class, instantiate a ListField and call the ShapeFieldCollection.Add method. This will add a list field for every shape instance of the parent shape class.

```
protected override void InitializeShapeFields( ShapeFieldCollection shapeFields )
{
    ListField listField = new ListField( );
    listField.BoundsBehaviors.SetTopAnchor(BoundsBehavior.Edge.Top, 0);
    listField.BoundsBehaviors.SetLeftAnchor(BoundsBehavior.Edge.Left, 0);
    listField.BoundsBehaviors.SetRightAnchor(BoundsBehavior.Edge.Right, 0);
    listField.BoundsBehaviors.SetBottomAnchor(BoundsBehavior.Edge.Bottom, 0);
    listFieldKey = shapeFields.Add( listField );
}
```

2. Implement the IListFieldContainer interface on the parent shape class.

```
interface IListFieldContainer
{
    int GetItemCount(ListField listField);
    void GetItemDrawInfo(ListField listField, int row, ItemDrawInfo itemDrawInfo);
}
```

Setting the Contents of the List Field

The list field does not maintain its own contents. The parent shape class is responsible for maintaining this information. The list field requests from the parent shape what to draw. So instead of setting the contents of the list field, implement the IListFieldContainer.GetItemDrawInfo method on the parent shape class.

```
void GetItemDrawInfo(ListField listField, int row, ItemDrawInfo itemDrawInfo);
```

The ItemDrawInfo class contains the item text, item image, and item state.

Inserting and Deleting Items

To insert or delete an item, update your own list of items and then invalidate the shape. This will cause GetItemDrawInfo to be called again for substantially all items.

Sorting

To sort the list field, update your own list of items and invalidate the shape. This will cause GetItemDrawInfo to be called again for all items.

Customizing the Appearance of the List Field

By default, the list field will use the following style set resources of its parent shape:

DesignSurfaceFonts.ShapeText for the normal font of an unselected item

DesignSurfaceBrushes.ShapeText for the color of normal text (unselected item)

DesignSurfaceBrushes.ShapeBackground for the background of normal text (unselected item)

DesignSurfaceBrushes.ShapeSelectedText for the color of selected text

DesignSurfaceBrushes.ShapeSelectedBackground for the background of selected text In order for the list field text and background to be different from the standard shape text and background:

1. Override the InitializeResources method of the parent shape class.

2. In the body of the InitializeResources method, call AddPen, AddBrush, and AddFont on the class style set to add your custom resources.

3. To make the list field use those custom resources, set the following ListField properties in the InitializeShapeFields method of the parent shape class:

NormalFontID—normal font for an unselected item

NormalTextBrushID—color for normal text

NormalBackgroundBrushID—background of normal text

SelectedTextBrushID—color of selected text

SelectedBackgroundBrushID—background of selected text

InactiveSelectedTextBrushID—color of selected text when the design surface doesn't have focus InactiveSelectedBackgroundBrushID—background of selected text when the design surface doesn't have focus FocusPenID and FocusBackgroundPenID—pens which draw one on top of the other to create the focus outline on the focused item.

ListCompartmentShape

The ListCompartmentShape sets a ListField with a CompartmentShape for convenience.

To customize the appearance of the ListCompartmentShape, override its InitializeShapeFields and customize the header text field and the list field.

```
protected override void InitializeShapeFields( ShapeFieldCollection
    shapeFields )
{
    base.InitializeShapeFields( shapeFields );
    HeaderTextField.DefaultText = "<Your ListField Title>";
    ListField.NormalFontID = DesignSurfaceFonts.ShapeText;
}
```

To define the contents of the list field, override the methods GetItemCount and GetItemDrawInfo.

```
public override int GetItemCount( ListField listField )
{
    return this.myItemCollection.Count;
}
public override void GetItemDrawInfo( ListField listField, int row,
    ItemDrawInfo itemDrawInfo )
{
    itemDrawInfo.Text = this.myItemCollection[row].Text;
}
```

Architecture and Detailed Design

Subfields

The list field introduces the need for a subfield for hit testing, focus, and selection. Items are selectable and an item can be a candidate for the property browser. A subfield is a general notion: for example, the subfield for a grid field is a cell, the subfield for a list field is an item, and the subfield for a radio button group field is a radio button.

ShapeSubField Class

Referring to FIG. 31, an exemplary ShapeSubField class 3100 in accordance with an aspect of the present invention is illustrated. The ShapeSubField class 3100 provides the base class for hit-testable, focusable, and/or selectable regions in a derived-ShapeField class. ShapeSubFields-derived objects are transient—they live only long enough to return hit-test information, to keep track of focus, to keep track of a selected item within a ShapeField, to support navigation, and to support IAccessible and WinEvents.

ShapeSubFields 3100 are not intended to live during the entire lifetime of the field since that is both an inefficient use of memory and would degrade performance. For example, a simple 5 by 10 grid field would require instantiating 50 ShapeSubFields 3100, not including all the grid lines and row headers.

A subfield can be (1) focusable and selectable, (2) focusable only, or (3) neither focusable nor selectable. The subfield is queried for this information via GetFocusable and GetSelectable. Since shape subfields can receive focus, focusable subfields can respond to OnKeyDown, OnKeyUp, and OnKeyPress. Subfields can also respond to mouse events as well.

To provide cursor feedback and to activate a mouse action, a subfield can also respond to GetPotentialMouseAction. The mouse action returned by this method will be activated on the next MouseDown if the mouse is still over the subfield.

DiagramItem Class

Next, turning to FIG. 32, an exemplary DiagramItem class 3200 in accordance with an aspect of the present invention is illustrated. A subfield is defined by its container shapefield and container shape. The DiagramItem class 3200 captures this information together. The DiagramItem 3200 is intended to represent a subfield that has been hit, focused, or selected. It can also represent a shape by nulling out the field and subfield, and a field by nulling out the subfield.

Hit Testing and Painting

DiagramHitTestInfo

Turning to FIG. 33, an exemplary DiagramHitTestInfo structure 3300 in accordance with an aspect of the present invention is illustrated. The DiagramHitTestInfo structure 3300 includes the concept of subfields, as discussed above.

DoHitTest and DoPaint

Next, referring to FIG. 34, an exemplary Shapefield class 3400 in accordance with an aspect of the present invention is illustrated. To allow for the subfield support in the DiagramHitTestInfo class, the DoHitTest and DoPaint methods on the ShapeField class have been modified as illustrated in FIG. 34.

DoHitTest can be modified to take a DiagramHitTestInfo which can return subfield information.

DoPaint can take the whole DiagramPaintEventArgs rather than just a Graphics parameter so that selection information can be examined. The selection information will also be expanded to support subfields. (DiagramPaintEventArgs contains a reference to the DiagramClientView which maintains the selection.)

Selection

SelectedShapesCollection

Referring to FIG. 35, an exemplary SelectedShapesCollection class 3500 in accordance with an aspect of the present invention is illustrated. To allow for the subfield support in the selection, the SelectedShapesCollection 3500 can be modified to include fields and sub fields. The new collection item will no longer be the ShapeElement. Rather, the collection item will be a DiagramItem, a class representing the selected ShapeElement, ShapeField, and ShapeSubField. In this example, if a ShapeSubField is selected, then all three member attributes must be set. If a ShapeField is selected, then ShapeSubField is null. If only the ShapeElement is selected, then only the ShapeElement is set; all others are null.

Anchor

The user can multi-select list items by:

1. Clicking on a list item and then shift+clicking on another list item within the same list field. In this case, the items between the two items are also added to the selection.
2. Clicking on a list item and then shift+clicking on another list item in a different list field. In this case, the items between the two items are not added to the selection.
3. Pressing navigational keys (such as Tab) with a modifier key depressed.

To support the above scenario, the SelectedShapesCollection employs a new Anchor property. The anchor object is different from the primary or focused object. The primary object is the last item in the selection. The anchor object, on the other hand, is the last clicked item in which the shift key was not pressed. Once shift+clicking begins, the anchor must not change.

```
public class SelectedShapesCollection : ICollection
{
    public SelectedDiagramItem Anchor {get; set; }
```

The SelectAction mouse tool is responsible for setting the Anchor property. If Shift+click is not performed in the same shape field as the anchor object, then the SelectAction should set the Anchor to null.

SelectAction.Select( )

The Select method of the SelectAction selects the diagram item under the mouse. The exact operation is altered by modifier keys.

protected void Select(DiagramMouseEventArgs mouseArgs)

The Select method will expand its responsibilities to include:

Finding the first focusable object and updating the FocusedItem property of the SelectedShapesCollection.

Finding the first selectable object and adding or removing one or more DiagramItems to the SelectedShapesCollection. This enables adding or removing fields and subfields to the selection.

Setting the Anchor property on the SelectedShapesCollection.

Figures 36A, 36B:
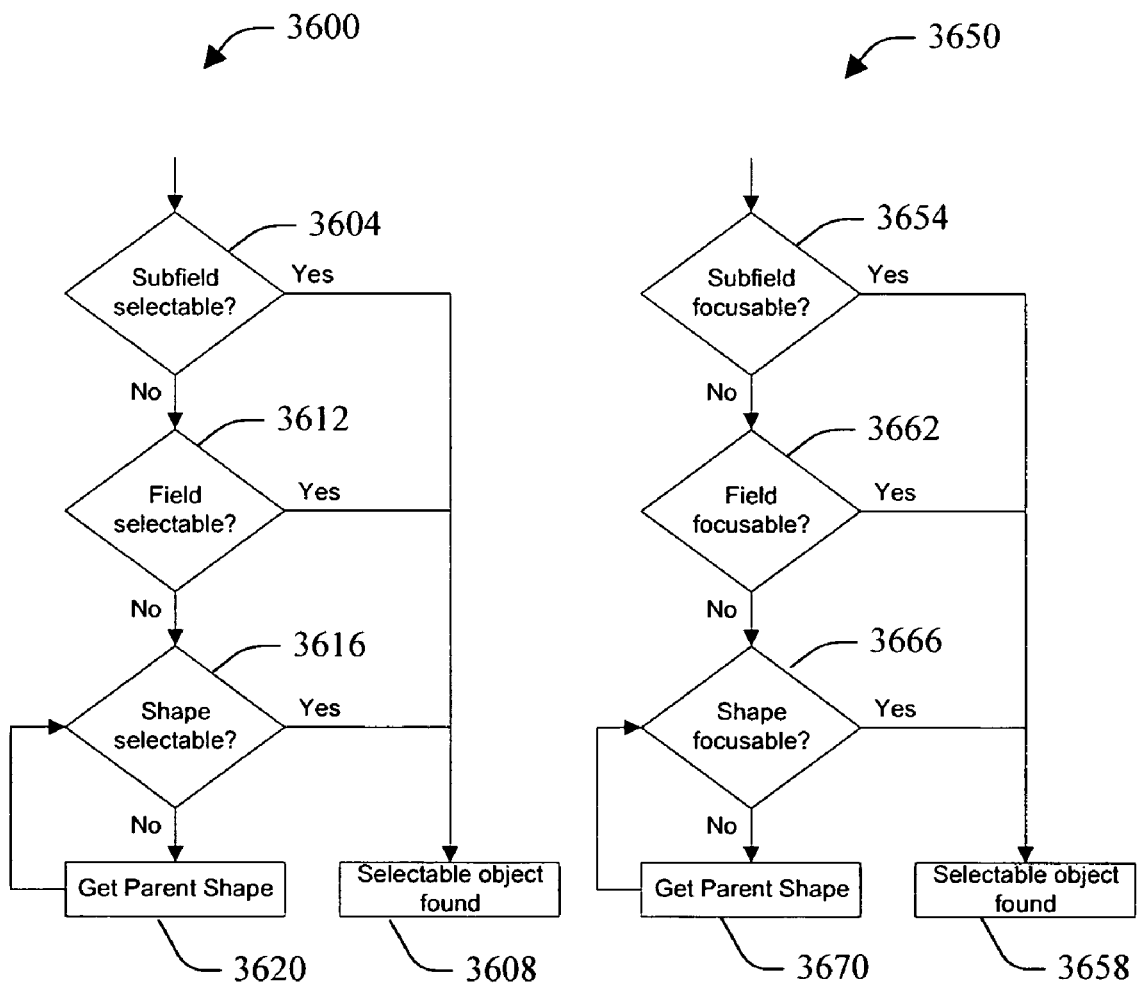
FIG. 36A is a flow chart of a method facilitating obtaining a first selectable object in accordance with an aspect of the present invention.
FIG. 36B is a flow chart of a method facilitating obtains a first focusable object in accordance with an aspect of the present invention.

Referring briefly to FIG. 36A, a method 3600 facilitating obtaining a first selectable object in accordance with an aspect of the present invention is illustrated. At 3604, a determination is made as to whether a subfield is selectable. If the determination at 3604 is YES, at 3608, the selectable object has been found, and no further processing occurs.

If the determination at 3604 is NO, at 3612, a determination is made as to whether a field is selectable. If the determination at 3612 is YES, processing continues at 3608. If the determination at 3612 is NO, at 3616, a determination is made as to whether a shape is selectable. If the determination at 3616 is YES, processing continues at 3608. If the determination at 3616 is NO, at 3620, the parent shape is obtained and processing continues at 3616.

Turning to FIG. 36B a method 3650 facilitating obtains a first focusable object in accordance with an aspect of the present invention is illustrated. At 3654, a determination is made as to whether a subfield is selectable. If the determination at 3654 is YES, at 3658, the selectable object is found, and, no further processing occurs.

If the determination at 3654 is NO, at 3662, a determination is made as to whether a field is focusable. If the determination at 3662 is YES, processing continues at 3658. If the determination at 3662 is NO, at 3666, a determination is made as to whether a shape is focusable. If the determination at 3666 is YES, processing continues at 3658. If the determination at 3666 is NO, at 3670, a parent shape is obtained, and, processing continues at 3666.

For example, the SelectAction mouse action, when responding to the mouse events, sets the Handled property in the DiagramEventArgs to false. This enables the shape, field, or subfield to respond to the mouse events such as OnMouseDown and OnMouseUp. For example, a button field or subfield will still be able to respond to the MouseDown and MouseUp events even though the SelectAction is the active mouse action.

Diagram.LassoSelect

In this example, lasso selection selects only shape elements; it will not include fields or subfields. Further, Lasso selection filters out non-selectable shapes prior to executing the selection rules.

Delete

If a shape is deleted, substantially all DiagramItems which refer to that shape are removed from the SelectedShapesCollection.

DiagramSelectionRules Class

Referring to FIG. 37, an exemplary DiagramSelectionRules class 3700 in accordance with an aspect of the present invention. The DiagramSelectionRules 3700 is updated to take a collection of DiagramItems rather than ShapeElements.

Keyboard Support

Subfields will be given the ability to respond to keyboard events. Further, referring to FIG. 38, an exemplary SelectedShapesCollection class 3800 in accordance with an aspect of the present invention is illustrated. The SelectedShapesCollection class 3700 has an additional property FocusedItem which keeps track of which object has the focus. A focused item is separate from the primary item in the selection in order to support multi-select and to set focus to an object which should not be selected, such as a button.

Turning to FIG. 39, an exemplary ShapesSubField class 3900 in accordance with an aspect of the present invention is illustrated. The keyboard event can be routed to the FocusedItem. If the focused item is the subfield, then the subfield will be given the chance to respond to it via its overridden OnKeyDown, OnKeyUp, and OnKeyPress.

Mouse Support

GetPotentialMouseAction

DiagramClientView.Cursor, .OnMouseDown, and OnMouseMove check for a potential mouse action if there is no active mouse action by calling ShapeElement.GetPotentialMouseAction. The potential mouse action is activated on MouseDown if the mouse is still over the hit object that supplied the potential mouse action.

Figure 40:
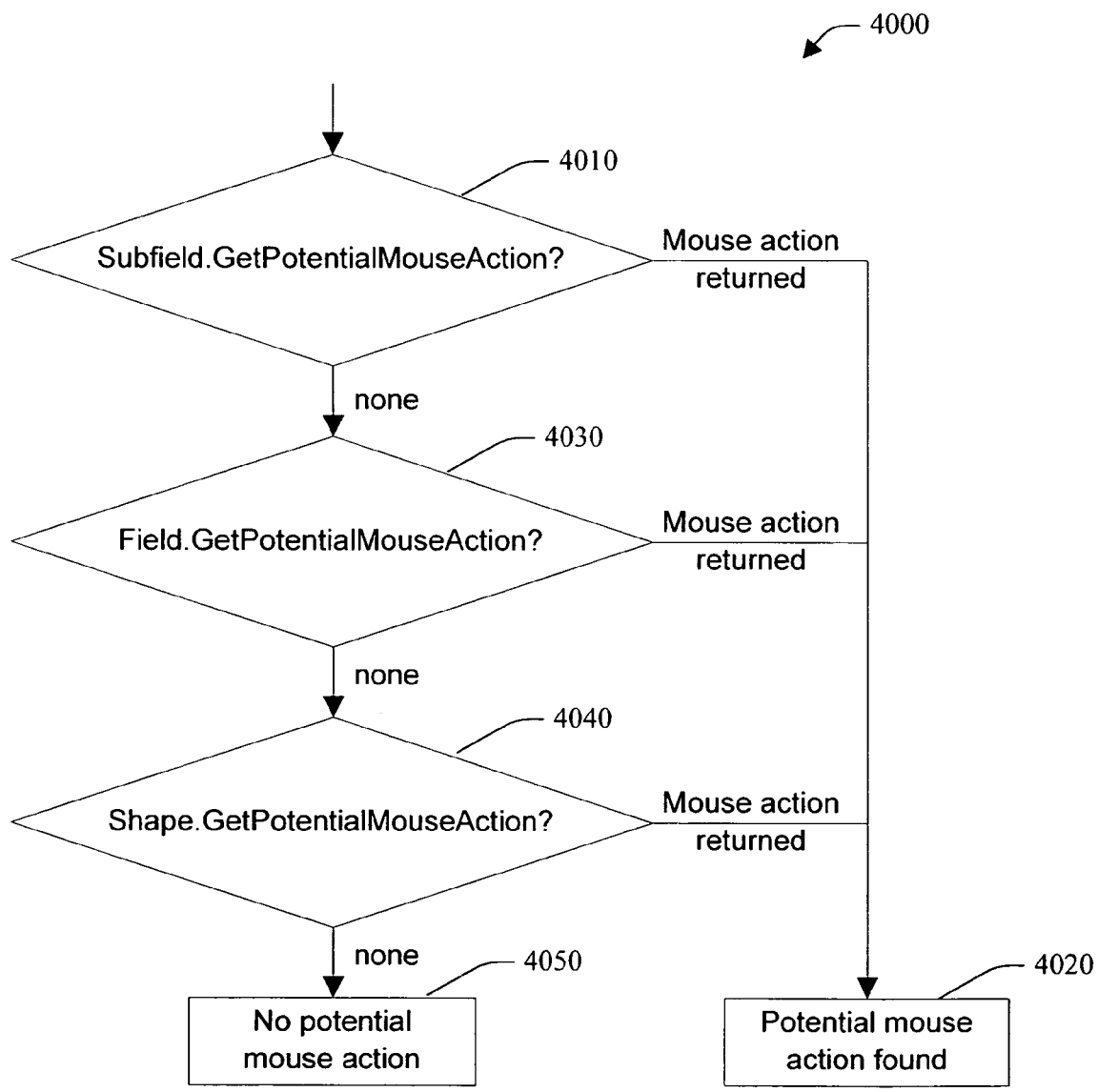
FIG. 40 is a flow chart of a method facilitating retrieval of a potential mouse action in accordance with an aspect of the present invention.
Figure 41:
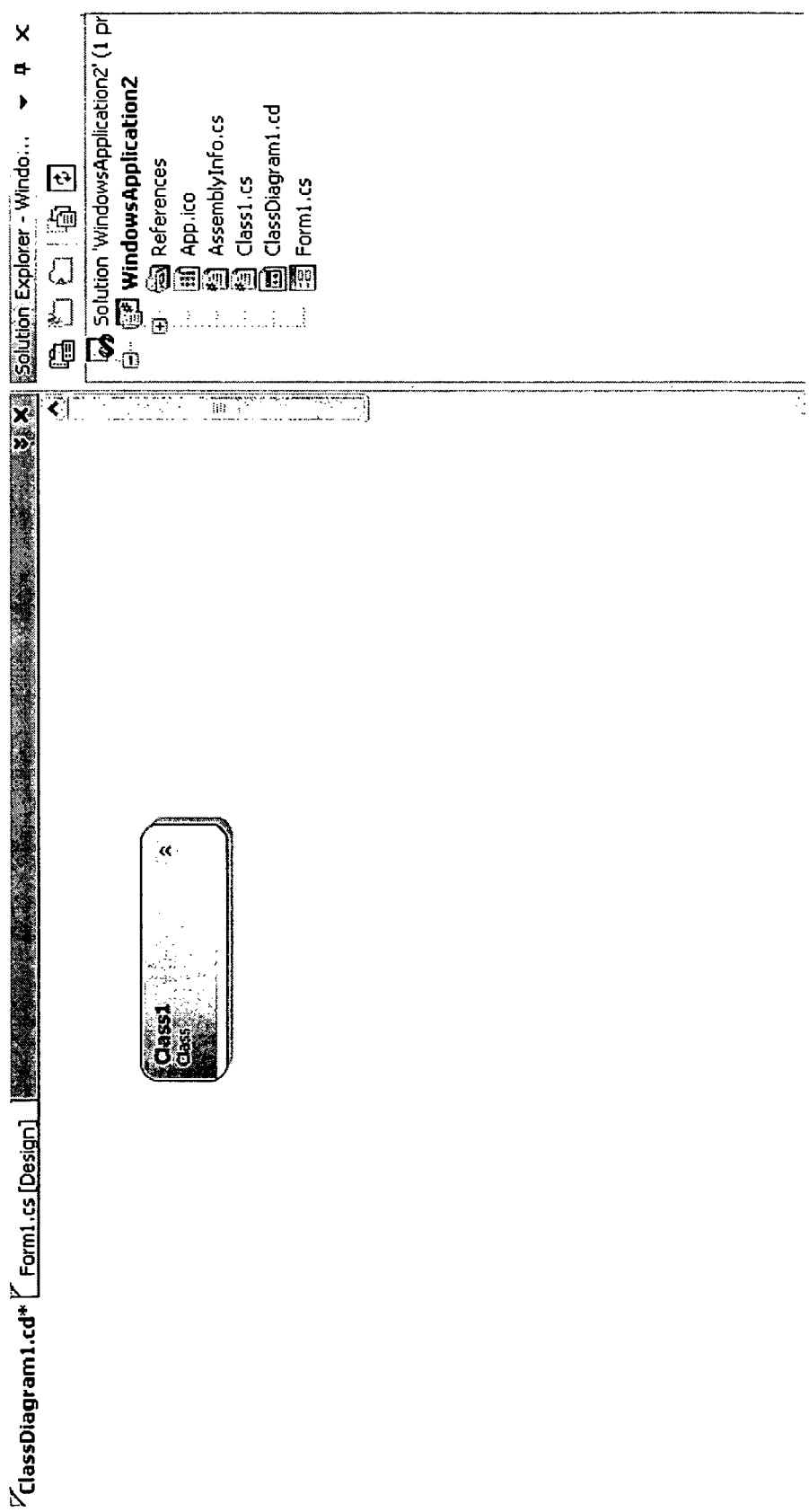
FIG. 41 is an exemplary user interface in accordance with an aspect of the present invention.
Figure 42:
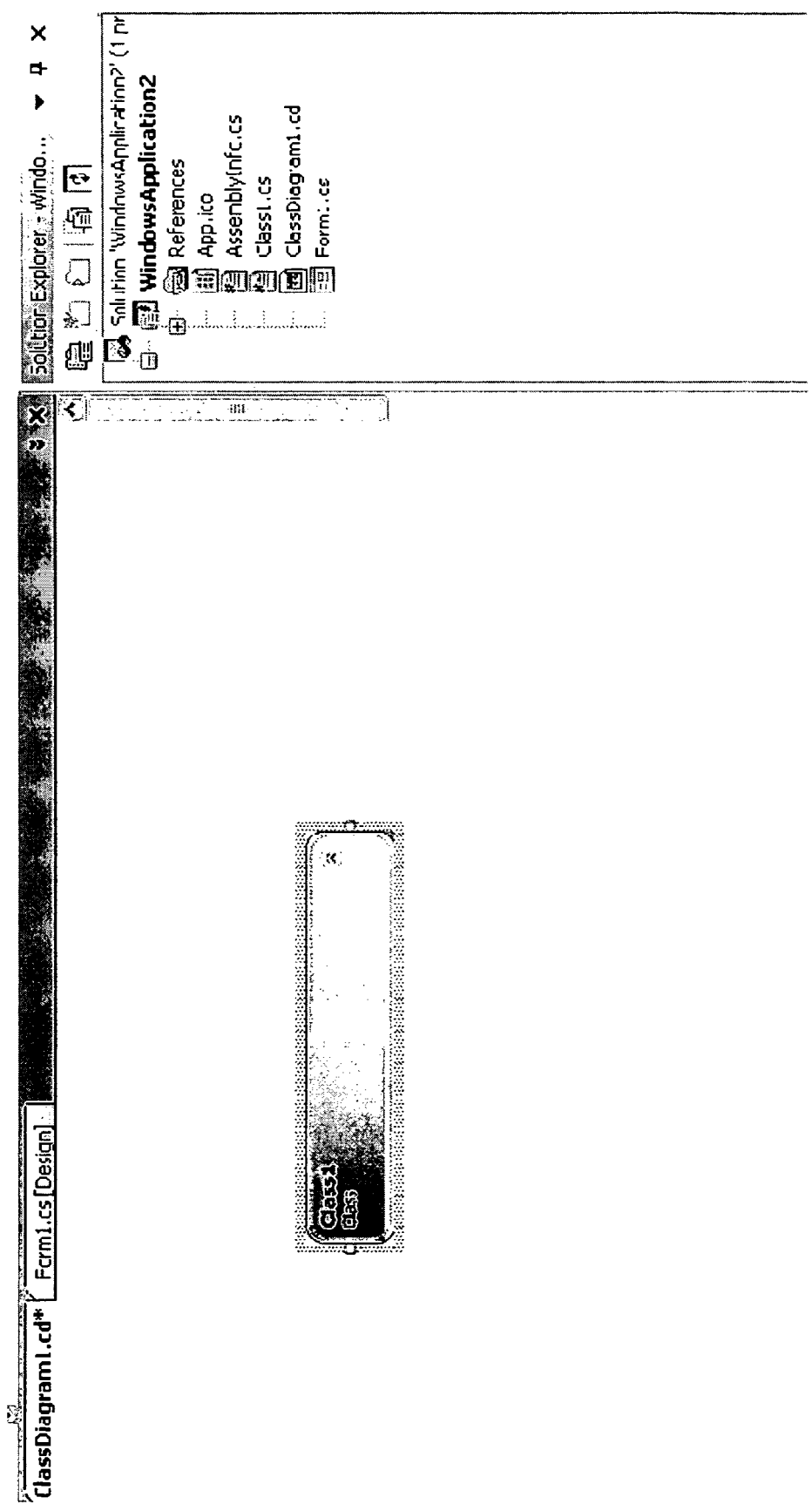
FIG. 42 is an exemplary user interface in accordance with an aspect of the present invention.
Figure 43:
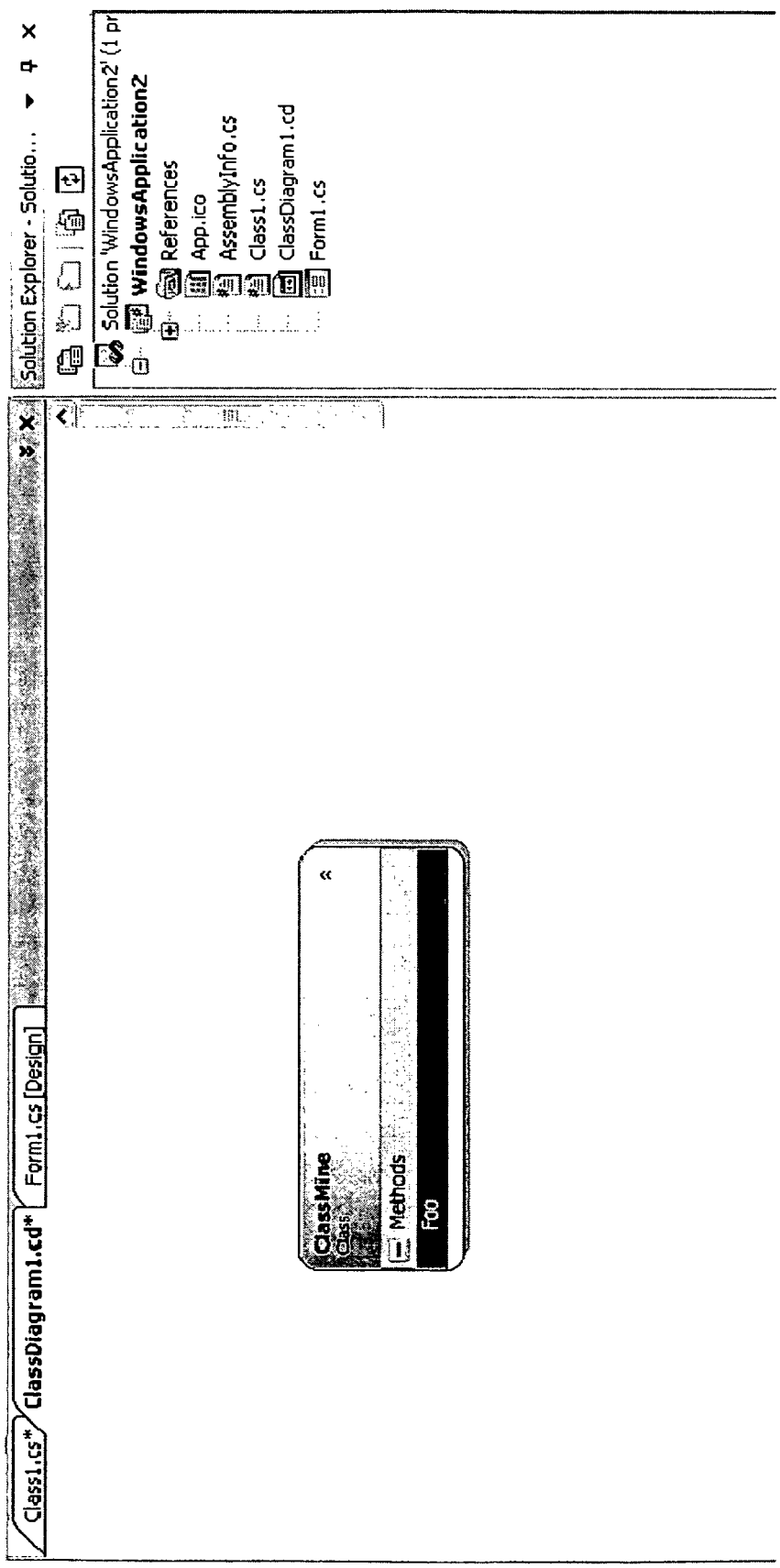
FIG. 43 is an exemplary user interface in accordance with an aspect of the present invention.
Figure 44:
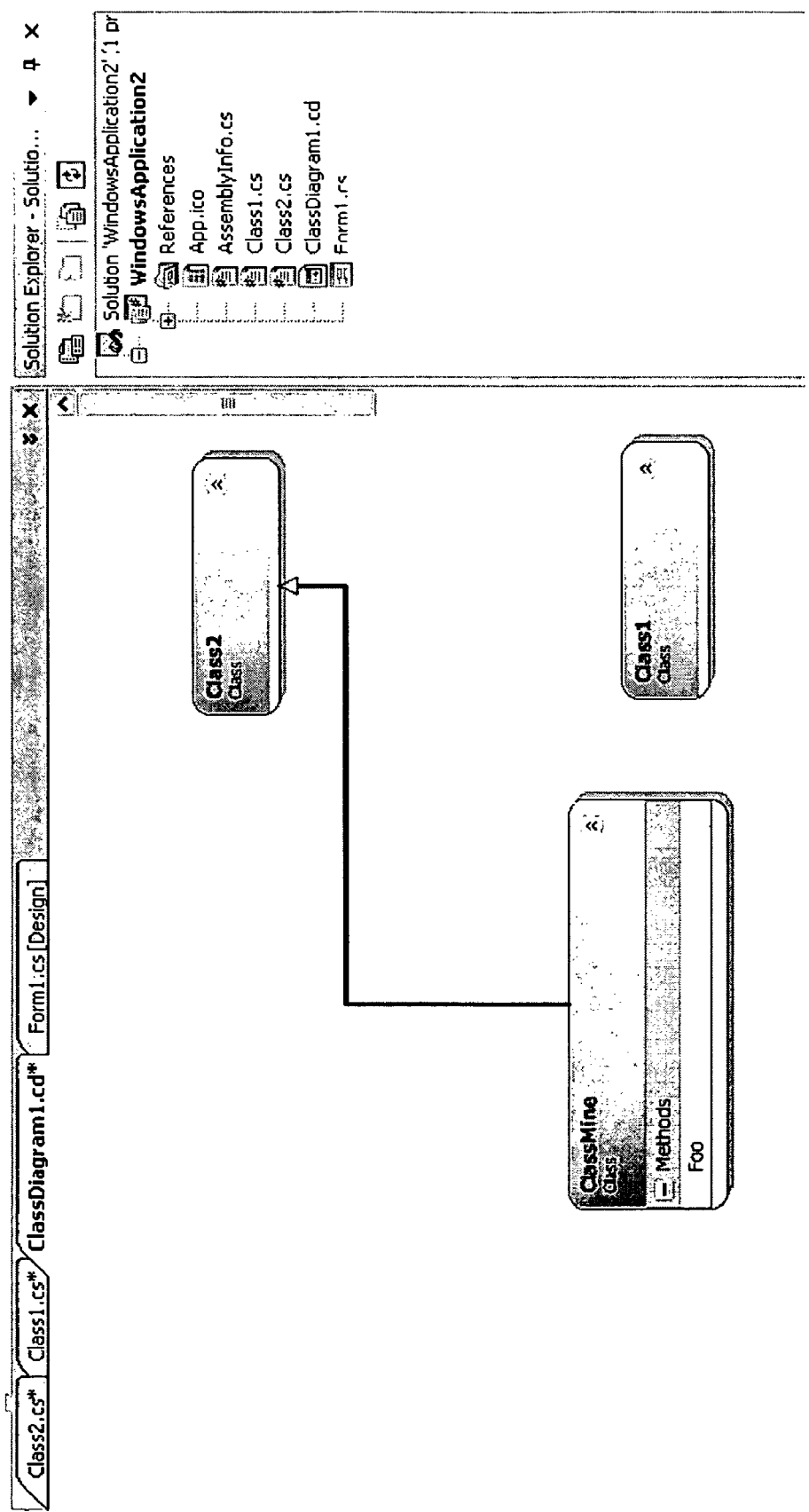
FIG. 44 is an exemplary user interface in accordance with an aspect of the present invention.
Figure 45:
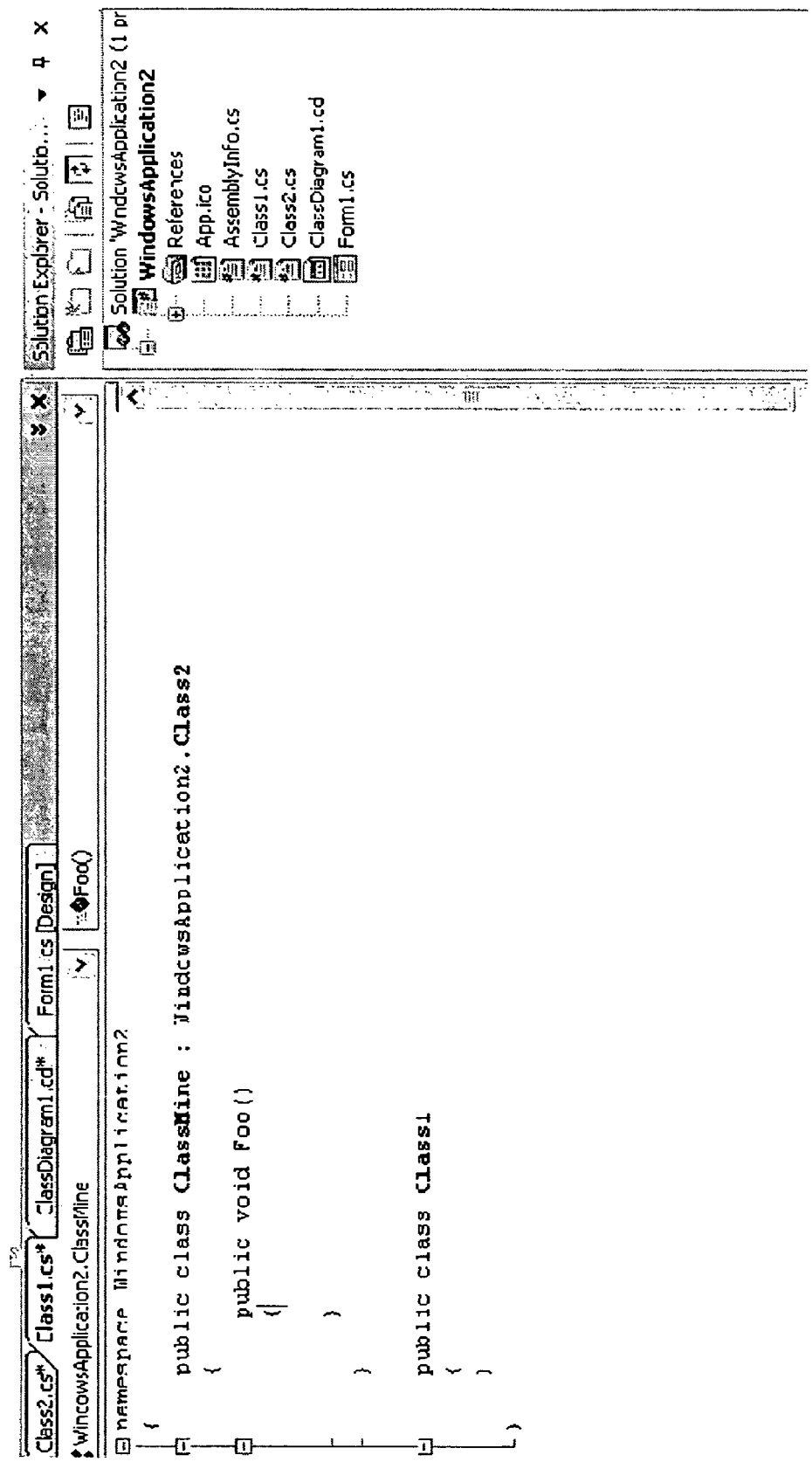
FIG. 45 is an exemplary user interface in accordance with an aspect of the present invention.
Figure 46:
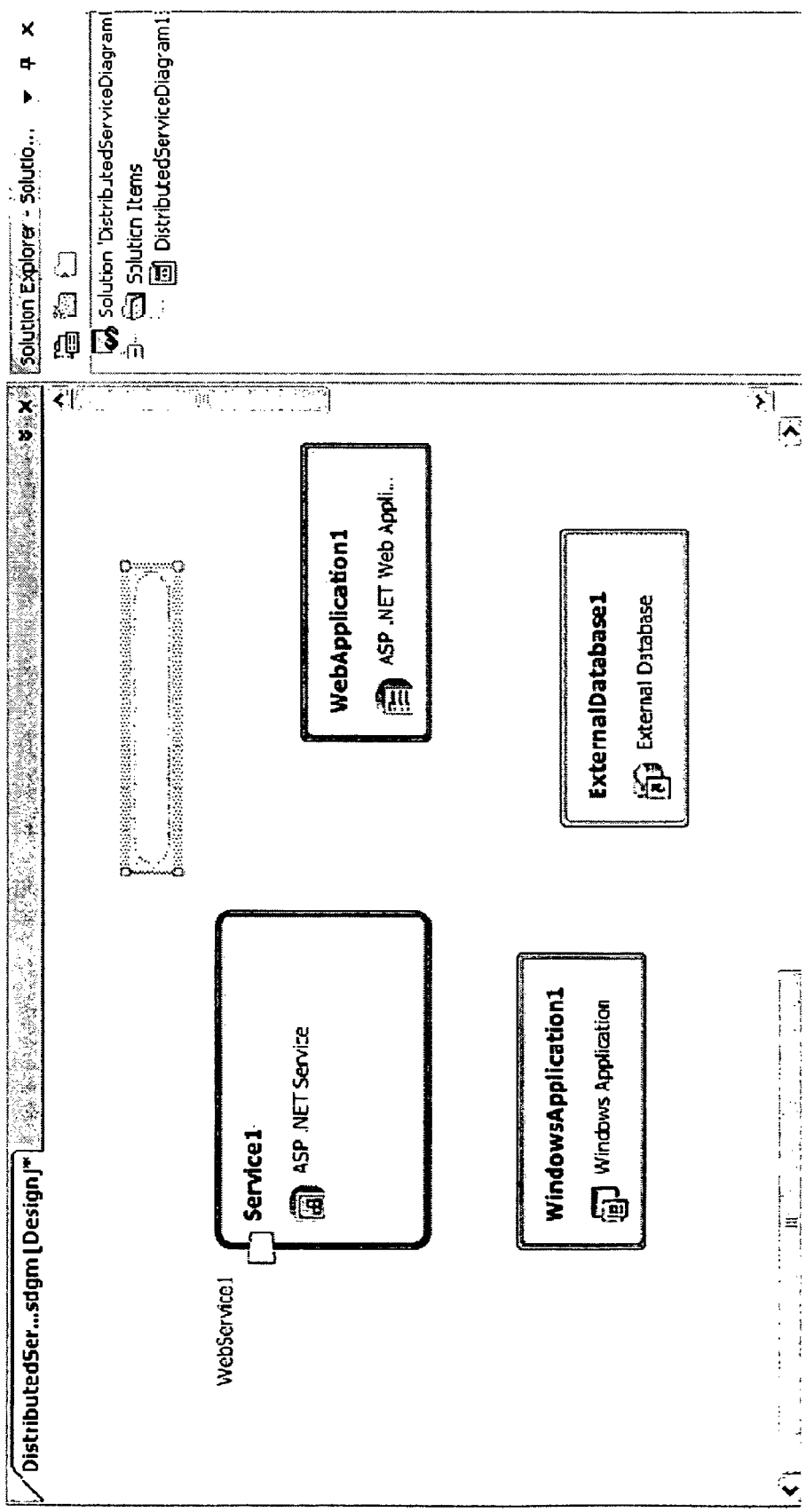
FIG. 46 is an exemplary user interface in accordance with an aspect of the present invention.
Figure 47:
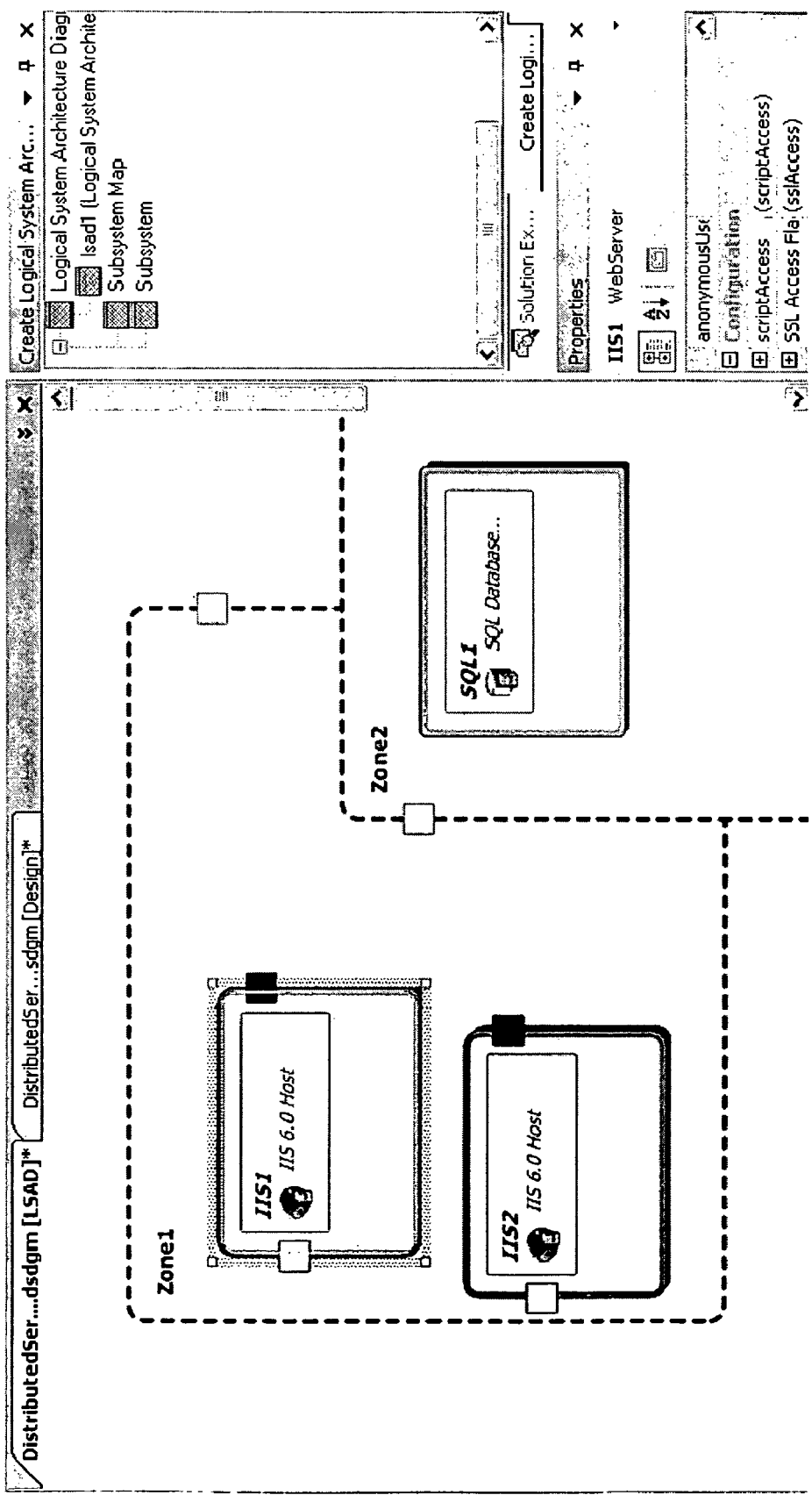
FIG. 47 is an exemplary user interface in accordance with an aspect of the present invention.

The potential mouse action query can be expanded beyond just asking the hit shape: it can query field(s) and/or subfield(s). Referring briefly to FIG. 40, a method 4000 facilitating retrieval of a potential mouse action in accordance with an aspect of the present invention is illustrated. At 4010, a determination is made as to whether a subfield has received a potential mouse action. If the determination is YES, at 4020, the potential mouse action has been found, and, no further processing occurs.

If the determination at 4010 is NO, at 4030, a determination is made as to whether a field has received a potential mouse action. If the determination is YES, processing continues at 4020. If the determination at 4030 is NO, at 4040, a determination is made as to whether a shape has received a potential mouse action. If the determination is made, processing continues at 4020. If the determination at 4040 is NO, at 4050, it is determination no potential mouse action has been received, and, no further processing occurs.

Double Click

The mouse event routing will need to route the OnDoubleClick not only to the ShapeElement, but also to the ShapeField and the ShapeSubField. If the OnDoubleClick is handled at any stage, the routing stops.

ListField

The ListField class derives from ShapeField and overrides DoPaint and DoHitTest.

```
public class ListField : ShapeField
{
    public override void DoHitTest(PointD point, ShapeElement
    parentShape,
        DiagramHitTestInfo info) { }
    public override void DoPaint(DiagramPaintEventArgs e, ShapeElement
        parentShape) { }
    public virtual void DrawItem( CompleteItemDrawInfo
    completeItemDrawInfo )
        { }
    public virtual double GetItemHeight( ShapeElement parentShape ) { }
    public int GetItemCount( ShapeElement parentShape ) { }
}
```

IListFieldContainer

Because the list field is a field, it is a "flyweight". It has no instance data, so it relies on a combination of field behavior descriptions and its parent shape. In one example, an interface from which a ShapeElement-derived class can derive is provided.

The IListFieldContainer implementation is responsible for providing instance level information to the child list field.

```
interface IListFieldContainer
{
    int GetItemCount(ListField listField);
    void GetItemDawInfo(ListField listField, int row, ItemDrawInfo
    itemDrawInfo);
}
```

ListField Bounds

The parent shape is responsible for keeping track of the number of items in the list. The list field can determine the item height based on the font. With these two figures, the parent shape will know the size of the list field and must resize itself when an item is added to or removed from the list field. The list field must show all of its items because scrolling will not be provided.

The list field can therefore rely on the existing BoundsBehavior to set its size.

ListField.DoHitTest Details

The DoHitTest method needs to determine which item was hit. The row number defines the item, and this number will be used as the ShapeSubField Id that is returned in DiagramHitTestInfo. In one example, in order to determine which item was hit, the hit-test algorithm requires the following information:

Bounds of the list field
Row height
Row count
ShapeElement.GetBounds

The ShapeField method GetBounds returns the bounds for the list field.

public virtual RectangleD GetBounds(ShapeElement parentshape)

ListField.GetItemHeight

The item height is calculated based on the height of the font used by the list item. The icon height is not considered in this calculation. If the icon height is greater than the list item height, the icon will be reduced to fit. If the icon height is less than the item height, then the icon is centered vertically. The ListField property DefaultFontID is used to retrieve the font. The height is in world units.

public virtual double GetItemHeight(ShapeElement parentshape)

ListField.GetItemCount

The item count needs additional help from the parent shape class. Therefore, IListFieldContainer needs a GetItemCount( ) method that this list field can use.

```
public int GetItemCount( ShapeElement parentShape )
{
    IListFieldContainer listFieldParent = parentShape as
    IListFieldContainer;
    return listFieldParent.GetItemCount( this );
}
int IListFieldContainer.GetItemCount( ListField listField ) { }
```

ListField.DoPaint Details

To draw, the DoPaint method requires the following general information from the parent shape:

Bounds of the list field (ShapeField.GetBounds)

Row height (ListField.GetItemHeight)

Row count (ListField.GetItemCount)

Font (ListField.NormalFontID)

Text brush and background brush for a non-selected item, selected item, and an inactive-selected item. (ListField.[X])

Pen for drawing focus outline (ListField.DefaultFocusPenID)

IListFieldContainer.GetItemDrawInfo

To draw a single item, the DoPaint method requires the following information:

Item text

Item image

Item read-only

The following method is required to get this information:

```
void GetItemDrawInfo(ListField listField, int row, ItemDrawInfo
    itemDrawInfo)
```

Item selected and focused states are retrieved from SelectedShapesCollection, so GetItemDrawInfo does not have to return that information. This method will be called once for each item in the list field.

StyleSet Usage

Additional Predefined Resources

In addition to the existing DesignSurfaceFonts.ShapeText, DesignSurfaceBrushes.ShapeText, and DesignSurfaceBrushes.ShapeBackground, the list field also needs:

1. DesignSurfaceBrushes.ShapeSelectedText for the color of selected text

2. DesignSurfaceBrushes.ShapeSelectedBackground for the background of selected text 3. DesignSurfaceBrushes.InactiveSelectedText for the color of selected text when the design surface doesn't have focus 4. DesignSurfaceBrushes.InactiveSelectedBackground for the background of selected text when the design surface doesn't have focus 5. DesignSurfacePens.FocusIndicator and FocusIndicatorBackground for the focus pen on a list item.

Specifying which Style Set Resources to Use

To use custom named resources, the shape developer needs the following new ListField properties to set:

```
public DesignSurfaceResourceId DefaultFontID
public DesignSurfaceResourceId DefaultTextBrushID
public DesignSurfaceResourceId DefaultSelectedTextBrushID
public DesignSurfaceResourceId DefaultSelectedBackgroundBrushID
public DesignSurfaceResourceId DefaultInactiveSelectedTextBrushID
public DesignSurfaceResourceId
DefaultInactiveSelectedBackgroundBrushID
public DesignSurfaceResourceId DefaultFocusPenID
```

The following property already exists on ShapeField:

public DesignSurfaceResourceId DefaultBackgroundBrushID

It is to be appreciated that the system 100, the application program interface 110, the diagram 120, the application 130 and/or the system 200 can be computer components as that term is defined herein.

Referring to FIGS. 41-47, exemplary user interfaces in accordance with aspects of the present invention are illustrated.

Methodologies that may be implemented in accordance with the present invention are illustrated, for example, in FIGS. 36A, 36B and 40. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 48:
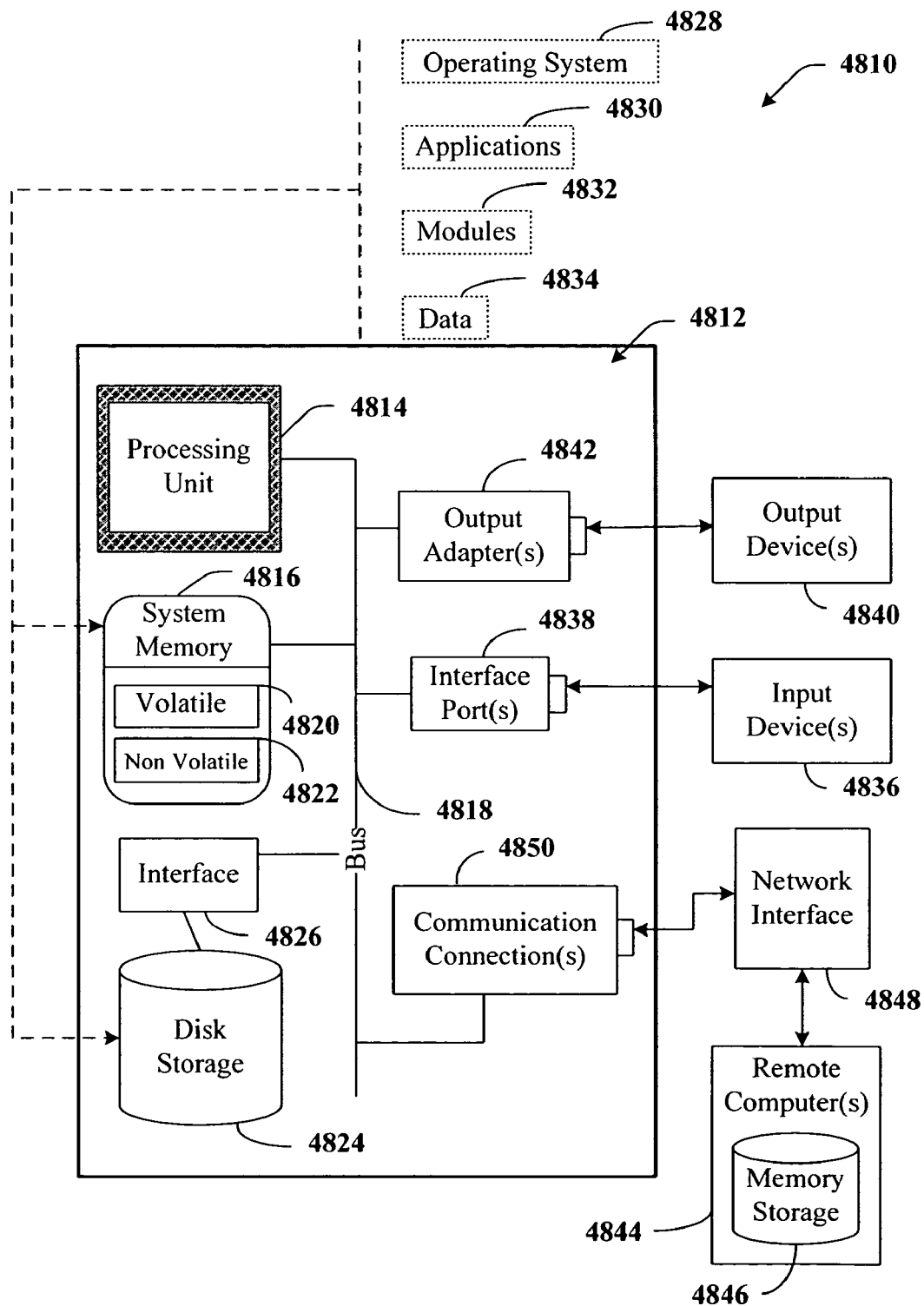
FIG. 48 illustrates an example operating environment in which the present invention may function.

In order to provide additional context for various aspects of the present invention, FIG. 48 and the following discussion are intended to provide a brief, general description of a suitable operating environment 4810 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 4810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 48, an exemplary environment 4810 for implementing various aspects of the invention includes a computer 4812. The computer 4812 includes a processing unit 4814, a system memory 4816, and a system bus 4818. The system bus 4818 couples system components including, but not limited to, the system memory 4816 to the processing unit 4814. The processing unit 4814 can be any of various available processors. Dual microprocessors and other multiprocessor architectures also can be employed as the processing unit 4814.

The system bus 4818 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 4816 includes volatile memory 4820 and nonvolatile memory 4822. The basic input/output system (BIOS), containing the basic routines to transfer information between elements within the computer 4812, such as during start-up, is stored in nonvolatile memory 4822. By way of illustration, and not limitation, nonvolatile memory 4822 can include read only memory (ROM), programmable ROM (PROM), electrically programmable ROM (EPROM), electrically erasable ROM (EEPROM), or flash memory. Volatile memory 4820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 4812 also includes removable/nonremovable, volatile/nonvolatile computer storage media. FIG. 48 illustrates, for example a disk storage 4824. Disk storage 4824 includes, but is not limited to, devices like a magnetic disk drive, floppy disk drive, tape drive, Jaz drive, Zip drive, LS-100 drive, flash memory card, or memory stick. In addition, disk storage 4824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 4824 to the system bus 4818, a removable or non-removable interface is typically used such as interface 4826.

It is to be appreciated that FIG. 48 describes software that acts as an intermediary between users and the basic computer resources described in suitable operating environment 4810. Such software includes an operating system 4828. Operating system 4828, which can be stored on disk storage 4824, acts to control and allocate resources of the computer system 4812. System applications 4830 take advantage of the management of resources by operating system 4828 through program modules 4832 and program data 4834 stored either in system memory 4816 or on disk storage 4824. It is to be appreciated that the present invention can be implemented with various operating systems or combinations of operating systems.

A user enters commands or information into the computer 4812 through input device(s) 4836. Input devices 4836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 4814 through the system bus 4818 via interface port(s) 4838. Interface port(s) 4838 include, for example, a serial port, a parallel port, a game port, and a universal serial bus (USB). Output device(s) 4840 use some of the same type of ports as input device(s) 4836. Thus, for example, a USB port may be used to provide input to computer 4812, and to output information from computer 4812 to an output device 4840. Output adapter 4842 is provided to illustrate that there are some output devices 4840 like monitors, speakers, and printers among other output devices 4840 that require special adapters. The output adapters 4842 include, by way of illustration and not limitation, video and sound cards that provide a means of connection between the output device 4840 and the system bus 4818. It should be noted that other devices and/or systems of devices provide both input and output capabilities such as remote computer(s) 4844.

Computer 4812 can operate in a networked environment using logical connections to one or more remote computers, such as remote computer(s) 4844. The remote computer(s) 4844 can be a personal computer, a server, a router, a network PC, a workstation, a microprocessor based appliance, a peer device or other common network node and the like, and typically includes many or all of the elements described relative to computer 4812. For purposes of brevity, only a memory storage device 4846 is illustrated with remote computer(s) 4844. Remote computer(s) 4844 is logically connected to computer 4812 through a network interface 4848 and then physically connected via communication connection 4850. Network interface 4848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 4850 refers to the hardware/software employed to connect the network interface 4848 to the bus 4818. While communication connection 4850 is shown for illustrative clarity inside computer 4812, it can also be external to computer 4812. The hardware/software necessary for connection to the network interface 4848 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented diagram system for manipulating a domain specific language instance model via a diagram, comprising:
    a diagram that stores at least one shape element;
    an object model application program interface that includes a control that facilitates access to the diagram, the control maintaining state information associated with the diagram and with an underlying data document, employing a common framework to keep both the diagram and the underlying data document synchronized; and
    a computer readable storage medium comprising sets of code and data structures for causing a computer to modify the diagram,
    wherein the underlying data document is a domain specific language model representing both model elements and presentation elements.

2. The computer-implemented system of claim 1, the state information comprising at least one of selection, zoom and scroll position.

3. The computer-implemented system of claim 1, the control captures operating system events.

4. The computer-implemented system of claim 3, the control providing at least some of the operating system events to the shape element.

5. The computer-implemented system of claim 1, the control rerouting at least one of paint, keyboard and mouse events to at least one of the diagram and the shape element.

6. The computer-implemented system of claim 1, the diagram and the shape element responsible for painting themselves.

7. The computer-implemented system of claim 1, the diagram or the shape element being responsible for responding to a user interaction.

8. The computer-implemented system of claim 1, the shape element being based, at least in part, upon a model element class.

9. The computer-implemented system of claim 1, the diagram being based, at least in part, upon a node shape that has a bounds property which defines its location and size, the node shape derived from the shape element.

10. The computer-implemented system of claim 1, at least one shape element having a child shape element.

11. The computer-implemented system of claim 1, the shape element derived from a presentation element.

12. The computer-implemented system of claim 1, the shape element comprising at least one of a geometry property, a style set property and a shape fields property.

13. The computer-implemented system of claim 1, the diagram having a graph object employed for hittesting for testing a shape that has been user dropped by dragging.

14. The computer-implemented system of claim 1, the shape element being control-less.

15. A computer readable medium storing computer executable components of a diagram system comprising:
    a diagram component that stores at least one shape element and has a graph object employed for hittesting for testing a shape that has been user dropped by dragging, wherein the hittesting returns information which indicates if the shape has been dropped outside a boundary of a target shape, on the boundary of the target shape, inside the filed-area of a two dimensional shape and/or on a line of a one-dimensional shape; and, an application program interface component that includes a control that facilitates access to the diagram component, the control maintaining state information associated with the diagram and with an underlying data document, wherein the application program interface employs a common framework to keep the diagram component and the underlying data document synchronized, wherein the underlying data document is a domain specific language model representing both model elements and presentation elements.

16. A method for diagramming, comprising:

managing presentation elements comprised of diagrams and shapes in a same context as correspondingly depicted design elements of a diagram on design surface in an object model diagramming system to avoid synchronization issues of mirrored presentation and design classes;

providing an object model application programming interface comprising a single diagram control for the design surface that maintains state information associated with the diagram by capturing events; and rendering shapes of the diagram that are responsible for painting themselves and for responding to user interaction via a user interface, making implementation very light weight and independent of any specific diagram, wherein at least a one shape is a parent shape having an associated child shape, wherein the child shape inherits resources from the parent shape, the child shape conforming to a set of rules defining where the child shape can be located and how the child shape can be sized relative to the parent shape, wherein the parent shape and the child shape may be in a nested relationship such that the child shape is fully contained within the parent shape.

17. A computer program product for use at a computer system, the computer program product for implementing a method for a diagram system to manipulate a domain specific language instance model via a diagram, the computer program product comprising one or more physical computer-readable storage media having stored thereon computer-executable instructions that when executed by a processor cause the computer system to perform the following:

providing a diagram that stores at least one shape element;

providing an object model application program interface that includes a control that facilitates access to the diagram, the control maintaining state information associated with the diagram and with an underlying data document, employing a common framework to keep both the diagram and the underlying data document synchronized; and providing a computer readable storage medium comprising sets of code and data structures for causing a computer to modify the diagram, wherein the underlying data document is a domain specific language model representing both model elements and presentation elements.

18. A computing system comprising the following:

one or more processors;

system memory;

one or more computer-readable storage media having stored thereon computer-executable instructions that, when executed by the one or more processors, causes the computing system to perform a method for a diagram system to manipulate a domain specific language instance model via a diagram, the method comprising the following:

providing a diagram that stores at least one shape element;

providing an object model application program interface that includes a control that facilitates access to the diagram, the control maintaining state information associated with the diagram and with an underlying data document, employing a common framework to keep both the diagram and the underlying data document synchronized; and providing a computer readable storage medium comprising sets of code and data structures for causing a computer to modify the diagram, wherein the underlying data document is a domain specific language model representing both model elements and presentation elements.

* * * * *